(12) United States Patent
Ukita et al.

(10) Patent No.: US 9,263,916 B2
(45) Date of Patent: Feb. 16, 2016

(54) POWER MANAGEMENT SYSTEM, POWER MANAGEMENT APPARATUS, AND POWER MANAGEMENT METHOD

(75) Inventors: Masakazu Ukita, Kanagawa (JP); Asami Yoshida, Kanagawa (JP); Tomoyuki Asano, Kanagawa (JP); Shiho Moriai, Kanagawa (JP); Masanobu Katagi, Kanagawa (JP); Yohei Kawamoto, Tokyo (JP); Seiichi Matsuda, Tokyo (JP); Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 694 days.

(21) Appl. No.: 13/521,732

(22) PCT Filed: Jan. 4, 2011

(86) PCT No.: PCT/JP2011/000003
§ 371 (c)(1),
(2), (4) Date: Jul. 11, 2012

(87) PCT Pub. No.: WO2011/089854
PCT Pub. Date: Jul. 28, 2011

(65) Prior Publication Data
US 2012/0286723 A1 Nov. 15, 2012

(30) Foreign Application Priority Data
Jan. 25, 2010 (JP) ................................ 2010-013684

(51) Int. Cl.
*H02J 7/00* (2006.01)
*G01R 21/00* (2006.01)
(Continued)

(52) U.S. Cl.
CPC .......... *H02J 13/0062* (2013.01); *B60L 11/1848* (2013.01); *G06Q 10/06312* (2013.01); *G06Q 50/06* (2013.01); *H02J 3/32* (2013.01); *H02J 3/008* (2013.01); *H02J 3/14* (2013.01); *H02J 3/38* (2013.01); *H02J 13/001* (2013.01); *H02J 2003/143* (2013.01); *H04L 63/08* (2013.01); *Y02B 70/3266* (2013.01); *Y02B 90/2638* (2013.01); *Y02E 60/721* (2013.01); *Y02T 10/7005* (2013.01); *Y02T 90/121* (2013.01);
(Continued)

(58) Field of Classification Search
CPC .................................................. H02J 13/0062
USPC ................. 320/107, 127, 128, 135, 137, 167; 702/57, 60, 61, 62, 63
See application file for complete search history.

(56) References Cited

U.S. PATENT DOCUMENTS

| 6,925,361 B1* | 8/2005 | Sinnock ........................ 700/286 |
| 2005/0125703 A1* | 6/2005 | Lefurgy et al. ................ 713/320 |

(Continued)

FOREIGN PATENT DOCUMENTS

| JP | 5-158160 | 6/1993 |
| JP | 2006-333563 | 12/2006 |

(Continued)

*Primary Examiner* — Richard V Muralidar
(74) *Attorney, Agent, or Firm* — Hazuki International, LLC

(57) ABSTRACT

There is provided a power management system including a power receiving unit for receiving power from outside according to consumption of power, an electrical storage unit for storing the power received by the power receiving unit, and a discharge control unit for controlling a second power amount discharged from the electrical storage unit so that a first power amount provided by the power receiving unit attains a predetermined time-series pattern.

7 Claims, 38 Drawing Sheets

(51) Int. Cl.
*G01R 31/36* (2006.01)
*H02J 13/00* (2006.01)
*G06Q 10/06* (2012.01)
*G06Q 50/06* (2012.01)
*H02J 3/32* (2006.01)
*B60L 11/18* (2006.01)
*H02J 3/00* (2006.01)
*H02J 3/14* (2006.01)
*H02J 3/38* (2006.01)
*H04L 29/06* (2006.01)

(52) U.S. Cl.
CPC ............... *Y02T 90/128* (2013.01); *Y02T 90/14* (2013.01); *Y02T 90/163* (2013.01); *Y02T 90/169* (2013.01); *Y04S 10/126* (2013.01); *Y04S 20/242* (2013.01); *Y04S 30/14* (2013.01); *Y04S 40/124* (2013.01); *Y04S 50/10* (2013.01)

(56) References Cited

U.S. PATENT DOCUMENTS

| | | | | |
|---|---|---|---|---|
| 2007/0224461 | A1* | 9/2007 | Oh | 429/9 |
| 2008/0224652 | A1* | 9/2008 | Zhu et al. | 320/101 |
| 2009/0164071 | A1* | 6/2009 | Takeda | 701/48 |
| 2009/0302691 | A1* | 12/2009 | Wang et al. | 307/129 |
| 2011/0184575 | A1* | 7/2011 | Kawamoto | H04L 67/125 700/292 |
| 2011/0184585 | A1* | 7/2011 | Matsuda | G06F 1/26 700/297 |
| 2011/0185198 | A1* | 7/2011 | Ukita | G06Q 50/06 713/300 |

FOREIGN PATENT DOCUMENTS

JP 2007-142846 5/2007
JP 2009-225641 10/2009

* cited by examiner

Fig. 9

| CONSTITUENT ELEMENT | OVERVIEW OF MAIN FEATURES |
|---|---|
| APPARATUS MANAGEMENT UNIT 1121 | APPARATUS REGISTRATION, APPARATUS AUTHENTICATION, ID MANAGEMENT OF EACH APPARATUS, MANAGEMENT OF OPERATION SETTING/SERVICE SETTING OF EACH APPARATUS, RECOGNITION OF OPERATION STATE AND USE STATE OF EACH APPARATUS, COLLECTION OF ENVIRONMENTAL INFORMATION, RECOGNITION OF USE STATE (FOR EACH APPARATUS, ALL APPARATUSES, IN UNITS OF PREDETERMINED BLOCKS), AND THE LIKE |
| POWER TRANSACTION UNIT 1122 | ACQUISITION OF MARKET TRANSACTION DATA/INDIVIDUAL TRANSACTION DATA, TIMING CONTROL OF SELL ORDER/BUY ORDER, EXECUTION OF SELL ORDER/BUY ORDER, MANAGEMENT OF BUYING AND SELLING LOGS, AND THE LIKE |
| INFORMATION ANALYSIS UNIT 1123 | ANALYSIS OF POWER GENERATION DATA, ANALYSIS OF POWER STORAGE DATA, LEARNING OF LIFE PATTERN, ANALYSIS OF POWER CONSUMPTION DATA (FOR EACH APPARATUS, ALL APPARATUSES, IN UNITS OF PREDETERMINED BLOCKS), PREDICTION OF POWER CONSUMPTION PATTERN, PREDICTION OF POWER STORAGE PATTERN, PREDICTION OF DISCHARGE PATTERN, PREDICTION OF POWER GENERATION PATTERN, CALCULATION OF AMOUNT OF CURRENT EMISSION OF $CO_2$, PREDICTION OF AMOUNT OF FUTURE EMISSION OF $CO_2$, CALCULATION OF POWER-CONSERVATION PATTERN, CALCULATION OF LOW $CO_2$ EMISSION PATTERN, CALCULATION OF APPARATUS CONFIGURATION/APPARATUS ARRANGEMENT FOR POWER-CONSERVATION/LOW $CO_2$ EMISSION, AND THE LIKE |
| DISPLAY INFORMATION GENERATION UNIT 1124 | GENERATION OF INFORMATION ABOUT APPARATUSES, INFORMATION ABOUT POWER, INFORMATION ABOUT ENVIRONMENT, INFORMATION ABOUT TRANSACTION DATA, INFORMATION ABOUT ANALYSIS RESULT, AND THE LIKE |
| SYSTEM MANAGEMENT UNIT 1125 | VERSION MANAGEMENT OF FIRMWARE, UPDATE ACCESS RESTRICTION, VIRUS PROTECTION, AND THE LIKE |

Fig. 14

116 :DISPLAY UNIT

| APPARATUS ID | TYPE OF APPARATUS | POWER CONSUMPTION |
|---|---|---|
| 0011 | AIR CONDITIONER | ▨▨▨▨▨▨ |
| 0012 | TELEVISION SET | ▨▨ |
| ⋮ | ⋮ | ⋮ |
| 0108 | TERMINAL EXPANSION DEVICE | ▨▨ |

| TYPE OF APPARATUS | POWER CONSUMPTION |
|---|---|
| DRYER | ▨▨▨ |
| PORTABLE TELEPHONES | ▨▨ |
| OTHER | ▨ |

Fig. 15

116 :DISPLAY UNIT

| APPARATUS ID | TYPE OF APPARATUS | STATE | POWER CONSUMPTION |
|---|---|---|---|
| 0011 | AIR CONDITIONER | AUTHENTICATED | ▨▨▨▨▨ |
| 0012 | TELEVISION SET | NOT AUTHENTICATED | ▨▨ |
| ⋮ | ⋮ | ⋮ | ⋮ |
| 0003 | ELECTRIC VEHICLE | AUTHENTICATED | ▨▨▨▨▨▨▨ |

Fig. 16

116 :DISPLAY UNIT

| LOCATION OF USE | POWER CONSUMPTION | BILLED AMOUNT |
|---|---|---|
| LOCATION #1 | *** kW | * * * YEN |
| LOCATION #2 | *** kW | * * * YEN |
| LOCATION #3 | *** kW | * * * YEN |

Fig. 17

116 :DISPLAY UNIT

| APPARATUS ID | TYPE OF APPARATUS | POWER CONSUMPTION |
|---|---|---|
| 0011 | AIR CONDITIONER | ▨▨▨ |
| 0012 | TELEVISION SET | ▨ |
| ⋮ | ⋮ | ⋮ |
| 0003 | ELECTRIC VEHICLE | ▨▨▨▨▨▨⊠⊠ |

⊠ POWER USED OUTSIDE OF THIS SYSTEM
▨ POWER USED IN THIS SYSTEM (A) EXAMPLE OF POWER CONSUMPTION PATTERN (B) EXAMPLE OF POWER CONSUMPTION PATTERN

POWER MANAGEMENT SYSTEM, POWER MANAGEMENT APPARATUS, AND POWER MANAGEMENT METHOD

TECHNICAL FIELD

The present invention relates to a power management system, a power management apparatus, and a power management method.

BACKGROUND ART

In recent years, a technology called a smart grid has gained attention. The smart grid is a technical framework to realize efficient power usage by constructing a new transmission network having a communication channel along with the transmission network and using the intelligent transmission network. The idea of the smart grid, as a background, is to realize efficient management of power usage, swift handling of an incident when such an incident occurs, remote control of power usage, distributed power generation using power generation facilities outside the control of a power company, or charging management of an electric vehicle. Particularly, effective utilization of in-house power generating stations using renewable energy by ordinary households or operators other than power companies and charging management of various motor-driven movable bodies typically including electric vehicles have attracted considerable attention. Incidentally, renewable energy is energy generated without using fossil fuel.

Power generated by ordinary households or operators other than power companies is used by power generation operators. Excessive power after being used by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power usage of ordinary households that largely changes day by day. Thus, it is difficult for power companies to receive stable power supply from power generation facilities outside the control of power companies. For the above reason, it may be difficult for power companies to purchase power in the future.

Thus, a home battery initiative that uses power generated by power generation facilities outside the control of power companies after being temporarily stored in batteries has recently gained attention. For example, a method of using power generated by photovoltaic power generation facilities by storing such power in batteries and making up for shortages in the night or when the weather is bad is considered. Further, methods of limiting amount of power received from a power company in accordance with the battery storage amount and using power stored in batteries in the daytime when power rates are higher by storing power in batteries supplied by a power company in the night when power rates are lower are considered. Batteries can store power as DC, which eliminates the need for DC/AC conversion or AC/DC conversion during transmission so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using the intelligent transmission network is assumed. However, in a region where a communication infrastructure has been built, instead of using a transmission network as a communication channel, information about power management may be exchanged by using a network constructed by the deployed communication infrastructure. That is, what is important in the smart grid initiative is how efficiently to use power generation facilities and storage facilities that are not managed in a unified manner.

Regarding the above power management, for example, Patent Literature 1 describes a power management system for stably supplying power by temporarily storing, in a battery, power obtained by using a renewable energy power generation system. In other words, Patent Literature 1 discloses an idea similar to the home battery initiative. Certainly, stable supply of renewable energy is one of major issues. Some of the issues associated with stable supply of renewable energy may be solved by appropriately managing charging/discharging of a battery.

CITATION LIST

Patent Literature

PTL 1: Japanese Patent Application Laid-Open No. 2007-124846

SUMMARY OF INVENTION

Technical Problem

As described above, the above smart grid initiative is mainly directed to management of power used in ordinary households, offices, and the like. In order to achieve the above management of power, it is necessary to monitor the amount of power used in ordinary households, offices, and the like. However, a time-series pattern of used power includes various kinds of information. In an example of an ordinary household, whether there is any person in the house or whether people are sleeping or not can be found from information indicating that less power is used in the house. If a time zone in which much power is often used can be found, a wake-up time and a time when people come home can be found. As described above, when information about used power is leaked to the outside, an outside party would know a life pattern of a user of power.

In view of the foregoing, it is desirable to provide a novel and improved power management system, power management apparatus, and power management method capable of preventing privacy information from being leaked from a time-series pattern of actually used power.

Solution to Problem

According to an embodiment of the present invention, there is provided a power management system including a power receiving unit for receiving power from outside according to consumption of power, an electrical storage unit for storing the power received by the power receiving unit, and a discharge control unit for controlling a second power amount discharged from the electrical storage unit, so that a first power amount provided by the power receiving unit attains a predetermined time-series pattern.

The power management system may further include a pattern obtaining unit for obtaining, from a power management system of another user installed on a building nearby, a time-series pattern of a third power amount for which an electric supply is received from outside of the power management system of the another user. The discharge control unit controls the second power amount discharged from the electrical storage unit so that the first power amount attains the time-series pattern of the third power amount.

The power management system may further include an average pattern generation unit for generating an average time-series pattern by averaging time-series patterns of third power amounts obtained from power management systems of a plurality of other users by the pattern obtaining unit. The discharge control unit controls the second power amount discharged from the electrical storage unit so that the first power amount attains the average time-series pattern.

Furthermore, the electrical storage unit may include a battery having a long response time from when a discharge control is performed to when a discharge starts, and a capacitor having a short response time from when a discharge control is performed to when a discharge starts, and the discharge control unit discharges power from the capacitor when a short time change in the first power amount is corrected to the predetermined time-series pattern, and discharges power from the battery when a long time change in the first power amount is corrected to the predetermined time-series pattern.

Furthermore, the discharge control unit may control the second power amount discharged from the electrical storage unit so that the first power amount is maintained at a constant value.

Furthermore, the discharge control unit may control the second power amount discharged from the electrical storage unit so that the first power amount attains a random time-series pattern.

Furthermore, the power receiving unit may include a purchase power receiving unit for receiving power purchased from power provider, and a private power receiving unit for receiving power generated by private power generation. The discharge control unit controls the second power amount discharged from the electrical storage unit so that a fourth power amount provided by the purchase power receiving unit attains the predetermined time-series pattern while the power provided by the private power receiving unit is consumed or stored.

According to another embodiment of the present invention, there is provided a power management apparatus including a discharge control unit for controlling a second power amount provided from outside according to consumption of power by controlling a first power amount discharged from an electrical storage unit storing power. The discharge control unit controls the first power amount discharged from the electrical storage unit so that the second power amount attains a predetermined time-series pattern.

According to another embodiment of the present invention, there is provided a power management method including the steps of: receiving power from outside according to consumption of power, storing the power received in the power receiving step, and discharging the power stored in the electrical storage step so that a first power amount provided in the power receiving step attains a predetermined time-series pattern.

Advantageous Effects of Invention

As described above, according to another aspect of the present invention, it is possible to prevent privacy information from being leaked from a time-series pattern of actually used power.

BRIEF DESCRIPTION OF DRAWINGS

FIG. 9 is an explanatory diagram illustrating a detailed functional configuration of the information management unit.

FIG. 14 is an explanatory diagram illustrating contents displayed on the display unit and a display method.

FIG. 15 is an explanatory diagram illustrating contents displayed on the display unit and a display method.

FIG. 16 is an explanatory diagram illustrating contents displayed on the display unit and a display method.

FIG. 17 is an explanatory diagram illustrating contents displayed on the display unit and a display method.

DESCRIPTION OF EMBODIMENTS

Figure 1:
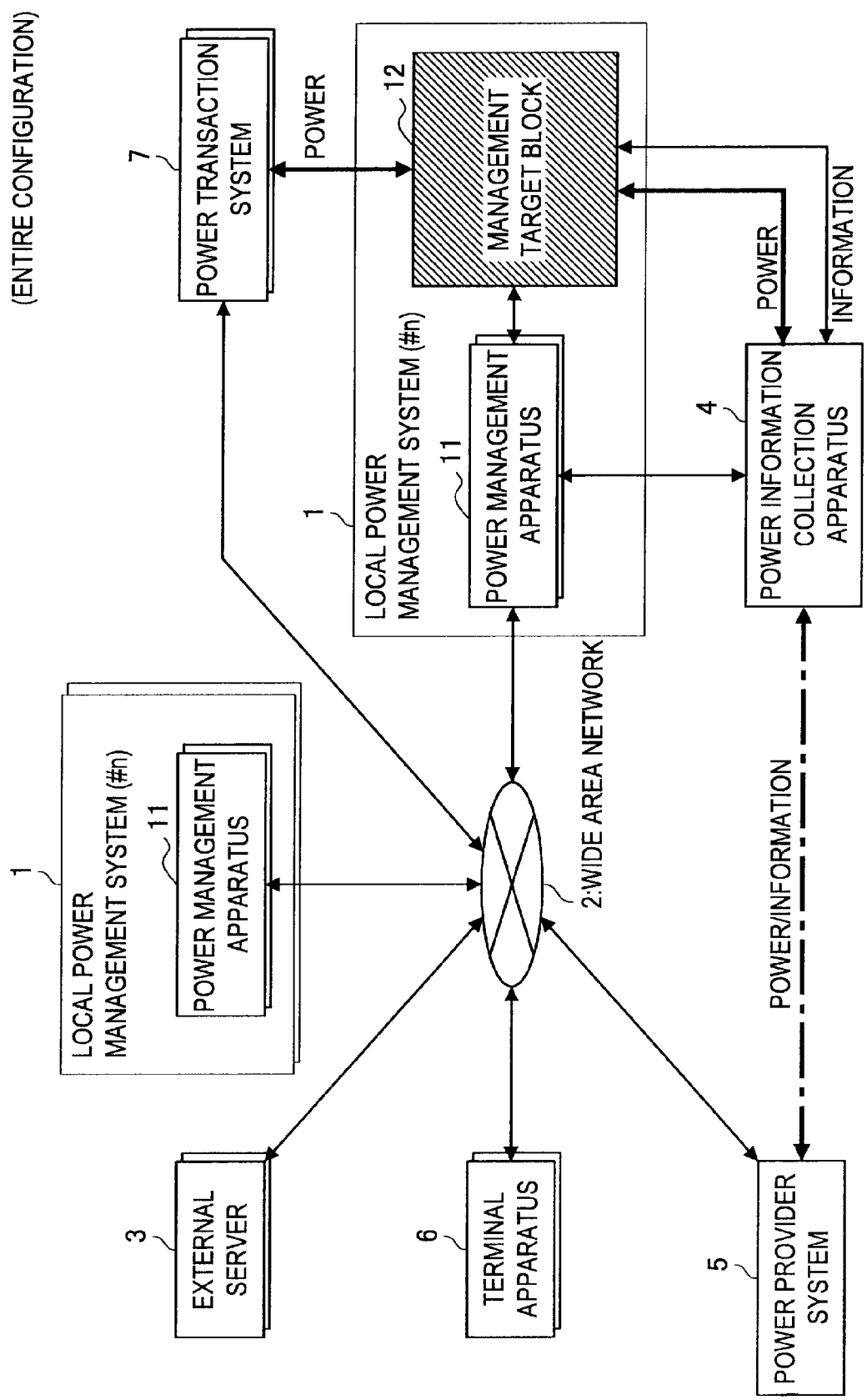
FIG. 1 is an explanatory diagram illustrating an overview of a power management system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Flow of Explanation)

Hereinafter, a flow of explanation about an embodiment of the present invention described below will be briefly explained. First, an overview of a power management system will be explained with reference to FIG. 1 to FIG. 6. Subsequently, a configuration of a power management apparatus 11 will be explained with reference to FIG. 7 to FIG. 9. A display content and a display method of a display unit 116 will be explained with reference to FIG. 10 to FIG. 17. Subsequently, a method for concealing a consumed power pattern will be explained with reference to FIG. 18 to FIG. 22.

Subsequently, a configuration of a terminal expansion device 127 will be explained with reference to FIG. 23 to FIG. 38. Subsequently, power management apparatuses 11 in multi-apparatus configuration will be explained with reference to FIG. 39 to FIG. 41. Subsequently, an example of a hardware configuration capable of achieving functions of the power management apparatus 11 will be explained with reference to FIG. 42. Lastly, a technical concept of the embodiment will be summarized, and actions and effects obtained from the technical concept will be briefly explained.

(Items of Explanation)

1. Overview of power management system
  1-1: Entire configuration (FIG. 1)
  1-2: Configuration of management target block 12 (FIG. 2 to FIG. 4)
  1-3: Configuration of external server 3 (FIG. 5, FIG. 6)
2: Configuration of power management apparatus 11 (FIG. 7 to FIG. 9)
  2-1: Overview of functions
  2-2: Details of functions
3: Display contents and display method of display unit 116 (FIG. 10 to FIG. 17)
  3-1: Display of system configuration
  3-2: Display of the amount of power consumption 4: Method for concealing consumed power pattern (FIG. 18 to FIG. 22)
  4-1: Averaging
  4-2: Complication
  4-3: Patterning
5: Configuration of terminal expansion device 127 (FIG. 23 to FIG. 38)
  5-1: Functions
  5-2: Operations
    5-2-1: Operation of standby mode
    5-2-2: Operation of normal mode
    5-2-3: Operation of deenergized mode
    5-2-4: Operation during abnormality mode
    5-2-5: Operation during authentication
6: Power management apparatuses 11 in multi-apparatus configuration (FIG. 39 to FIG. 41)
  6-1: Control operation
  6-2: Operation of updating processing
7: Example of hardware configuration of power management apparatus 11 (FIG. 42)
8: Conclusion Hereinafter, an embodiment of the present invention will be explained in detail.

<1: Overview of Power Management System>

First, an overview of a power management system according to the present embodiment will be explained.

(1-1: Entire Configuration (FIG. 1))

FIG. 1 is an explanatory diagram illustrating an overview of a power management system according to the present embodiment.

As shown in FIG. 1, the power management system according to the present embodiment includes a local power management system 1, a wide area network 2, an external server 3, a power information collection apparatus 4, a power provider system 5, a terminal apparatus 6, and a power transaction system 7. The local power management system 1, the external server 3, the power information collection apparatus 4, the power provider system 5, the terminal apparatus 6, and the power transaction system 7 are connected to the wide area network 2 so as to communicate information with each other.

In this document, terms such as "local area" and "wide area" are used. The term "local area" means a small group constituted by elements capable of communicating without relying on the wide area network 2. On the other hand, the term "wide area" means a large group constituted by elements capable of communicating using the wide area network 2. More specifically, a small group constituted by elements arranged in the local power management system 1 may be particularly referred to as "local area". On the other hand, the entire power management system as shown in FIG. 1 may be referred to as "wide area".

The above power management system promotes more efficient use of power in the same manner as the above-explained smart grid initiative, and appropriately manages various instruments operating using power, electrical storage means storing power, power generation means generating power, electric supply means providing power from a power source, and the like. This power management system manages power of instruments arranged in the local power management system 1, the electrical storage means, the power generation means, the electric supply means, and the like. In the smart grid initiative, a system referred to as HEMS (Home Energy Management System) or BEMS (Building Energy Management System) is an example of the local power management system 1.

As shown in FIG. 1, the local power management system 1 includes the power management apparatus 11 and a management target block 12. The power management apparatus 11 is adapted to manage the instruments in the local power management system 1, the electrical storage means, the power generation means, the electric supply means, and the like. For example, the power management apparatus 11 allows or prohibits power to be supplied to each instrument. In addition, the power management apparatus 11 authenticates each instrument to identify each instrument and confirm validity of each instrument. The power management apparatus 11 collects information about the amount of power consumption and the like from each instrument.

In addition, the power management apparatus 11 collects information about the amount of electrical storage and the like from the electrical storage means. The power management apparatus 11 controls charging/discharging of the electrical storage means. The power management apparatus 11 collects information about the amount of power generation and the like from the power generation means. Further, the power management apparatus 11 obtains, from the electric supply means, the amount of power provided from the outside. As described above, the power management apparatus 11 collects information from the instruments in the local power management system 1, the electrical storage means, the power generation means, and the electric supply means, and controls input/output of power thereof. Needless to say, the power management apparatus 11 similarly manages constituent elements other than the instruments, the electrical storage means, the power generation means, and the electric supply means, as necessary.

In the local power management system 1 shown in FIG. 1, the constituent elements of the instruments, the electrical storage means, the power generation means, the electric supply means, and the like subjected to the power management are included in the management target block 12. The constituent element included in the management target block 12 and the power management apparatus 11 can exchange information directly or indirectly. Further, the power management apparatus 11 may be configured to exchange information with the power information collection apparatus 4. The power information collection apparatus 4 manages information about power provided from the power provider system 5 managed by the power provider. In the smart grid initiative, an apparatus called a smart meter is an example of the power information collection apparatus 4.

The power provider system 5 provides power to each local power management system 1. Then, the power provided from the power provider system 5 is provided to the management target block 12 in the local power management system 1 via the power information collection apparatus 4. At this occasion, the power information collection apparatus 4 obtains information about the amount of power and the like provided to the management target block 12. Then, the power information collection apparatus 4 transmits information about the obtained amount of power and the like to the power provider system 5. By using such mechanism, the power provider system 5 collects information about the amount of power consumption and the like of the management target block 12 in each of local power management system 1.

Further, the power provider system 5 references the collected information about the amount of power consumption and the like, and controls the power information collection apparatus 4, thereby controlling the amount of supplied power so as to promote efficient use of power in each management target block 12 or in the entire power management system. At this occasion, the power information collection apparatus 4 suppresses the amount of power provided to the management target block 12 from the power provider system 5, or cancels the suppression of the amount of power, in accordance with the amount of consumed power in the management target block 12. Examples of power providers include a power company, a power generation administrator owning power generation facilities as an individual or a juristic person, or an electrical storage administrator owning electrical storage facilities as an individual or a corporate body.

Under the present circumstances, in many cases, a power company serves as the power provider. Accordingly, in this document, a power company is assumed to be the power provider. On the other hand, in great majority of cases, the power provided from the outside is purchased from the power company serving as the power provider under the present circumstances. However, in the future, an electrical transaction market may be invigorated, and power purchased in the power transaction market may become the mainstream of power provided from the outside. In such case, the local power management system 1 is considered to receive power provided from the power transaction system 7 as shown in FIG. 1.

The power transaction system 7 performs processings related to power transaction, such as receiving a sell order/a buy order in a power transaction market, calculation of a price upon order placement, settlement processing, and order of electric supply. In the example of FIG. 1, the power transaction system 7 performs reception of power for which an order has been placed in the power transaction market. Therefore, in the example of FIG. 1, according to the type of placed order, power is provided to the local power management system 1 from the power transaction system 7, or power is provided from the local power management system 1 to the power transaction system 7. The power management apparatus 11 is used to automatically or manually make an offer of an order to the power transaction system 7.

The power management system shown in FIG. 1 includes a plurality of local power management systems 1. As described above, each local power management system 1 has a power management apparatus 11. The plurality of power management apparatuses 11 can communicate with each other via the wide area network 2 or a secure communication path (not shown) to exchange information. Further, a mechanism may be arranged to provide power from one local power management system 1 to the other local power management system 1. In this case, control is performed as follows. The power management apparatuses 11 of both systems exchange information about reception of power with each other, and the amount of power appropriately determined in this information exchange is transmitted from one system to the other system.

The power management apparatus 11 may be configured to be operable by the external terminal apparatus 6 connected via the wide area network 2. For example, the user may want to use the terminal apparatus 6 to check the state of power of the local power management system 1 managed by the user. If the power management apparatus 11 is configured to be operable by the terminal apparatus 6 in this case, the user may cause the terminal apparatus 6 to display the state of power of the local power management system 1 managed by the user, which allows the user to check the state of power. Further, the user uses the terminal apparatus 6 to perform power transaction of the power management apparatus 11.

Alternatively, the terminal apparatus 6 may be arranged in the local power management system 1. In this case, the wide area network 2 is not used. Instead, the terminal apparatus 6 is connected to the power management apparatus 11 via the communication path in the local power management system 1. One of the advantages of the use of the terminal apparatus 6 is to save the user from visiting the location where the power management apparatus 11 is installed. In other words, in this case where the terminal apparatus 6 is available, the power management apparatus 11 can be operated from any location. Specific examples of the terminal apparatuses 6 include a portable telephone, a portable information terminal, a notebook computer, a portable game machine, a home information appliance, a facsimile machine, a fixed telephone, an audio/video apparatus, a car navigation system, an electric vehicle, and the like.

The power management performed by the power management system shown in FIG. 1 has been hereinabove explained briefly with operations and functions of each constituent element. However, the above power management apparatus 11 has not only the functions related to power management but also a function for providing various services to the user by making use of various kinds of information collected from the management target block 12 and the like.

Examples of information which can be collected by the power management apparatus 11 include a model number and an instrument ID (hereinafter referred to as instrument information) of each instrument, information about a profile of a user (hereinafter referred to as user information), information about a billing account, a credit card, and the like of a user (hereinafter referred to as billing information), registration information about a service to be used (hereinafter referred to as service information), and the like. The above instrument information is set in advance by each instrument or manually input by a user. In many cases, the user information, the billing information, and the service information are input by the user with the power management apparatus 11. It should be noted that the input method of the information is not limited to these examples and may be changed to any input method. In the explanation below, the instrument information, the user information, the billing information, and the service information are referred to as "initial information".

Further, examples of information which can be collected by the power management apparatus 11 include not only the initial information but also information about a specification of a battery connected to each instrument (hereinafter referred to as instrument battery information), information about the state (hereinafter referred to as instrument state information) of each instrument and the like (including the electrical storage means, the power generation means, the electric supply means, and the like), information which can be obtained from an external system and server connected to the wide area network 2 (hereinafter referred to as external information), and the like. Examples of instrument state information include the amount of electrical storage and a discharge voltage of the electrical storage means at a time point when information is collected, the amount of power generation and a power generation voltage of the power generation means, the amount of consumed power of each instrument, and the like. Examples of external information include a unit price of power obtained from the power transaction system 7 in a market, a list of available services obtained from the external server 3, and the like. In the explanation below, instrument battery information, instrument state information, external information are referred to as "primary information".

Further, the power management apparatus 11 can calculate secondary information using the initial information and the primary information, by itself or by using the function of the external server 3 (hereinafter referred to as "secondary information"). For example, the power management apparatus 11 analyzes the primary information, and calculates an index value (hereinafter referred to as balance index) representing a balance of a power provided from the power provider system 5, a power generated by the power generation means, a power charged/discharged by the electrical storage means, and a power consumed in the management target block 12. The power management apparatus 11 calculates a $CO_2$ reduction state and a billing state based on the amount of power consumption. Further, the power management apparatus 11 calculates the degree of wear (ratio of a period of service with respect to an expected lifetime and the like) of each instrument based on the initial information, and analyzes a life pattern of a user based on a time-series variation of power consumption.

Further, the power management apparatus 11 obtains various kinds of information (hereinafter referred to as "tertiary information") by performing calculation using the secondary information and exchanging information with a system and server connected to the wide area network 2 or another power management apparatus 11. For example, the power management apparatus 11 obtains information about the state and a price of a sell/buy order in the power transaction market (hereinafter referred to as market data), information about the amount of redundant power and the amount of insufficient power in a neighboring area (hereinafter referred to as local power information), information about an instrument suitable for a life pattern of a user in promoting efficient use of power (hereinafter referred to as instrument recommendation information), security information about computer virus and the like, and instrument risk information about malfunction of an instrument and the like.

The power management apparatus 11 can provide various services to a user by appropriately using the initial information, the primary information, the secondary information, and the tertiary information. On the other hand, the power management apparatus 11 stores important information about security of the local power management system 1 and privacy of the user. Moreover, the power management apparatus 11 is in charge of controlling permission and prohibition of power supply to the management target block 12. Therefore, the power management apparatus 11 needs to have a high level of security so as to cope with illegal activities in the local power management system 1 or attacks from the outside of the local power management system 1.

Examples of attacks to the power management apparatus 11 from the outside of the local power management system 1 include DoS attack (Denial of Service attack), a computer virus, and the like. Of course, a firewall is installed between the local power management system 1 and the wide area network 2. However, for the above reasons, stronger security measures are demanded. Examples of illegal activities in the local power management system 1 include illegal modification applied to the instruments and the electrical storage means, falsification of information, connection of an illegal instrument, and the like. Further, it may be preferable to take a measure to prevent information about power consumption reflecting a life pattern of a user from being used by a malicious third party, and to detect and recover malfunction (in some cases, fire and the like) of each instrument and the power management apparatus 11, in order to enhance the security level.

As explained later, the power management apparatus 11 has a function of achieving the high security level. Further, the power management apparatus 11 provides power management of the management target block 12 and provides services and the like based on the initial information, the primary information, the secondary information, and the tertiary information collected from the management target block 12, while maintaining this security level. The high security level of the power management apparatus 11 is not necessarily achieved by the power management apparatus 11 alone. Therefore, the instruments included in the management target block 12, the electrical storage means, the power generation means, the electric supply means, and the like ensure the security level in cooperation with the power management apparatus 11. It should be noted that the constituent elements of the management target block 12 will also be explained in detail later.

(1-2: Configuration of Management Target Block 12 (FIG. 2 to FIG. 4))

Figure 2:
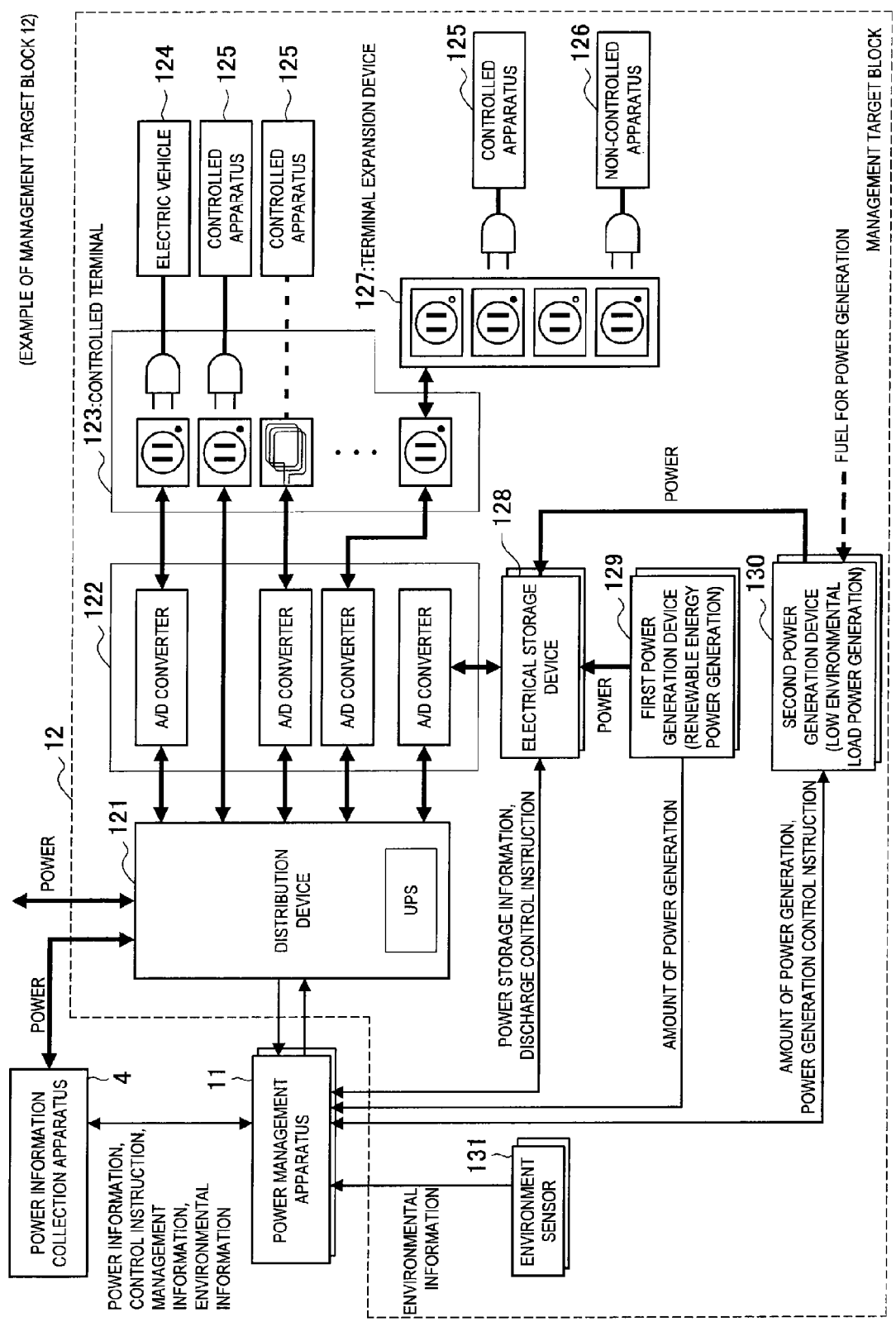
FIG. 2 is an explanatory diagram illustrating an entire configuration of a management target block.
Figure 3:
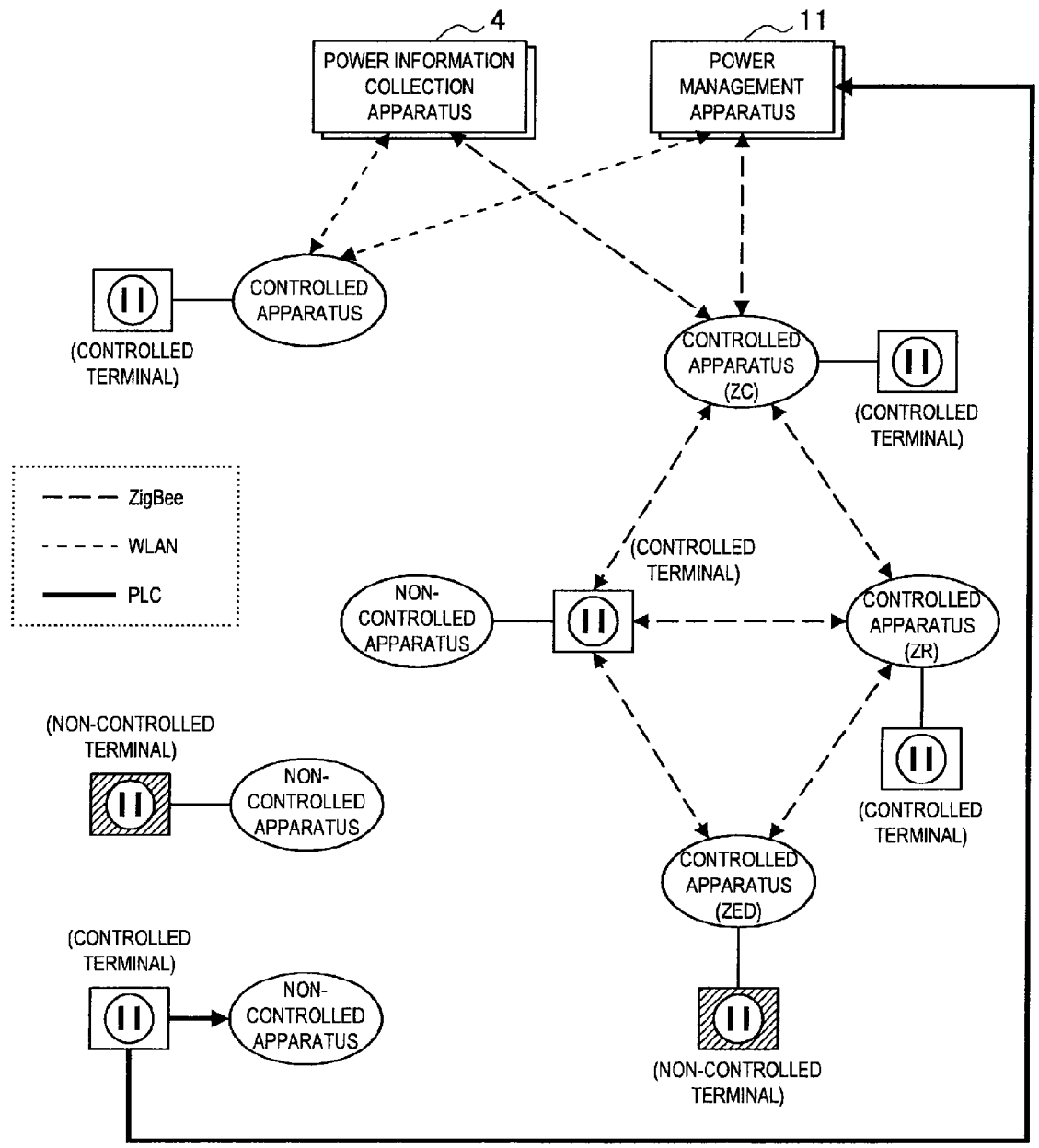
FIG. 3 is an explanatory diagram illustrating a communication network in a local power management system.
Figure 4:
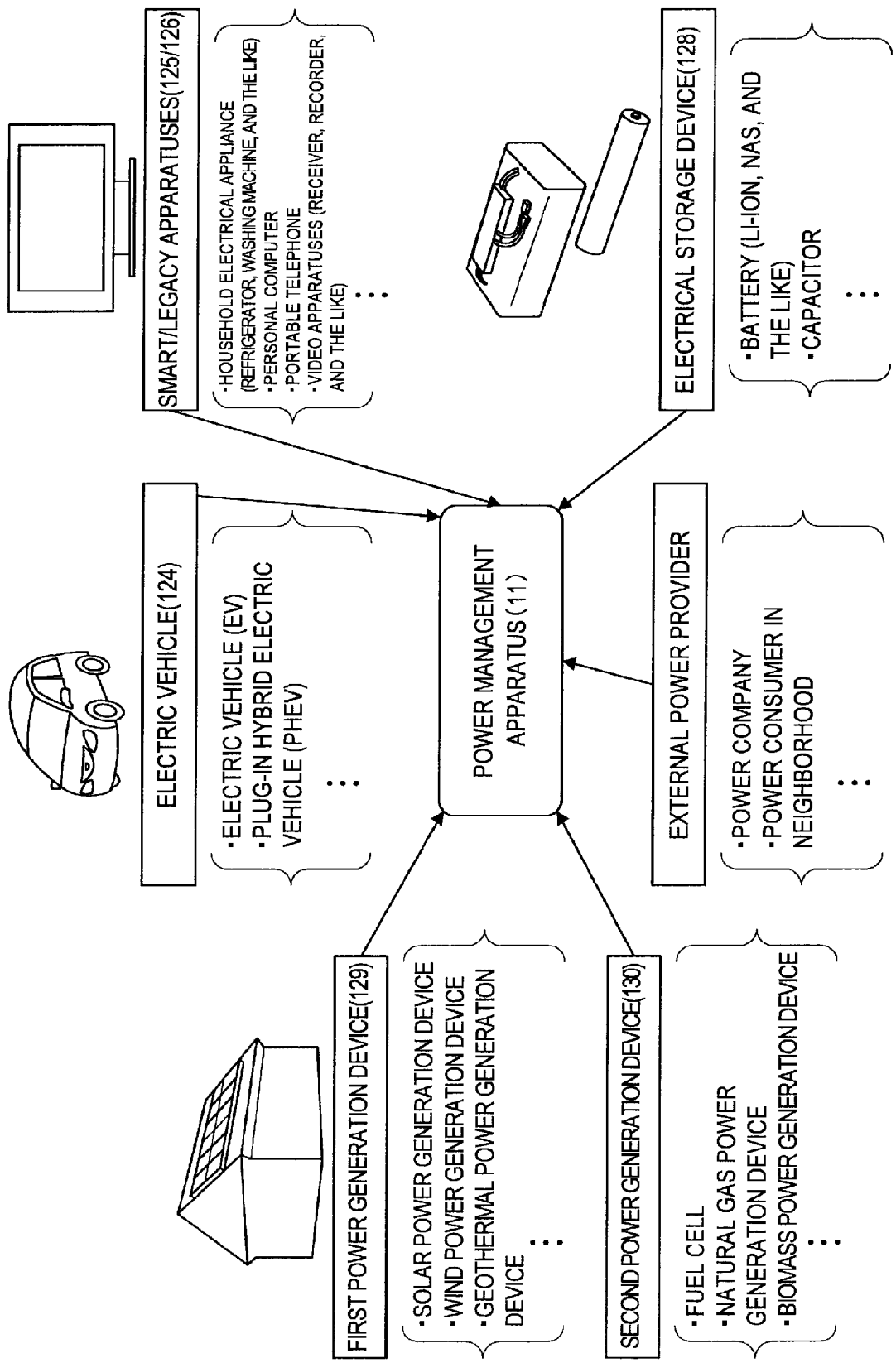
FIG. 4 is an explanatory diagram illustrating a system configuration of a power management apparatus and devices therearound.

Now, a configuration of the management target block 12 will be explained in detail with reference to FIG. 2 to FIG. 4. FIG. 2 illustrates a configuration of the management target block 12. FIG. 3 shows a configuration of the communication network in the management target block 12. FIG. 4 specifically illustrates a configuration of main constituent elements which exchange information with the power management apparatus 11.

First, FIG. 2 is referenced. As shown in FIG. 2, the management target block 12 includes a distribution device 121, an AC/DC converter 122, a controlled terminal 123, an electric vehicle 124, a controlled apparatus 125, a non-controlled apparatus 126, a terminal expansion device 127, an electrical storage device 128, a first power generation device 129, a second power generation device 130, and an environment sensor 131.

It should be noted that the controlled terminal 123, the electric vehicle 124, the controlled apparatus 125, and the terminal expansion device 127 are examples of the instruments. The electrical storage device 128 is an example of the electrical storage means. The first power generation device 129 and the second power generation device 130 are examples of the power generation means. However, the controlled terminal 123 and the terminal expansion device 127 are also examples of the electric supply means. It should be noted that the non-controlled apparatus 126 alone is not included in the instruments since the power management apparatus 11 is not capable of directly managing power of the non-controlled apparatus 126. However, as explained later, the power management apparatus 11 can manage the non-controlled apparatus 126 when it is combined with the terminal expansion device 127. In such case, the non-controlled apparatus 126 can be an example of the instrument.

(Flow of Electric Current)

The distribution device 121 receives power (hereinafter referred to as external power) provided from the power provider system 5, the power transaction system 7, or another local power management system 1. In the example of FIG. 2, the distribution device 121 is assumed to receive an AC external power. Alternatively, the distribution device 121 may be configured to receive a DC external power. In the explanation below, an AC external power is assumed to be input to the distribution device 121 for the sake of explanation. The external power input to the distribution device 121 is converted from AC to DC by the AC/DC converter 122, and is input to the controlled terminal 123 or the electrical storage device 128. It should be noted that the controlled terminal 123 may be arranged to directly receive an AC from the distribution device 121. In this case, the controlled apparatus 125 and the like driven by an AC may be used.

The distribution device 121 also receives a power output from the electrical storage device 128 (hereinafter referred to as discharge power). The discharge power output from the electrical storage device 128 is converted from DC to AC by the AC/DC converter 122, and is input to the distribution device 121. The AC discharge power received by the distribution device 121 is converted from AC to DC by the AC/DC converter 122, and is input to the controlled terminal 123. Alternatively, in order to avoid a loss of the discharge power in the AC/DC converter 122, the discharge power may be provided from the electrical storage device 128 to the controlled terminal 123 without passing through the AC/DC converter 122.

The electrical storage device 128 receives not only the external power input via the distribution device 121 but also power generated by the first power generation device 129 and the second power generation device 130 (hereinafter referred to as generated power). In the example of FIG. 2, the generated power generated by the first power generation device 129 and the second power generation device 130 is once stored in the electrical storage device 128. Alternatively, the generated power generated by the first power generation device 129 and the second power generation device 130 may be input to the AC/DC converter 122 and the controlled terminal 123 without passing through the electrical storage device 128. However, the generated power output from the first power generation device 129 may be affected by weather and environment and may become unstable. Therefore, when the generated power output from the first power generation device 129 is used, the generated power is preferably used after it is once stored in the electrical storage device 128.

The first power generation device 129 is power generation means for generating power using renewable energy. Examples of the first power generation devices 129 include a photovoltaic power generation device, a wind power generation device, a geothermal power generation device, a hydroelectric power generation device, and the like. On the other hand, the second power generation device 130 is power generation means for generating power by using nonrenewable energy producing a lower environmental load than a thermal power generation or the like which generates power by burning gasoline, coal, and the like and using the combustion. Examples of the second power generation device 130 include a fuel cell, a natural gas power generation device, a biomass power generation device, and the like. However, when hydrogen, i.e., a fuel for power generation in a fuel cell, is generated using power derived from renewable energy, the fuel cell serves as power generation means for generating power without using any nonrenewable energy.

The power stored in the electrical storage device 128 and the generated power generated by the first power generation device 129 and the second power generation device 130 are input to the controlled terminal 123 via the distribution device 121 and the AC/DC converter 122. In some cases, the stored power and the generated power may be purchased by the power provider system 5, the power transaction system 7, and the like. In this case, the discharge power output from the electrical storage device 128 and the generated power generated by the first power generation device 129 and the second power generation device 130 are converted from DC to AC by the AC/DC converter 122, and are sent to the power provider system 5, the power transaction system 7, and the like via the distribution device 121.

The flow of power in the management target block 12 has been roughly explained hereinabove. Particularly, the distribution channel of power flowing via the distribution device 121 has been explained here. As described above, the distribution device 121 is adapted to branch the distribution channel of power in the management target block 12. Therefore, when the distribution device 121 stops, power can no longer be distributed in the management target block 12. To solve this, the distribution device 121 is equipped with an Uninterruptible Power Supply (UPS). In the example of FIG. 2, the distribution device 121 is separately arranged from the power management apparatus 11, but the distribution device 121 and the power management apparatus 11 may be arranged in the same casing.

(Authentication During Power Supply)

The power flowing through the controlled terminal 123 and the electrical storage device 128 via the distribution device 121 in the management target block 12 is managed by the power management apparatus 11. For example, the power management apparatus 11 controls the distribution device 121 to supply power to the controlled terminal 123 and stops the supply of power to the controlled terminal 123.

Further, the power management apparatus 11 performs authentication of the controlled terminal 123. The power management apparatus 11 supplies power to a successfully authenticated controlled terminal 123, and stops the supply of power to an unsuccessfully authenticated controlled terminal 123. As described above, whether power can be supplied in the management target block 12 is determined based on whether authentication has been successfully performed or not by the power management apparatus 11. The authentication by the power management apparatus 11 is performed not only on the controlled terminal 123 but also on the electric vehicle 124, the controlled apparatus 125, and the terminal expansion device 127. However, a non-controlled apparatus 126 without any calculation function for authentication and any communication function for communicating with the power management apparatus 11 is not capable of being authenticated by the power management apparatus 11.

Therefore, the controlled terminal 123, the electric vehicle 124, the controlled apparatus 125, and the terminal expansion device 127 which have been successfully authenticated can receive power based on control of the power management apparatus 11. However, the non-controlled apparatus 126 incapable of being authenticated by itself is not capable of receiving power based on control of the power management apparatus 11. Therefore, regardless of the control of the power management apparatus 11, power is continuously supplied to the non-controlled apparatus 126 or no power is supplied at all. However, if the terminal expansion device 127 performs authentication on behalf of the power management apparatus 11, the non-controlled apparatus 126 can receive power based on the control of the power management apparatus 11.

(Explanation About Instrument Functions)

Now, the functions of the controlled terminal 123, the electric vehicle 124, the controlled apparatus 125, the non-controlled apparatus 126, and the terminal expansion device 127 will be briefly explained in an organized manner.

(Controlled Terminal 123)

First, the functions of the controlled terminal 123 will be explained in an organized manner. The controlled terminal 123 has terminals for connecting power plugs of the electric vehicle 124, the controlled apparatus 125, the non-controlled apparatus 126, and the terminal expansion device 127. The controlled terminal 123 has a function of supplying power provided from the distribution device 121 to the electric vehicle 124, the controlled apparatus 125, the non-controlled apparatus 126, and the terminal expansion device 127 connected to the terminal. In other words, the controlled terminal 123 has a function of an electric supply terminal.

In addition, the controlled terminal 123 has various functions for authentication performed by the power management apparatus 11. For example, the controlled terminal 123 has a communication function for exchanging information with the power management apparatus 11. This communication function is achieved by a wire communication using a power line or a signal line or by arranging a radio communication module in the controlled terminal 123. In addition, the controlled terminal 123 has a calculation function for executing calculation performed during authentication. Further, the controlled terminal 123 stores identification information such as an instrument ID and key information for authentication. By using these functions and information, the power management apparatus 11 can authenticate the controlled terminal 123. The type of authentication may be mutual authentication using a common key, or may be a public key authentication using a pair of a secret key and a public key.

Further, the controlled terminal 123 has state display means for displaying whether the authentication has succeeded or not and the state during authentication performed by the power management apparatus 11 (hereinafter referred to as authentication state). In this case, the state display means arranged on the controlled terminal 123 may display the authentication state of the electric vehicle 124, the controlled apparatus 125, and the terminal expansion device 127 connected to the controlled terminal 123. In addition, this state display means may indicate whether an instrument connected to the controlled terminal 123 is a non-controlled apparatus 126 or not. It should be noted that this state display means is made of, for example, a display lamp such as an LED and a small light valve or a display device such as an LCD and an ELD.

As described above, the controlled terminal 123 which has been successfully authenticated by the power management apparatus 11 receives power via the distribution device 121 according to control of the power management apparatus 11. On the other hand, the power management apparatus 11 stops the power supplied to the controlled terminal 123 which has been unsuccessfully authenticated. Therefore, the electric supply is controlled according to whether authentication is successful or not, whereby an illegal electric supply terminal is prevented from being connected to the distribution device 121. Moreover, an electric supply terminal illegally connected to the distribution device 121 can be easily detected. Further, when the state display means is arranged on the controlled terminal 123, the authentication state of the controlled terminal 123 can be easily recognized, which allows easily distinguishing a failure of authentication and a malfunction of the controlled terminal 123 from each other.

It should be noted that the shape of the controlled terminal 123 is not limited to the shape of outlet for connecting a power plug. For example, a controlled terminal 123 may be configured, like reader/writer for a noncontact IC card, to have a surface shape without any shape of outlet and include a coil for supplying power using electromagnetic induction. Like a noncontact IC card, in this case, the electric vehicle 124, the controlled apparatus 125, and the terminal expansion device 127 may include a coil for generating an induced electromotive force from a magnetic field generated by the controlled terminal 123. With this configuration, power can be exchanged without using any power plug. In the configuration using electromagnetic induction, modulation of a magnetic field may be used to exchange information between the controlled terminal 123, the electric vehicle 124, the controlled apparatus 125, or the terminal expansion device 127.

In addition, the controlled terminal 123 has a function of measuring the amount of power supplied to the electric vehicle 124, the controlled apparatus 125, and the terminal expansion device 127 connected to the terminal. The controlled terminal 123 also has a function of transmitting the amount of measured power to the power management apparatus 11. The controlled terminal 123 may also have a function of obtaining the primary information from the electric vehicle 124, the controlled apparatus 125, and the terminal expansion device 127 connected to the terminal, and transmitting the obtained primary information to the power management apparatus 11. As described above, the information measured or obtained by the controlled terminal 123 is sent to the power management apparatus 11, whereby the power management apparatus 11 can recognize the state of power in units of controlled terminals 123 and can perform electric supply control of power.

(Electric Vehicle 124)

Subsequently, the functions of the electric vehicle 124 will be explained in an organized manner. The electric vehicle 124 has a battery for storing power. In addition, the electric vehicle 124 has a drive mechanism for driving the electric vehicle 124 using power discharged from the battery. In a case where the electric vehicle 124 is an electric vehicle or a plug-in hybrid vehicle, this drive mechanism includes, for example, a motor, gears, a shaft, wheels, tires, and the like. A drive mechanism of other electric vehicles 124 includes at least a motor. In addition, the electric vehicle 124 has a power plug used to charge the battery. When this power plug is connected to the controlled terminal 123, the electric vehicle 124 can receive power. However, in a case where the controlled terminal 123 supplies power using electromagnetic induction, the electric vehicle 124 has a coil for receiving magnetic field and generating induced electromotive force.

In addition, the electric vehicle 124 has various functions for authentication performed by the power management apparatus 11. For example, the electric vehicle 124 has a communication function for exchanging information with the power management apparatus 11. This communication function is achieved by a wire communication using a power line or a signal line or by arranging a radio communication module in the electric vehicle 124. In addition, the electric vehicle 124 has a calculation function for executing calculation used during authentication. Further, the electric vehicle 124 stores identification information such as an instrument ID and key information for authentication. By using these functions and information, the power management apparatus 11 can authenticate the electric vehicle 124. The type of authentication may be mutual authentication using a common key, or may be a public key authentication using a pair of a secret key and a public key.

In addition, the electric vehicle 124 has a function of transmitting, to the power management apparatus 11, the instrument battery information about the installed battery such as the amount of remaining power in the battery, the amount of charged power, and the amount of discharged power. In addition, user information about a user who owns the electric vehicle 124 and instrument information about a fuel consumption, a performance, and the like of the electric vehicle 124 are transmitted to the power management apparatus 11. The above information is transmitted from the electric vehicle 124 to the power management apparatus 11, which enables the power management apparatus 11 to perform billing processing using the user information and billing processing based on the user information and the instrument information. For example, the power management apparatus 11 can perform billing processing of an environmental tax calculated based on the amount of $CO_2$ emission and display processing of an expected cruising range based on the amount of remaining power in the battery.

There is also a plan for using the battery of the electric vehicle 124 in place of the electrical storage device 128. For example, in a case where the electrical storage device 128 is temporarily out of service, for example, where the electrical storage device 128 has a fault or is being replaced, the battery of the electric vehicle 124 may be used instead of the electrical storage device 128. Moreover, the electric vehicle 124 is movable by itself, and therefore, the electric vehicle 124 can physically carry external power. In other words, the electric vehicle 124 can be used as a movable electrical storage device 128. Because of such advantage, it may be useful to use the electric vehicle 124 as a backup power supply in case of disaster and emergency. Of course, such use may be achieved in the framework of the local power management system 1 according to the present embodiment.

(Controlled Instrument 125)

Subsequently, the functions of the controlled apparatus 125 will be explained in an organized manner. The controlled apparatus 125 has various functions for authentication performed by the power management apparatus 11. For example, the controlled apparatus 125 has a communication function for exchanging information with the power management apparatus 11. This communication function is achieved by a wire communication using a power line or a signal line or by arranging a radio communication module in the controlled apparatus 125. In addition, the controlled apparatus 125 has a calculation function for executing calculation used during authentication. Further, the controlled apparatus 125 stores identification information such as an instrument ID and key information for authentication. By using these functions and information, the power management apparatus 11 can authenticate the controlled apparatus 125. The type of authentication may be mutual authentication using a common key, or may be a public key authentication using a pair of a secret key and a public key.

In addition, the controlled apparatus 125 has a function of transmitting, to the power management apparatus 11, the instrument battery information about the installed battery such as the amount of remaining power in the battery, the amount of charged power, and the amount of discharged power. In addition, user information about a user who owns the controlled apparatus 125 and instrument information about a type, a performance, and the like of the controlled apparatus 125 are transmitted to the power management apparatus 11. The above information is transmitted from the controlled apparatus 125 to the power management apparatus 11, which enables the power management apparatus 11 to perform billing processing using the user information and billing processing based on the user information and the instrument information. For example, the power management apparatus 11 can perform billing processing of an environmental tax calculated based on the amount of $CO_2$ emission and display processing for recommending an instrument having a higher environmental performance.

(Non-Controlled Apparatus 126 and Terminal Expansion Device 127)

Subsequently, the functions of the non-controlled apparatus 126 and the terminal expansion device 127 will be explained in an organized manner. The non-controlled apparatus 126 is different from the controlled terminal 123, the electric vehicle 124, and the controlled apparatus 125 in that the non-controlled apparatus 126 does not have any function for authentication performed by the power management apparatus 11. In other words, the non-controlled apparatus 126 is a home electrical appliance, a video apparatus, or the like. As described above, the non-controlled apparatus 126 which is not authenticated is incapable of being subjected to the power management performed by the power management apparatus 11, and in some cases, the non-controlled apparatus 126 is incapable of receiving power. Therefore, means for performing authentication on behalf of the power management apparatus 11 is necessary to make the non-controlled apparatus 126 available in the local power management system 1.

The terminal expansion device 127 plays two roles. One is a function for performing authentication on behalf of the power management apparatus 11 in order to make the non-controlled apparatus 126 available in the local power management system 1. The other is a function for increasing the number of instruments connected to the controlled terminal 123. The terminal expansion device 127 has one or a plurality of terminals for connecting power plugs of the electric vehicle 124, the controlled apparatus 125, and the non-controlled apparatus 126. When the terminal expansion device 127 having a plurality of terminals is used, a larger number of electric vehicles 124, controlled apparatuses 125, and non-controlled apparatuses 126 can be connected to the controlled terminal 123. In other words, the terminal expansion device 127 serves as a power supply tap having an advanced function.

The functions of the controlled terminal 123, the electric vehicle 124, the controlled apparatus 125, the non-controlled apparatus 126, and the terminal expansion device 127 have been hereinabove briefly explained in an organized manner. However, the functions explained above are not all of the functions of the controlled terminal 123, the electric vehicle 124, the controlled apparatus 125, the non-controlled apparatus 126, and the terminal expansion device 127. These functions are adopted as a basis, and further, later-explained functions for operation of the power management performed by the power management apparatus 11 are added.

(Communication Function)

The communication functions of the power management apparatus 11, the controlled terminal 123, the electric vehicle 124, the controlled apparatus 125, the terminal expansion device 127, and the like in the local power management system 1 will be explained with reference to FIG. 3. As shown in FIG. 3, in the local power management system 1, for example, Near Field Communication, wireless LAN, power line communication, and the like are used. For example, ZigBee is an example of Near Field Communication. PLC is an example of power line communication.

As shown in FIG. 2, in the local power management system 1, the distribution device 121 is connected via a power line to the controlled terminal 123 and the instruments connected to the controlled terminal 123. Therefore, by using the power line, the communication network can be easily structured by power line communication. On the other hand, when Near Field Communication is used, a communication network can be easily structured by connecting each apparatus in an ad-hoc manner as shown in FIG. 3. When wireless LAN is used, each instrument can be directly connected to the power management apparatus 11. Therefore, necessary communication network can be structured in the local power management system 1 by using any of the above communication methods.

However, as shown in FIG. 3, in some cases, the non-controlled apparatus 126 may not be connected to the power management apparatus 11 by using the communication network. Therefore, when the non-controlled apparatus 126 is used, it is necessary to connect the non-controlled apparatus 126 to the terminal expansion device 127. Even when a non-controlled terminal without any communication function or any authentication function is used, connection to the power management apparatus 11 can be made via the communication network by using the functions of the electric vehicle 124, the controlled apparatus 125, and the terminal expansion device 127 by connecting the electric vehicle 124, the controlled apparatus 125, and the terminal expansion device 127 to the non-controlled terminal. Of course, if the non-controlled apparatus 126 is connected to the non-controlled terminal, connection to the network is not made, and therefore, the non-controlled apparatus 126 is not controlled by the power management apparatus 11.

As shown in FIG. 3, the communication network structured in the local power management system 1 may include the power information collection apparatus 4 as a destination of connection. Further, by using this communication network, the electric vehicle 124 and the controlled apparatus 125 may exchange information with the power information collection apparatus 4. Of course, by using this communication network, the power management apparatus 11 and the power information collection apparatus 4 may exchange information. As described above, the communication network structured in the local power management system 1 may be configured according to an aspect of embodiment. However, the communication network is expected to be structured with a sufficiently secure communication path. Further, a mechanism is expected to be arranged to ensure the safety of information flowing in the communication path.

(Specific Example of Instruments and Various Kinds of Apparatuses)

Now, specific examples of some constituent elements of the local power management system 1 will be introduced with reference to FIG. 4. As shown in FIG. 4, examples of constituent elements which may exchange information with the power management apparatus 11 include the electric vehicle 124, the controlled apparatus 125 (smart instrument), the non-controlled apparatus 126 (legacy instrument), the electrical storage device 128, the first power generation device 129, the second power generation device 130, and the like.

Specific examples of the electric vehicle 124 include an electric vehicle or a plug-in hybrid vehicle. Specific examples of the controlled apparatus 125 and non-controlled apparatus 126 include a home electrical appliance, a personal computer, a portable telephone, a video apparatus, and the like. Specific examples of the electrical storage device 128 include a Li-Ion battery, a NAS battery, a capacitor, and the like. Further, specific examples of the first power generation device 129 include a photovoltaic power generation device, a wind power generation device, a geothermal power generation device, and the like. Examples of the second power generation device 130 include a fuel cell, a natural gas power generation device, a biomass power generation device, and the like. As described above, various apparatuses and instruments are used as constituent elements of the local power management system 1.

The management target block 12 has been hereinabove explained. However, the functions of the constituent elements included in the management target block 12 are not limited to what has been explained here. In the power management of the power management apparatus 11, the functions of the constituent elements are added as necessary. The additional functions of the constituent elements will be explained in detail together with an explanation about the configuration of the power management apparatus 11 and other constituent elements, which will be explained later.

(1-3: Configuration of External Server 3 (FIG. 5, FIG. 6))

Figure 5:
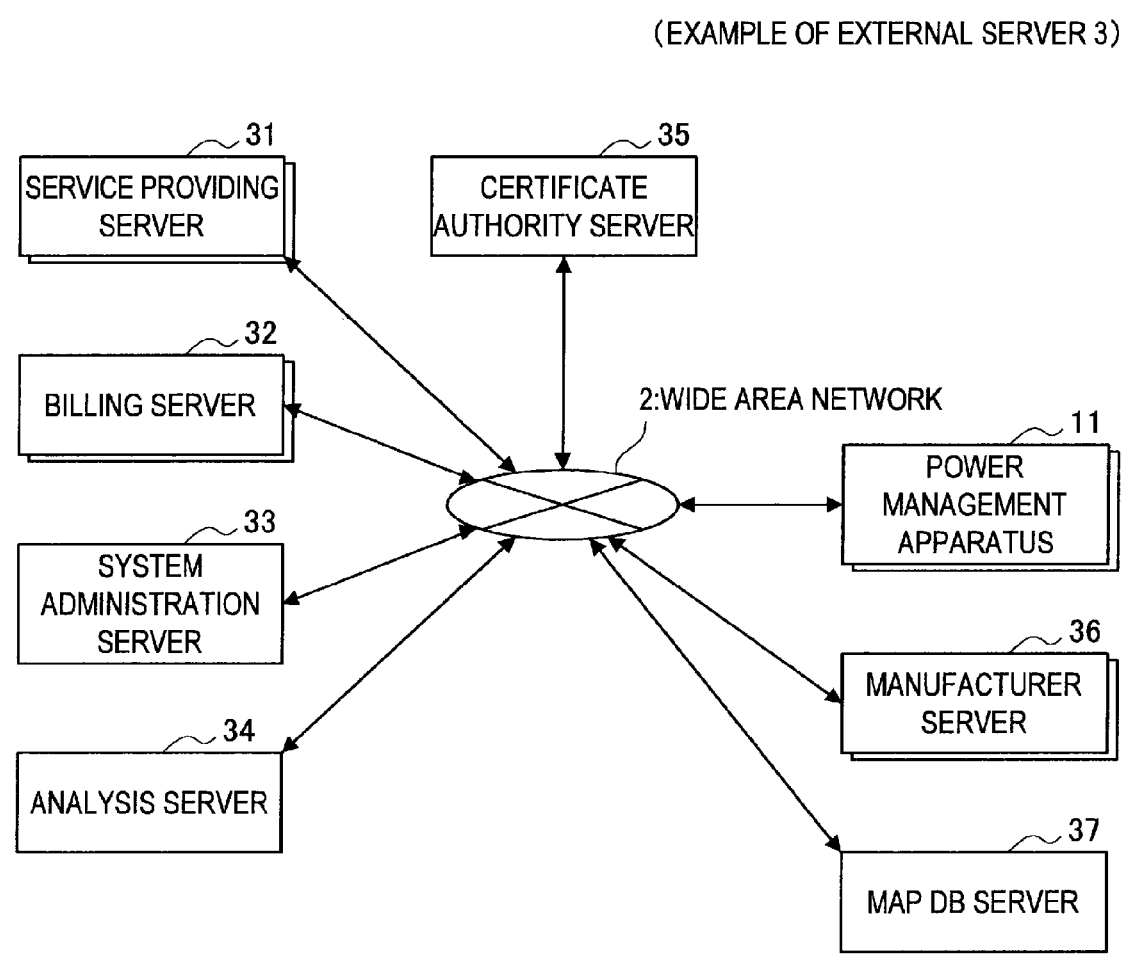
FIG. 5 is an explanatory diagram illustrating a specific example of an external server.

Subsequently, a configuration of the external server 3 will be explained with reference to FIG. 5. As shown in FIG. 5, examples of the external server 3 include a service providing server 31, a billing server 32, a system administration server 33, an analysis server 34, a certificate authority server 35, a manufacturer server 36, a map DB server 37, and the like.

The service providing server 31 has a function of providing a service using the functions of the power management apparatus 11 and the like. The billing server 32 has a function of providing billing information to the power management apparatus 11 and requesting a user to settle a usage fee, according to power consumed in the local power management system 1 based on information about the amount of power managed by the power management apparatus 11. Further, the billing server 32 co-operates with the service providing server 31, and carries out billing processing for a service used by the user. It should be noted that the billing processing may be performed on a user who owns the electric vehicle 124, the controlled apparatus 125, and the like which have consumed power, or may be performed on a user of the power management apparatus 11 which manages information about consumed power.

The system administration server 33 has a function of managing the entire power management system as shown in FIG. 1 or managing the power management system in units of regions. For example, as shown in FIG. 6, the system administration server 33 recognizes the state of use by a user #1 in the local power management system 1, the state of use by a user #2 in the local power management system 1, and the state of use by a user #3 in the local power management system 1, and provides necessary information to the billing server 32 and the like.

Figure 6:
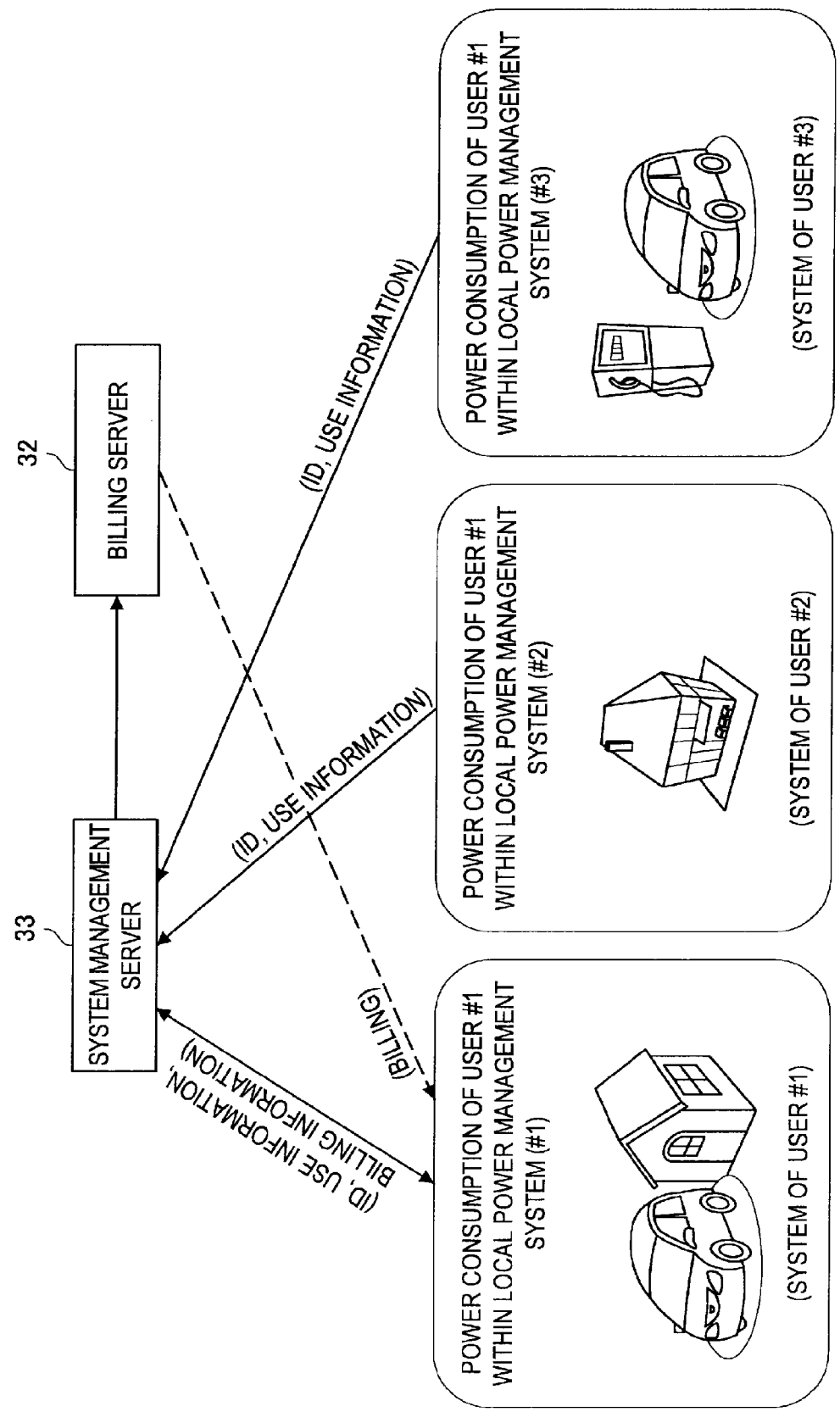
FIG. 6 is an explanatory diagram illustrating functions of a system management server.

In the example of FIG. 6, the user #1 uses power in the local power management system 1 of the user #1 himself, the user #2, and the user #3. In this case, an instrument ID, usage information (the amount of power consumption and the like) of the user #1 who has consumed power are collected by the system administration server 33, and the user information and the usage information of the user #1 are transmitted from the system administration server 33 to the billing server 32. Further, the system administration server 33 calculates billing information (billed amount and the like) based on the collected usage information, and provides the billing information to the user #1. On the other hand, the billing server 32 charges the user #1 a price corresponding to the billing information.

As described above, the system administration server 33 centrally controls a plurality of local power management systems 1. Therefore, even when a user uses power in a local power management system 1 of another user, the system administration server 33 provides a mechanism for charging the user who has used the power. Particularly, in many cases, the electric vehicle 124 is used outside of the local power management system 1 managed by the user. In such case, by using the above function of the system administration server 33, the system administration server 33 can reliably charge the user of the electric vehicle 124.

The analysis server 34 has a function of analyzing information held in another server connected to the wide area network 2 or information collected by the power management apparatus 11. For example, when electric supply control in units of regions is optimized, information collected from each local power management system 1 is enormous, and it is necessary to process a large amount of calculation in order to analyze the information and calculate an optimum control method for each local power management system 1. Since such calculation imposes a heavy load on the power management apparatus 11, the calculation is carried out using the analysis server 34. It should be noted that the analysis server 34 can also be used for various other calculation processings. The certificate authority server 35 authenticates a public key and issues a public key certificate.

The manufacturer server 36 is managed by a manufacturer of an instrument. For example, a manufacturer server 36 of the electric vehicle 124 stores information about the design of the electric vehicle 124. Likewise, a manufacturer server 36 of the controlled apparatus 125 stores information about the design of the controlled apparatus 125. Further, the manufacturer server 36 stores information for specifying each of the manufactured instruments such as the electric vehicles 124 and the controlled apparatuses 125. The manufacturer server 36 has a function of using the above information and cooperating with the power management apparatus 11 to identify the electric vehicles 124 and the controlled apparatuses 125 installed in each of the local power management systems 1. By using this function, the power management apparatus 11 can authenticate the electric vehicles 124 and the controlled apparatuses 125, and can detect connection of an illegal instrument.

The map DB server 37 stores a map database. Therefore, the power management apparatus 11 and servers connected to the wide area network 2 can access the map DB server 37 to use the map database. For example, when a user uses power outside of the local power management system 1 of the user, the system administration server 33 can search the map database for the location where the user used the power, and can provide the user with the billing information as well as the information about the location where the user used the power. As described above, there are various kinds of external servers 3, and a different type of external server 3 other than the server configurations described here as examples may be added as necessary.

<2: Configuration of Power Management Apparatus 11 (FIG. 7 to FIG. 9)>

The overview of the power management system according to the present embodiment has been hereinabove explained. Hereinafter, a configuration of the power management apparatus 11 mainly in charge of power management in the power management system will be explained with reference to FIG. 7 to FIG. 9.

(2-1: Overview of Functions)

Figure 7:
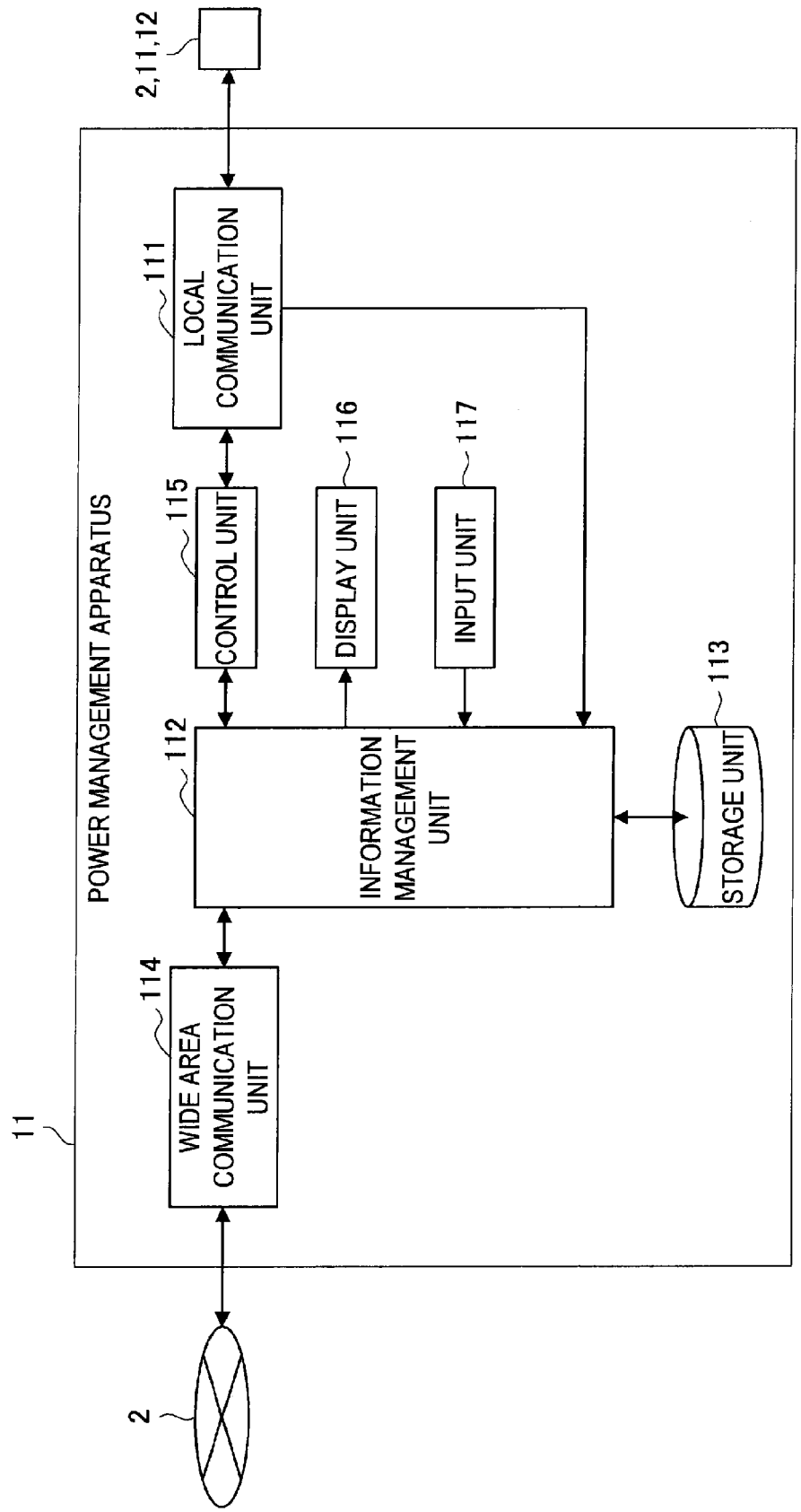
FIG. 7 is an explanatory diagram illustrating a functional configuration of the power management apparatus.

First, an overall functional configuration of the power management apparatus 11 will be explained with reference to FIG. 7. As shown in FIG. 7, the power management apparatus 11 includes a local communication unit 111, an information management unit 112, a storage unit 113, a wide area communication unit 114, a control unit 115, a display unit 116, and an input unit 117.

The local communication unit 111 is communication means for communicating via a communication network structured in the local power management system 1. The information management unit 112 is means for managing information about power and instrument information about each constituent element included in the local power management system 1. The information management unit 112 performs authentication processing of the controlled terminal 123, the electric vehicle 124, the controlled apparatuses 125, the terminal expansion device 127, and the like. The storage unit 113 is storage means for storing information used for power management and information used for authentication. The wide area communication unit 114 is communication means for exchanging information with servers and systems arranged outside via the wide area network 2.

The control unit 115 is control means for controlling operation of each constituent element included in the local power management system 1. The display unit 116 is display means for displaying information about power consumption in the local power management system 1, user information, billing information, information about other power management, information about power management outside of the local power management system 1, information about power transaction, and the like. For example, an LCD and an ELD are used as the display means. The input unit 117 is input means with which a user inputs information. Examples of the input unit 117 include a keyboard and buttons. Alternatively, the display unit 116 and the input unit 117 may be combined to constitute a touch panel.

As described above, the power management apparatus 11 has communication means (the local communication unit 111 and the wide area communication unit 114) for exchanging information with instruments, apparatuses, systems, servers, and the like arranged in and out of the local power management system 1. Further, the power management apparatus 11 has control means (the control unit 115) for controlling instruments and apparatuses in the local power management system 1. In addition, the power management apparatus 11 has information management means (information management unit 112) for collecting information from instruments, apparatuses, systems, servers, and the like arranged in and out of the local power management system 1, providing services by using the collected information, and authenticating instruments and apparatuses in the local power management system 1. The power management apparatus 11 also has displays means (display unit 116) for displaying information about power in and out of the local power management system 1.

First, instruments, apparatuses, and the like in the local power management system 1 need to be correctly identified in order to safely and efficiently perform power management in the local power management system 1. On the other hand, appropriate power control needs to be performed by analyzing information about power in and out of the local power management system 1 in order to perform safe and efficient power management in the local power management system 1. In the information management performed in response to these requests, the functions of the information management unit 112 are used. Now, the functions of the information management unit 112 will be explained in further detail. It should be noted that the functions of the control unit 115 are used to specifically control instruments, apparatuses, and the like.

(2-2: Details of Functions)

Figure 8:
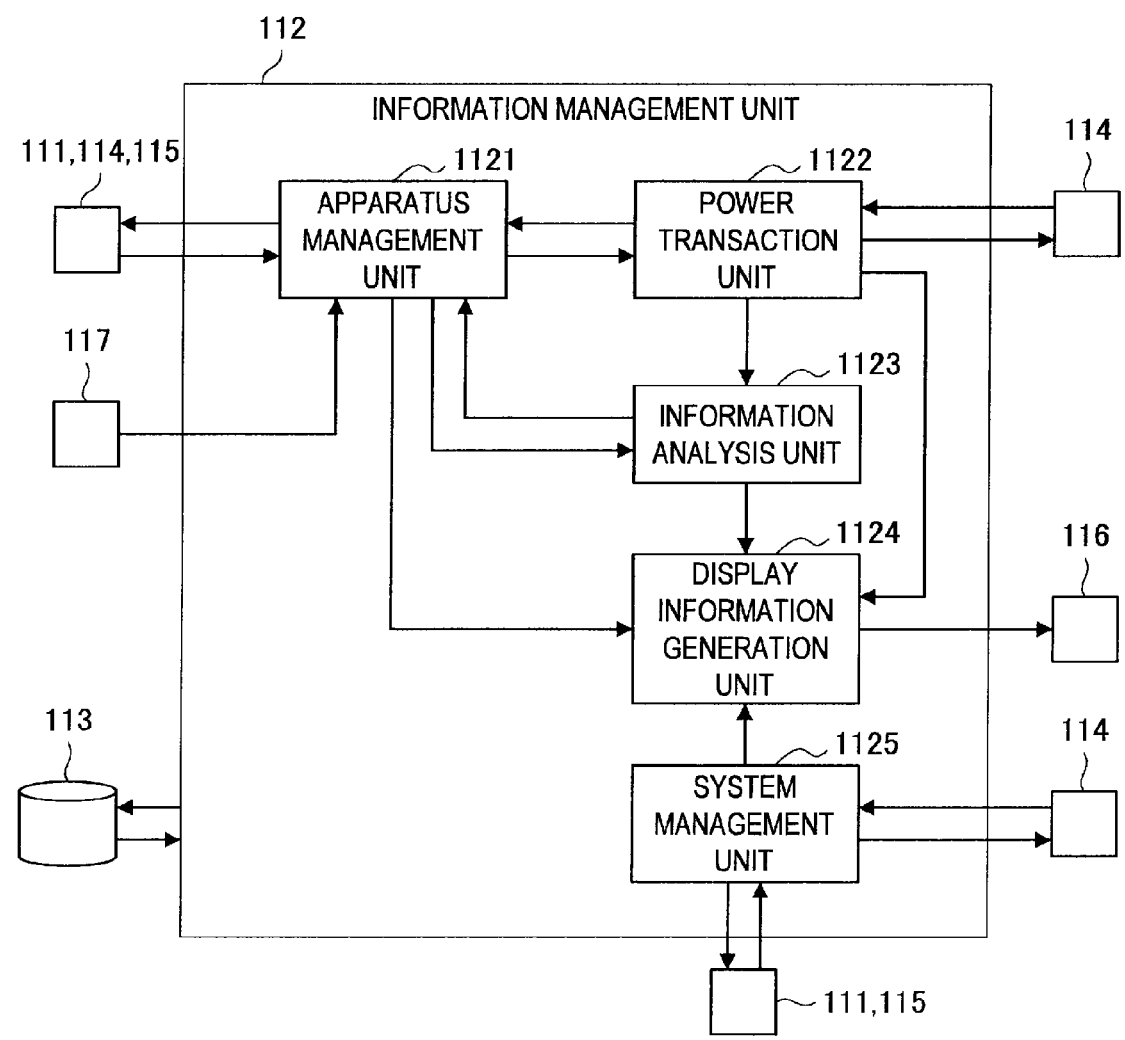
FIG. 8 is an explanatory diagram illustrating a detailed functional configuration of an information management unit.

The functional configuration of the information management unit 112 will be hereinafter explained in further detail with reference to FIG. 8 and FIG. 9. FIG. 8 illustrates detailed functional configuration of the information management unit 112. FIG. 9 illustrates main functions of each constituent element of the information management unit 112.

As shown in FIG. 8, the information management unit 112 includes an apparatus management unit 1121, a power transaction unit 1122, an information analysis unit 1123, a display information generation unit 1124, and a system management unit 1125.

(Apparatus Management Unit 1121)

As shown in FIG. 9, the apparatus management unit 1121 is means for managing instruments, apparatuses, and the like in the local power management system 1. For example, the apparatus management unit 1121 performs registration, authentication, management of an instrument ID, management of operation settings and service settings, keeping track of operation state and use state, collection of environmental information, and the like, with respect to the controlled terminal 123, the electric vehicle 124, the controlled apparatuses 125, terminal expansion device 127, and the like. The environmental information is collected using the environment sensor 131 installed in the management target block 12. However, the environmental information includes information about temperature, humidity, weather, wind direction, wind velocity, topography, area, weather forecast, and the like and information obtained by analyzing the above information.

(Power Transaction Unit 1122)

As shown in FIG. 9, the power transaction unit 1122 performs acquisition of market transaction data and individual transaction data in an electronic power market, control of timing as to transaction execution, execution of transaction, management of buying and selling logs, and the like. The market transaction data are information about transaction prices and transaction conditions in the power transaction market. The individual transaction data include information about a transaction price and transaction conditions determined during an individual power transaction between a power provider and a consumer of power in the neighborhood. The control of timing as to transaction execution means, for example, an automatic control in which a buy order for a predetermined number is placed when a power purchase price is less than a predetermined value, and a sell order for a predetermined number is placed when a power selling price is more than a predetermined value.

(Information Analysis Unit 1123)

As shown in FIG. 9, the information analysis unit 1123 performs analysis of power generation data, analysis of electrical storage data, learning of a life pattern, and analysis of power consumption data. Further, based on the above analyses, the information analysis unit 1123 predicts a consumed power pattern, an electrical storage pattern, a discharge pattern, and a power generation pattern. For example, the analyses and learning by the information analysis unit 1123 are performed using time-series data of the amount of power generation by the first power generation device 129 and the second power generation device 130 in the local power management system 1, time-series data of the amount of electrical storage or the amount of charging/discharging of the electrical storage device 128, or time-series data of the amount of power provided by the power provider system 5.

The prediction by the information analysis unit 1123 is performed using, as learning data, the time-series data or analysis data obtained by analyzing time-series data and using a prediction formula obtained based on a predetermined machine learning algorithm. For example, a prediction formula can be automatically prepared using a genetic learning algorithm (for example, Japanese Patent Application Laid-Open No. 2009-48266). Then, a prediction result can be obtained by inputting the time-series data or the analysis data of the past into this prediction formula. Further, time-series data can be predicted by sequentially inputting the calculated prediction results into the prediction formula.

Further, the information analysis unit 1123 calculates the amount of $CO_2$ emission at the present time and in the future, a power supply pattern (power saving pattern) for reducing the amount of consumed power, a power supply pattern (low $CO_2$ emission pattern) for reducing the amount of $CO_2$ emission and the amount of consumed power in the local power management system 1, and calculates and recommends an instrument configuration, an instrument arrangement, and the like capable of reducing the amount of $CO_2$ emission. The amount of $CO_2$ emission is calculated based on the total amount of power consumptions or the amount of power consumption of each of power generation methods.

When the total amount of power consumptions is used, an approximate average amount of $CO_2$ emission is calculated. On the other hand, when the amount of power consumption of each of power generation methods is used, a relatively accurate amount of $CO_2$ emission is calculated. Compared with the case where the total amount of power consumptions is used, more accurate amount of $CO_2$ emission can be calculated by distinguishing at least the power provided from the outside, the power generated by the first power generation device 129, and the power generated by the second power generation device 130. In many cases, taxes and charges such as a carbon tax are determined according to the amount of $CO_2$ emission. Therefore, accurate calculation of the amount of $CO_2$ emission is considered to improve a sense of fairness among users, and contribute to promotion of power generation means derived from renewable energy.

(Display Information Generation Unit 1124)

As shown in FIG. 9, the display information generation unit 1124 generates display information for displaying, on the display unit 116 in a formatted manner, information about instruments, apparatuses, and the like in the local power management system 1, information about power, information about environment, information about power transaction, information about prediction result and analysis result obtained by the information analysis unit 1123, and the like. For example, the display information generation unit 1124 generates display information for displaying information representing the amount of power in a graph format, and generates display information for displaying market data in a table format. Further, the display information generation unit 1124 generates a graphical user interface (GUI) used for displaying various kinds of information and inputting information. The above display information generated by the display information generation unit 1124 is displayed on the display unit 116.

(System Management Unit 1125)

As shown in FIG. 9, the system management unit 1125 performs version management, updating processing, access restriction, virus protection, and the like of a firmware, i.e., a program for controlling basic operation of the power management apparatus 11. When a plurality of power management apparatuses 11 are arranged in the local power management system 1, the system management unit 1125 exchanges information with another power management apparatus 11, and performs control so that the plurality of power management apparatuses 11 operate in synchronization. For example, the system management unit 1125 manages attributes of each power management apparatus 11 (the degree of priority of control processing of instruments, apparatuses, and the like). Further, the system management unit 1125 controls the state of each power management apparatus 11 so as to join the synchronized operation or withdraw from the synchronized operation.

The functional configuration of the power management apparatus 11 has been hereinabove explained. It should be noted that the functional configuration of the power management apparatus 11 shown here is merely an example, and functions other than the above can be added as necessary.

<3: Display Contents and Display Method of Display Unit 116 (FIG. 10 to FIG. 17)>

Now, the display contents and the display method of the display unit 116 will be explained with reference to FIG. 10 to FIG. 17. As described above, the power management apparatus 11 manages various kinds of information about systems, servers, instruments, and the like, which are arranged in and out of the local power management system 1. Accordingly, a display method is desired to reliably allow a user to quickly understand necessary information when the display unit 116 on the power management apparatus 11 displays information. In the explanation below, a display method for allowing a user to easily understand the configuration and the state of instruments and the like arranged in the local power management system 1 and a display method for allowing a user to easily understand the amount of consumed power will be proposed.

(3-1: Display of System Configuration)

First, a display method for allowing a user to easily understand the configuration and the state of instruments and the like arranged in the local power management system 1 will be explained with reference to FIG. 10 to FIG. 13.

Figure 10:
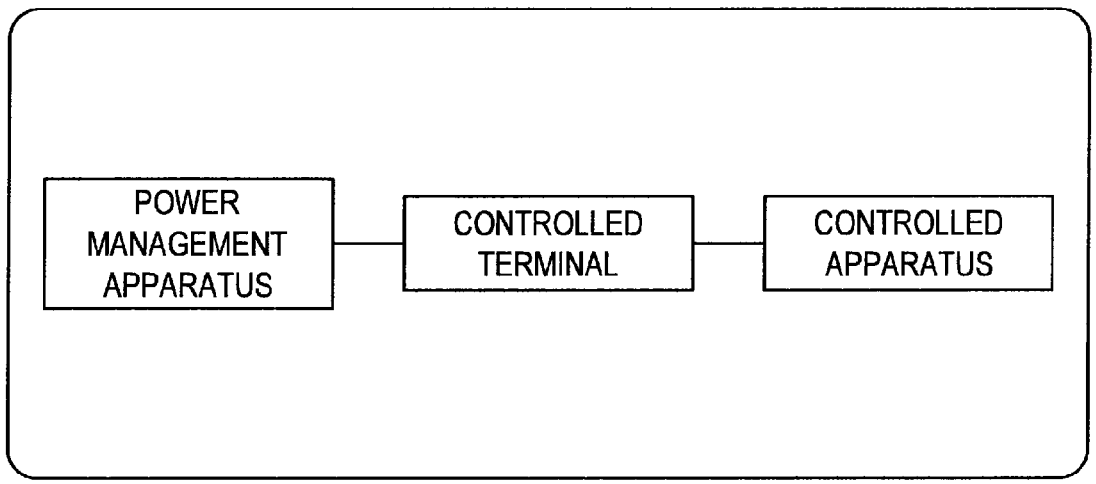
FIG. 10 is an explanatory diagram illustrating contents displayed on a display unit and a display method.
Figure 11:
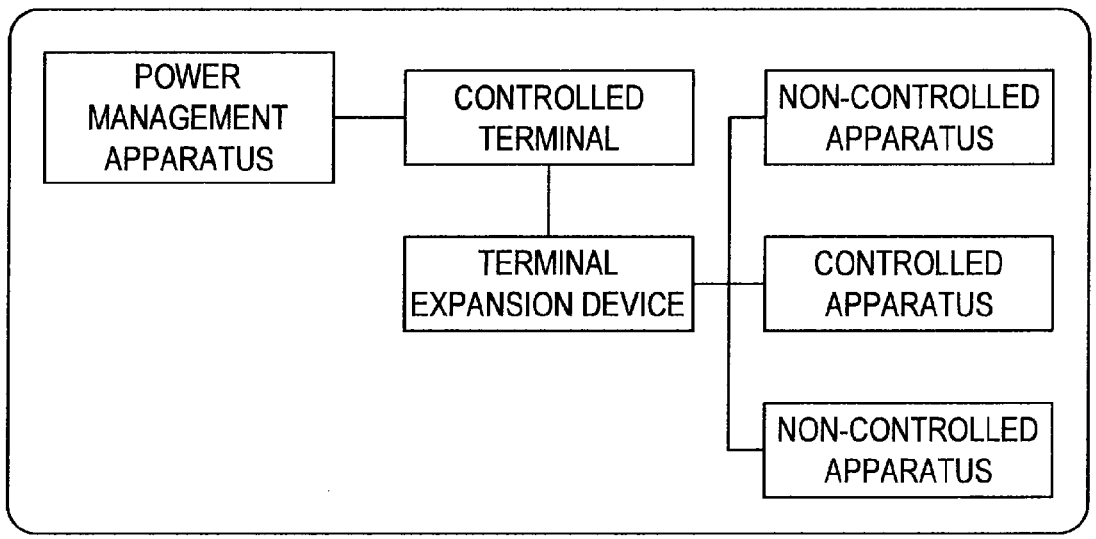
FIG. 11 is an explanatory diagram illustrating contents displayed on the display unit and a display method.

A display configuration of FIG. 10 indicates that a controlled apparatus 125 is physically connected to a controlled terminal 123, and the controlled apparatus 125 has been authenticated. A display configuration of FIG. 11 indicates that a terminal expansion device 127 is physically connected to the controlled terminal 123, and the terminal expansion device 127 has been authenticated. In the example of FIG. 11, two non-controlled apparatuses 126 and one controlled apparatus 125 are connected to the terminal expansion device 127.

Figure 12:
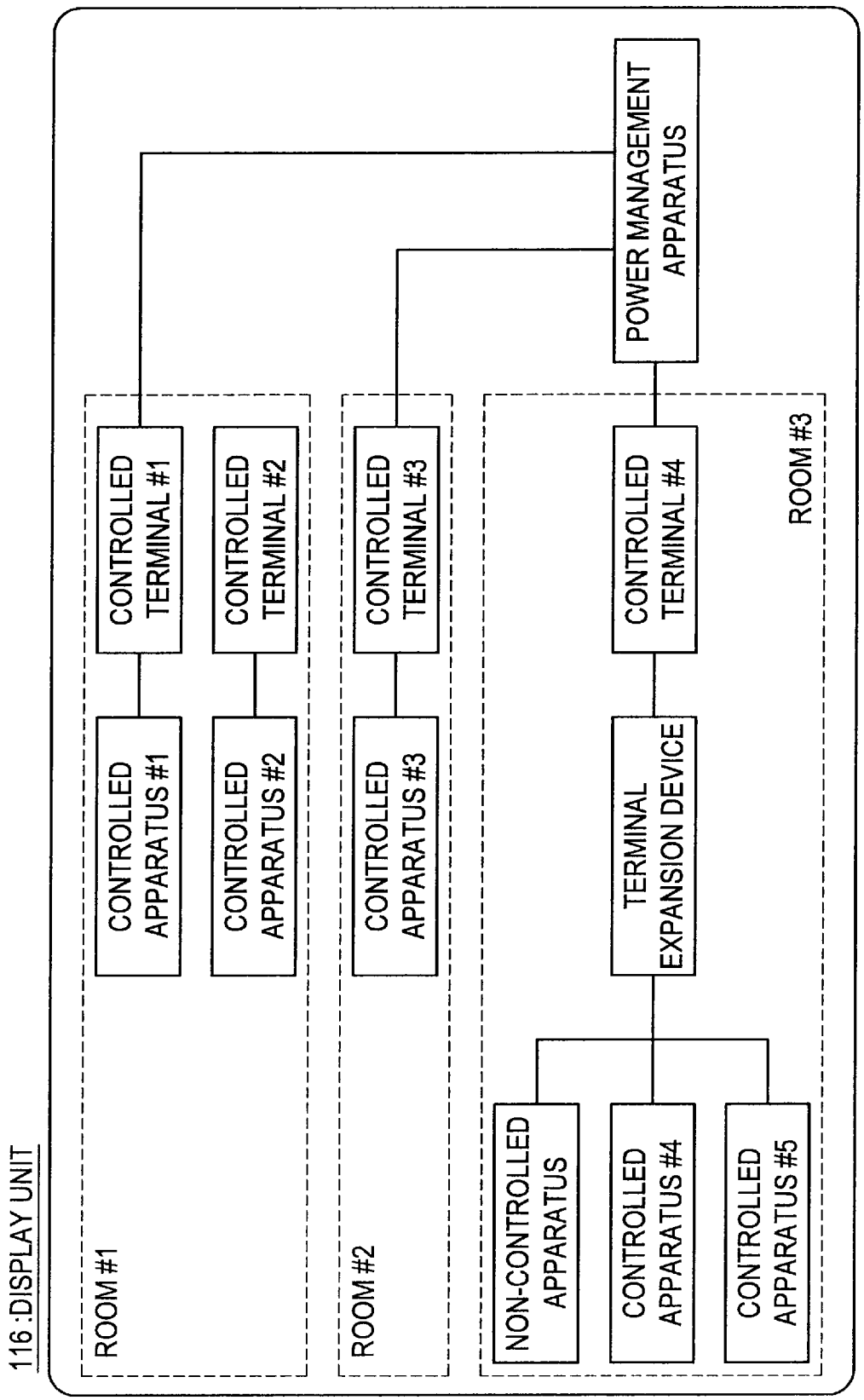
FIG. 12 is an explanatory diagram illustrating contents displayed on the display unit and a display method.
Figure 13:
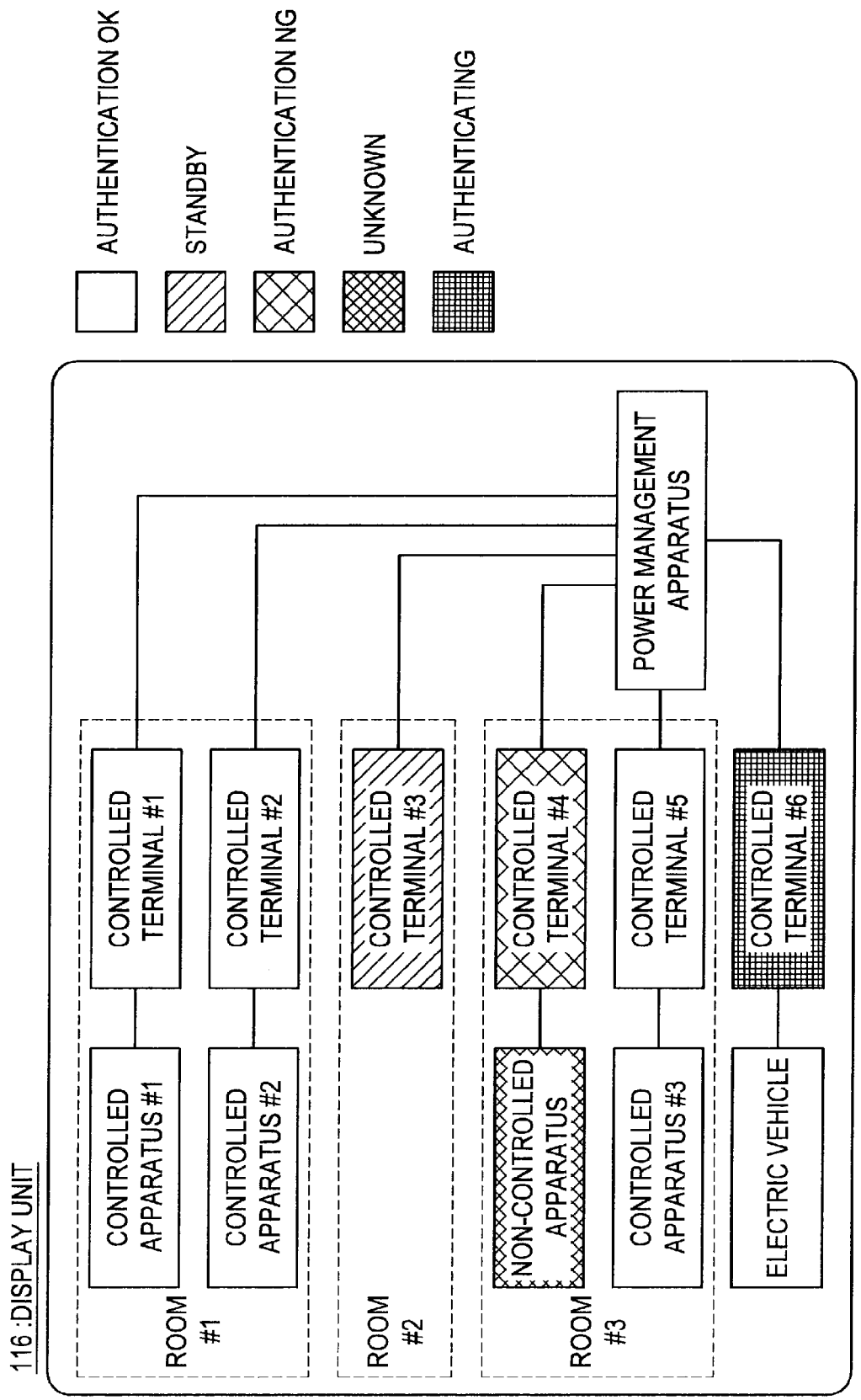
FIG. 13 is an explanatory diagram illustrating contents displayed on the display unit and a display method.
Figure 18:
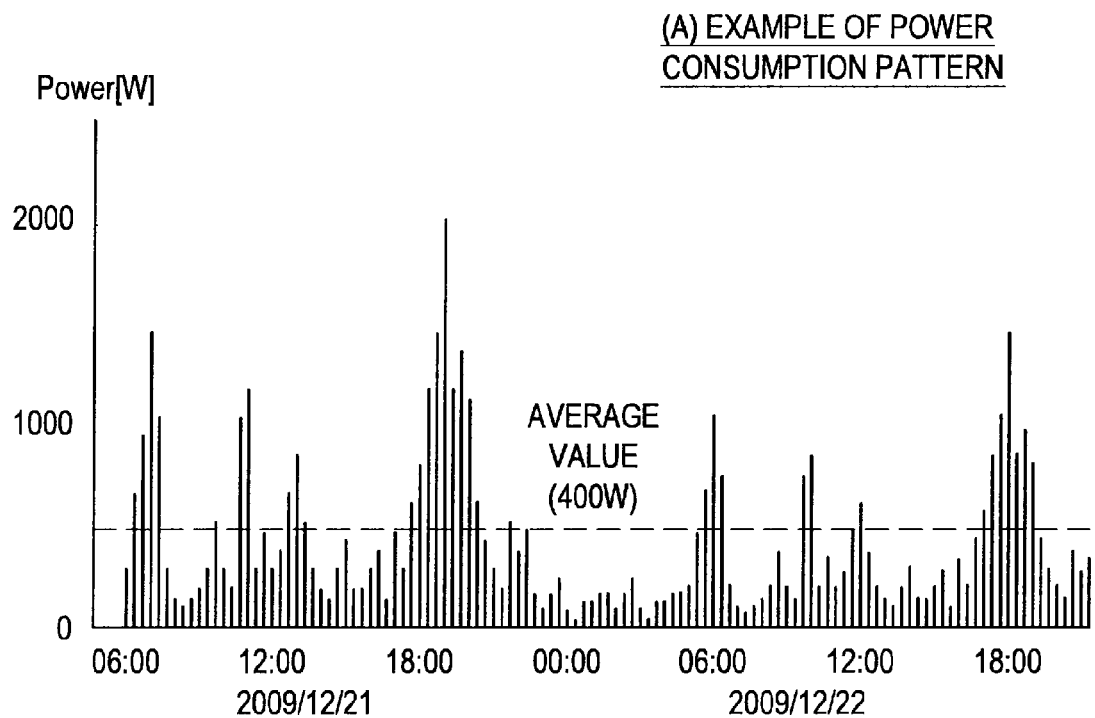
FIG. 18 is an explanatory diagram illustrating a time-series pattern of the amount of consumed power.
Figure 19:
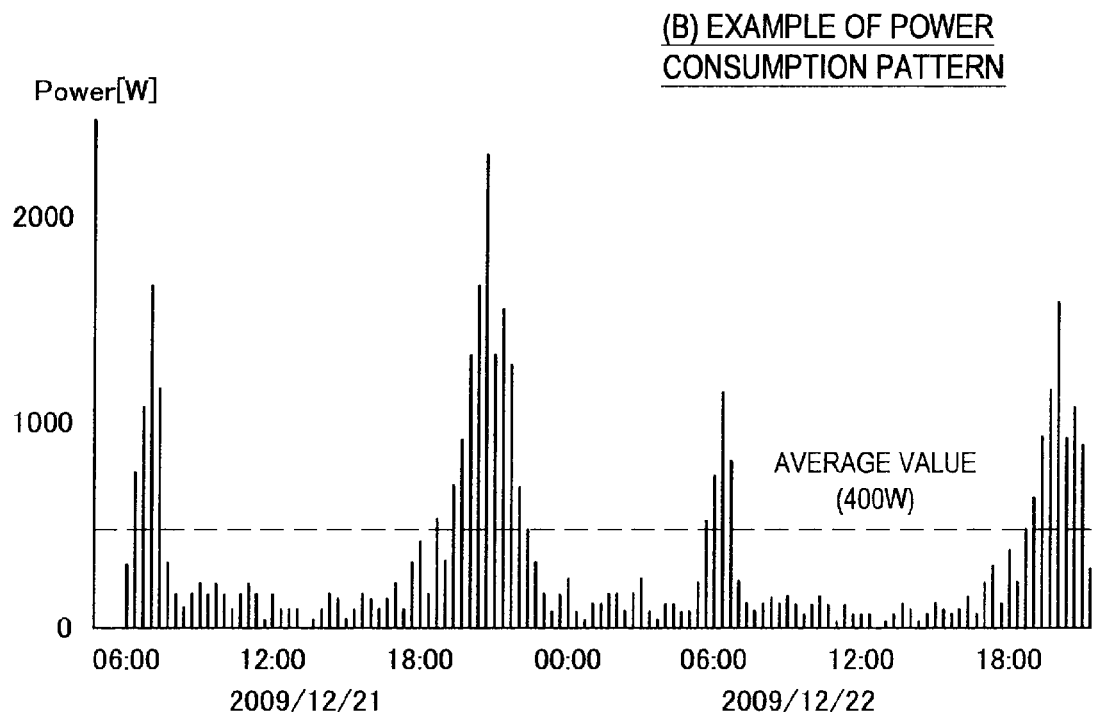
FIG. 19 is an explanatory diagram illustrating a time-series pattern of the amount of consumed power.

The non-controlled apparatus 126 does not have any authentication function. However, when the terminal expansion device 127 authenticates the non-controlled apparatus 126 on behalf of the power management apparatus 11, the display unit 116 displays even the non-controlled apparatus 126 as shown in FIG. 11. The display configuration of FIG. 12 shows connection configuration of instruments and the like grouped by each room. Further, the display configuration of FIG. 13 not only displays the connection configuration of each instrument and the like but also displays the authentication state of each instrument and the like by elaborating a display format of an object representing each instrument and the like so that a user can understand the authentication state of each instrument and the like. In the example of FIG. 13, there are five types of authentication states, i.e., successfully authenticated (authentication OK), waiting for connection of an instrument and the like (standby), authentication failed (authentication NG), unknown, and authenticating.

As described above, authentication states are clearly indicated, so that an illegal instrument and the like can be quickly detected. Further, instruments are grouped according to installation locations, so that the installation locations of illegal instruments and the like can be quickly recognized, and the illegal instruments and the like can be quickly removed. Still further, when a certain instrument and the like are unavailable, a user can easily recognize whether the instrument and the like are broken or simply incapable of being authenticated.

(3-2: Display of the Amount of Power Consumption)

Subsequently, a display method for allowing a user to easily understand the amount of consumed power of instruments and the like arranged in the local power management system 1 will be explained with reference to FIG. 14 to FIG. 17. A display configuration for displaying the amount of power consumption as well as the authentication state will also be explained here.

A display configuration of FIG. 14 shows a graph representing the amount of power consumption of each instrument and the like arranged in the local power management system 1. The example of FIG. 14 shows an instrument ID, the type of instrument, and the amount of power consumption of each instrument and the like. However, the terminal expansion device 127 is displayed in a hierarchical manner so as to indicate information about the terminal expansion device 127. The upper hierarchy (main display) shows the total amount of power consumptions of all the instruments and the like connected to the terminal expansion device 127. The lower hierarchy (sub-display) shows information about the amount of power consumption of each instrument and the like connected to the terminal expansion device 127. As described above, the hierarchical display prevents the display from being complicated, and allows a user to easily find an instrument and the like whose amount of power consumption is large or small.

In a display configuration of FIG. 15, not only the amount of power consumption but also the authentication state is displayed. It should be noted that information about unauthenticated instruments and the like may be concealed. In a display configuration of FIG. 16, not only the amount of power consumption but also a usage location and a charged amount are displayed. As explained with reference to FIG. 6, with the function of the system administration server 33, billing information is transmitted to the power management apparatus 11 of a user even when the user uses his/her instrument and the like in another user's local power management system 1. Further, information about a usage location can be obtained by using the function of the map DB server 37 in addition. Therefore, as shown in a display configuration shown in FIG. 16 as an example, the amount of power consumption and a charged amount for each usage location can be displayed. Further, as shown in a display configuration shown in FIG. 17 as an example, the power consumed in the local power management system 1 of the user in question and the power consumed in the local power management system 1 of another user may be displayed as a graph in an easy-to-understand manner at a glance.

<4: Method for Concealing Consumed Power Pattern (FIG. 18 to FIG. 22)>

Now, a method for concealing consumed power pattern will be explained with reference to FIG. 18 to FIG. 22.

A consumed power pattern of the management target block 12 reflects a life pattern of a user. For example, in the consumed power pattern shown in FIG. 18 as an example, peaks uniformly appear throughout a day. Accordingly, it is understood from this consumed power pattern that the user stayed in the house all day. In addition, since the peak of the power consumption almost disappears at around 0 a.m., it is found that that the user went to bed at around 0 a.m. On the other hand, in the consumed power pattern shown in FIG. 19 as an example, large peaks appear at around 7 a.m. and around 9 p.m., but any peak hardly appears in other time zone. This consumed power pattern suggests that the user leaves the house at around 7 a.m. and is away from the house until 9 p.m.

As described above, the consumed power pattern reflects the life pattern of the user. Therefore, once this consumed power pattern is compromised by a malicious third party, the third party would abuse the consumed power pattern. For example, a thief may sneak into the house during the time period in which the user is away from the house, a peddler may aggressively sell a merchandise during the time period in which the user stays in the house, or a burglar may break into the house while the user is asleep.

For the above reasons, it is desirable to strictly manage the information about the amount of power consumption or arrange a mechanism for concealing the consumed power pattern. As described above, the information about the amount of power provided from the power provider system 5 is collected by the power information collection apparatus 4 managed by the power provider. Therefore, the time-series pattern of the amount of consumed power in the management target block 12 is leaked to at least the power provider.

For the reasons stated above, it is desirable to arrange a mechanism for concealing the consumed power pattern in order to prevent the life pattern of the user from being compromised by a third party. The consumed power pattern may be concealed by separating the life pattern from the time-series pattern of the amount of power supplied from the power provider system 5. For example, this can be done by receiving power from the power provider system 5 while the user is away from the house and not receiving power from the power provider system 5 while the user stays in the house.

The above measures are achieved by using the electrical storage device 128. For example, the amount of power supplied from the power provider system 5 is suppressed by storing power provided from the power provider system 5 in the electrical storage device 128 while the user is away from the house and using the power stored in the electrical storage device 128 while the user stays in the house. In order to further improve the safety, it is preferable to perform charging/discharging control of the electrical storage device 128 to make the consumed power pattern into a predetermined pattern so as to substantially eliminate the features appearing in the consumed power pattern due to the life pattern.

(4-1: Averaging)

Figure 20:
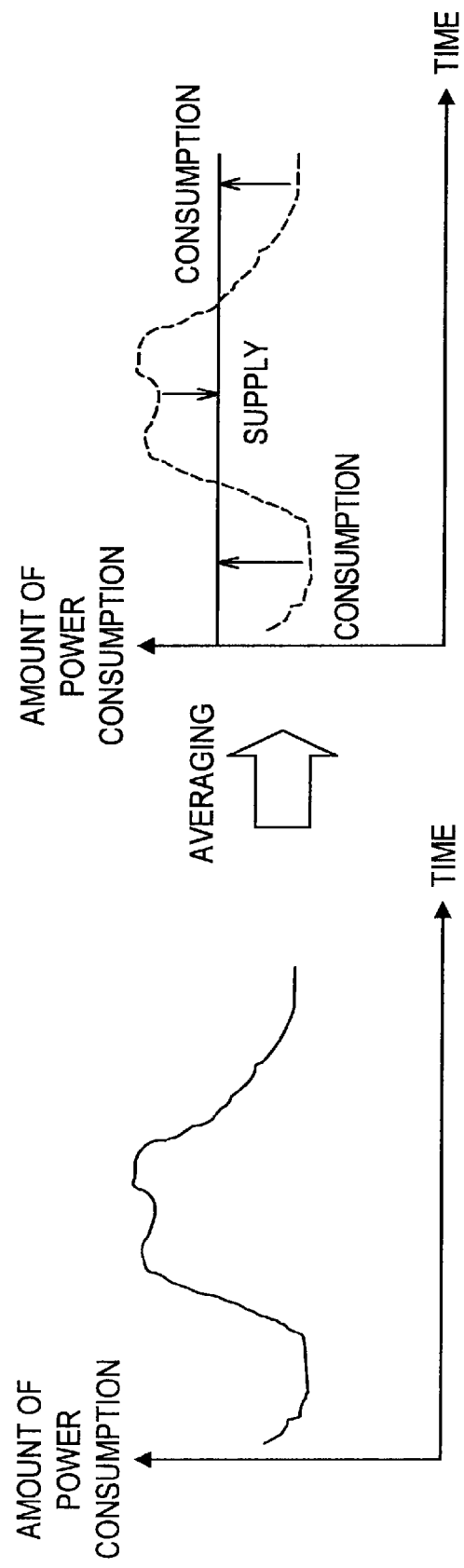
FIG. 20 is an explanatory diagram illustrating a method for concealing a consumed power pattern.

For example, as shown in FIG. 20, it may be possible to perform charging/discharging control of the electrical storage device 128 so as to maintain the amount of power consumption at a constant value. In order to maintain the amount of power consumption at the constant value, the amount of electrical storage of the electrical storage device 128 may be increased when the amount of power consumption is less than the constant value, and the amount of discharge of the electrical storage device 128 may be increased when the amount of power consumption is more than the constant value. This control is performed by the power management apparatus 11. In addition to the charging/discharging control of the electrical storage device 128, it may be possible to use charging/discharging control using a battery of the electric vehicle 124 and the like and exchange of power between consumers of power. As described above, by maintaining the amount of power consumption at the constant value, the features appearing in the consumed power pattern due to the life pattern can be eliminated. As a result, this eliminates a risk that the user becomes a victim in an illegal activity abusing the consumed power pattern.

(4-2: Complication)

Figure 21:
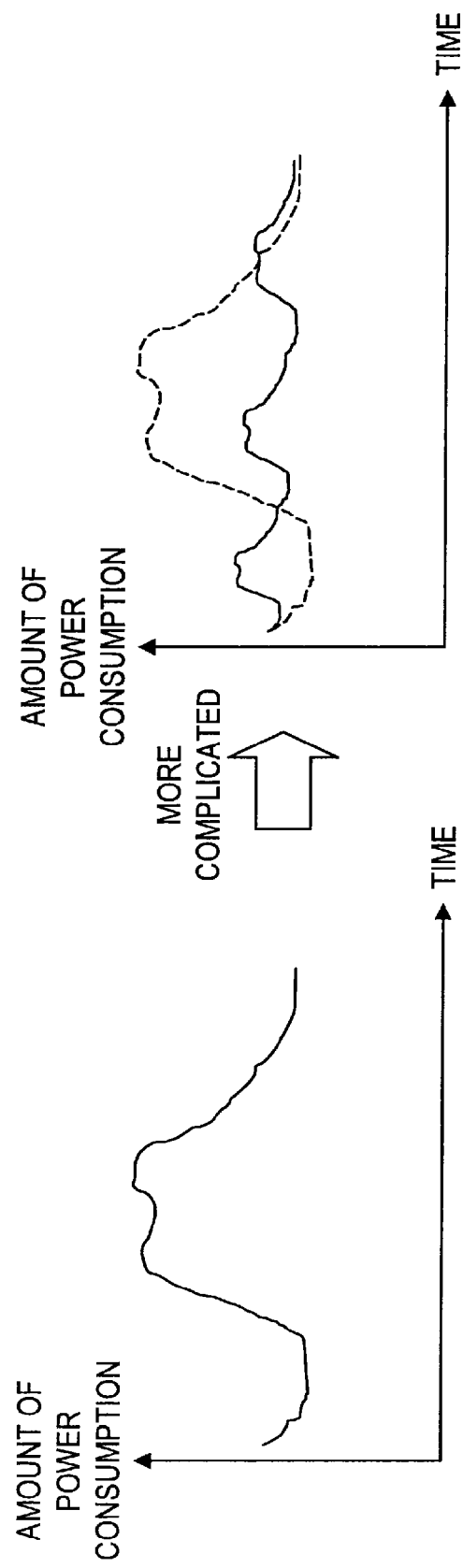
FIG. 21 is an explanatory diagram illustrating a method for concealing a consumed power pattern.

It is not absolutely necessary to maintain the amount of power consumption at a constant value in order to merely separate the consumed power pattern and the life pattern. In order to maintain the amount of power consumption at a constant value, it is necessary to prepare the electrical storage device 128 having a capacity large enough to absorb a consumption peak of power. However, the electrical storage device 128 having such a large capacity is expensive, and it is not practical to arrange the electrical storage device 128 in an ordinary household for the purpose of concealing the consumed power pattern. Therefore, the method for separating the consumed power pattern and the life pattern by using the electrical storage device 128 having a smaller capacity is desirable. An example of such method is a method for making the consumed power pattern complicated as shown in FIG. 21.

For example, there is a method for making the consumed power pattern complicated so as to uniformly make relatively small peaks and depressions. In order to suppress a large peak to about an average value, it is necessary to prepare the electrical storage device 128 having a relatively large capacity. However, in order to generate and move a relatively small peak, not so much large electrical storage capacity is necessary. Although it may be possible to make the consumed power pattern complicated in units of days, it may also be effective to make the consumed power pattern complicated so as to make a consumed power pattern being different on each day or eliminate periodicity based on days of week and based on months. Alternatively, if a mechanism is employed to make the pattern complicated only at times which are likely to be abused, such as leaving the house, arriving at the house, going to bed, and waking up, a sufficient suppression effect for preventing illegal activities can be obtained without making the charging/discharging control of the electrical storage device 128 complicated more than necessary.

(4-3: Patterning)

Figure 22:
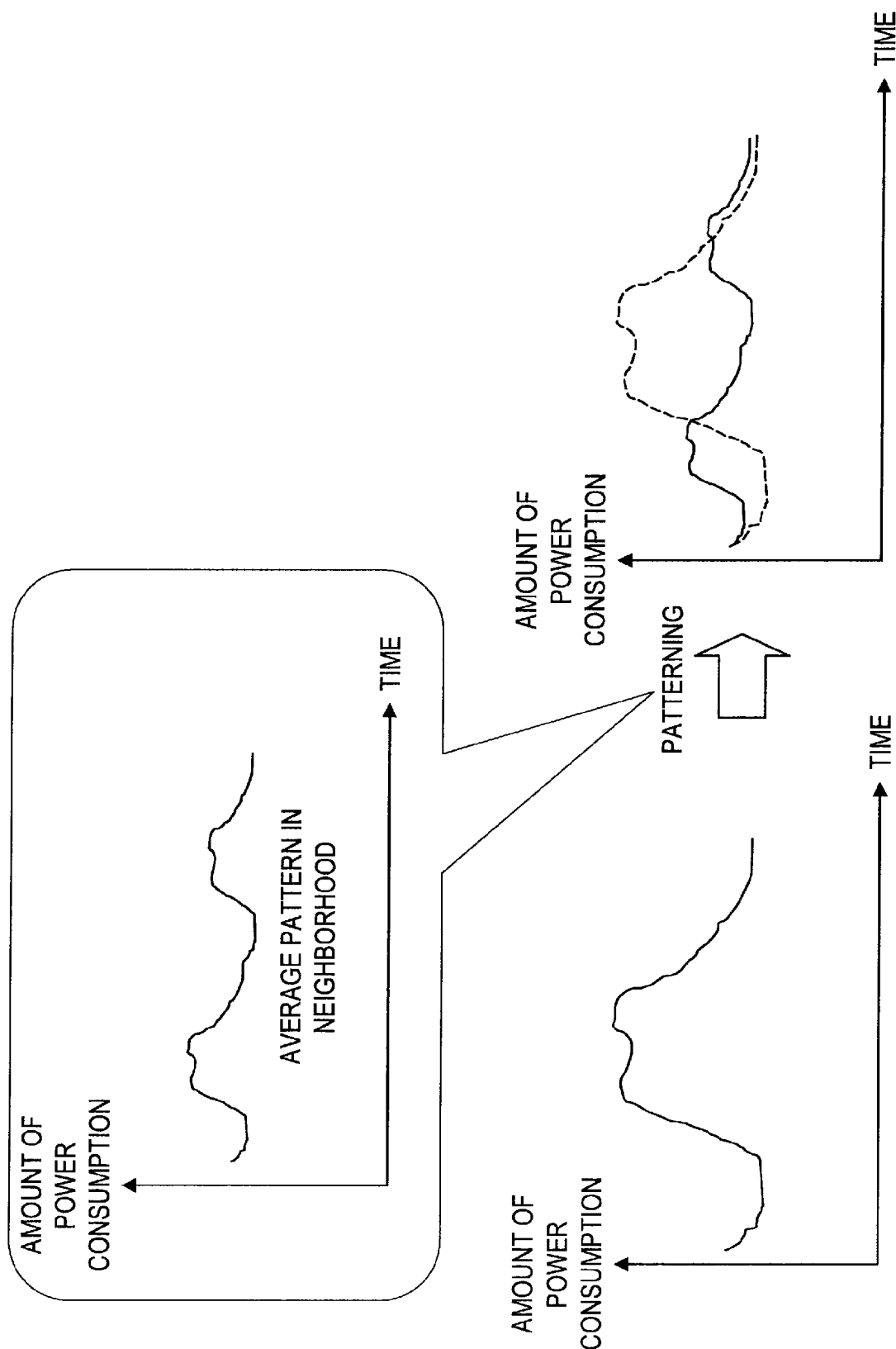
FIG. 22 is an explanatory diagram illustrating a method for concealing a consumed power pattern.

Alternatively, as shown in FIG. 22, there is a method for controlling the consumed power pattern so that the pattern becomes substantially the same as an average pattern in a neighborhood. The average pattern in the neighborhood can be obtained based on a life pattern of a person. Accordingly, it is not necessary to perform control to greatly change the amount of power to cause the consumed power pattern of a particular user to be the same as the average pattern in the neighborhood. Therefore, the life pattern of the particular user can be concealed by using the electrical storage device 128 having a smaller capacity than that used with the control for maintaining the amount of power consumption at the constant value. When the above-explained control of the amount of power consumption is performed, power information is exchanged among the power management apparatuses 11 in the neighborhood. The average pattern in the neighborhood is calculated using the function of the information analysis unit 1123 or the function of the analysis server 34. With the above control, the charging/discharging control of the electrical storage device 128 is performed.

<5: Configuration of Terminal Expansion Device 127 (FIG. 23 to FIG. 38)>

Figure 23:
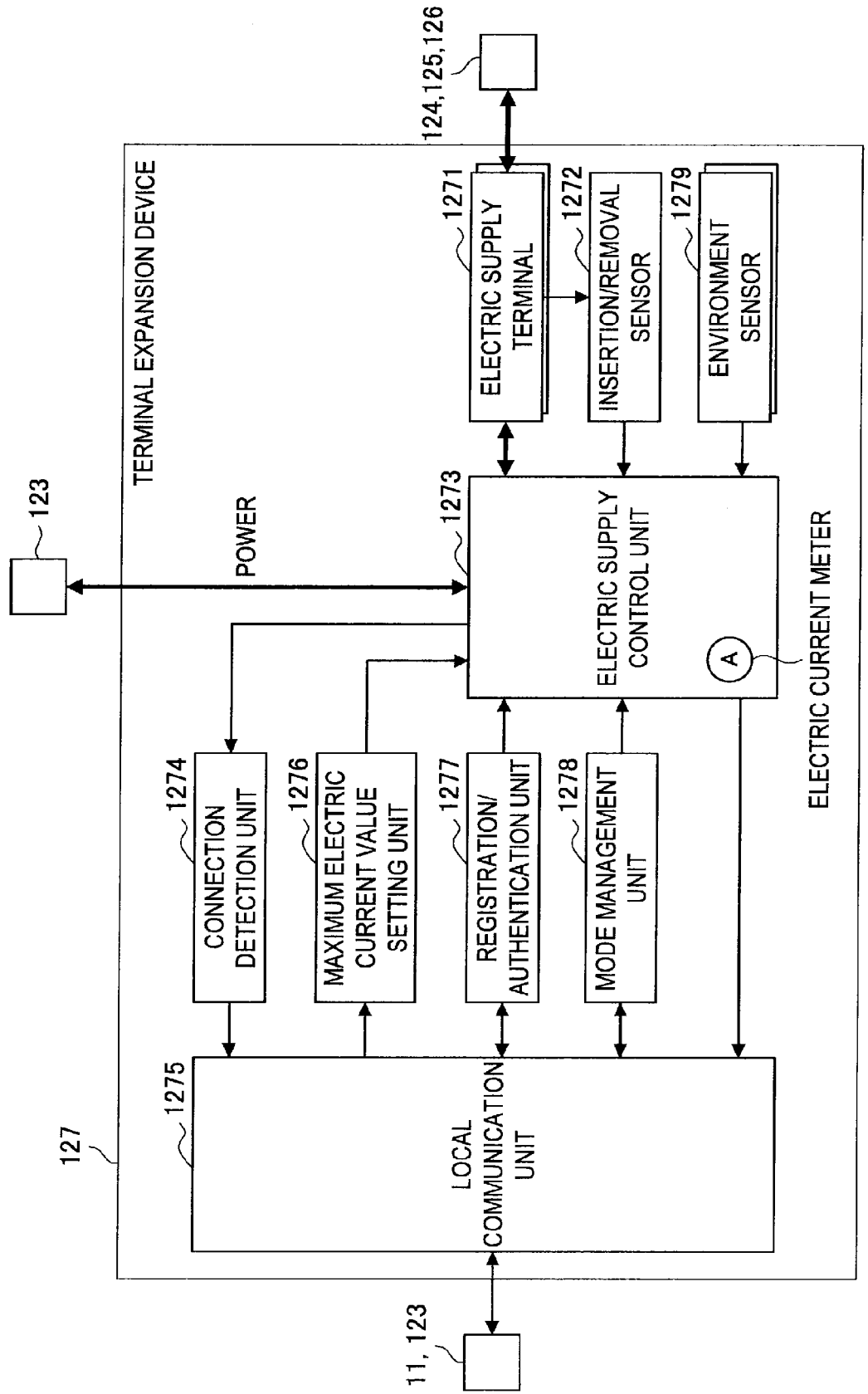
FIG. 23 is an explanatory diagram illustrating a functional configuration of a terminal expansion device.

Now, a configuration of the terminal expansion device 127 will be explained with reference to FIG. 23 to FIG. 38. FIG. 23 illustrates a functional configuration of the terminal expansion device 127. FIG. 24 to FIG. 38 illustrate an operation flow of the terminal expansion device 127.

(5-1: Function)

First, the functional configuration of the terminal expansion device 127 will be explained with reference to FIG. 23. As described above, the terminal expansion device 127 is adapted to authenticate the non-controlled apparatus 126 on behalf the power management apparatus 11. In addition, the terminal expansion device 127 is adapted to increase the number of instruments, apparatuses, and the like that can be connected to the controlled terminal 123. Therefore, the terminal expansion device 127 has the following functional configuration. As shown in FIG. 23, the terminal expansion device 127 includes an electric supply terminal 1271, an insertion/removal sensor 1272, an electric supply control unit 1273, a connection detection unit 1274, a local communication unit 1275, a maximum electric current value setting unit 1276, a registration/authentication unit 1277, a mode management unit 1278, and an environment sensor 1279.

The electric supply terminal 1271 is connected to the electric vehicle 124, the controlled apparatus 125, or the non-controlled apparatus 126. The electric supply terminal 1271 supplies power to the electric vehicle 124, the controlled apparatus 125, or the non-controlled apparatus 126 connected thereto according to the control of the electric supply control unit 1273. The electric supply terminal 1271 is connected to the insertion/removal sensor 1272, which can detect physical insertion or removal of the electric vehicle 124, the controlled apparatus 125, or the non-controlled apparatus 126. The physical insertion/removal of the electric vehicle 124, the controlled apparatus 125, or the non-controlled apparatus 126, which is detected by the insertion/removal sensor 1272, is notified to the electric supply control unit 1273.

The electric supply control unit 1273 is control means for controlling supply of power to the electric vehicle 124, the controlled apparatus 125, or the non-controlled apparatus 126 connected to the electric supply terminal 1271. The electric supply control unit 1273 includes an electric current meter. Therefore, the electric supply control unit 1273 can measure the amount of electric current supplied to the electric supply terminal 1271. Further, a notification content received by the electric supply control unit 1273 from the insertion/removal sensor 1272 and a change of electric current measured by the electric current meter of the electric supply control unit 1273 are input to the connection detection unit 1274. Further, information about the amount of electric current measured by the electric current meter of the electric supply control unit 1273 is input to the local communication unit 1275.

The notification content received by the electric supply control unit 1273 from the insertion/removal sensor 1272 and the change of electric current measured by the electric current meter of the electric supply control unit 1273 are input to the connection detection unit 1274, the connection detection unit 1274 detects the connection state (connection/disconnection) of the electric vehicle 124, the controlled apparatus 125, or the non-controlled apparatus 126 to the electric supply terminal 1271, based on the received information. Then, the information about the connection state detected by the connection detection unit 1274 is input to the local communication unit 1275. The local communication unit 1275 having received the information about the connection state and the information about the amount of electric current uses the communication network in the local power management system 1 to transmit the received information to the power management apparatus 11 directly or via the controlled terminal 123.

When the electric vehicle 124, the controlled apparatus 125, or the non-controlled apparatus 126 is connected to the electric supply terminal 1271, and the information of the connection state is transmitted to the power management apparatus 11, the power management apparatus 11 transmits information, representing the maximum amount of electric current (hereinafter the maximum electric current value) that can be provided from the electric supply terminal 1271, to the terminal expansion device 127. The information about the maximum electric current value is received by the local communication unit 1275, and is input to the maximum electric current value setting unit 1276. The maximum electric current value setting unit 1276 sets the maximum electric current value in the electric supply control unit 1273 based on the received information about the maximum electric current value. The electric supply control unit 1273 in which the maximum electric current value has been set controls electric supply to the electric supply terminal 1271 so that the amount of electric current is no more than the maximum electric current value.

It should be noted that the electric supply control unit 1273 does not supply power to the electric supply terminal 1271 until the power management apparatus 11 registers and authenticates the electric vehicle 124 and the controlled apparatus 125 connected to the electric supply terminal 1271 or authenticates the non-controlled apparatus 126 connected to the electric supply terminal 1271. When the maximum electric current value is set, the registration/authentication unit 1277 performs registration/authentication processing of the electric vehicle 124, the controlled apparatus 125, or the non-controlled apparatus 126 connected to the electric supply terminal 1271. However, the electric vehicle 124 and the controlled apparatus 125 connected to the electric supply terminal 1271 are registered and authenticated, the electric supply control unit 1273 supplies a predetermined power as necessary.

The registration/authentication of the electric vehicle 124 and the controlled apparatus 125 and the proxy authentication of the non-controlled apparatus 126 are performed by the registration/authentication unit 1277. It should be noted that the functions and operation of the registration/authentication unit 1277 will be explained in detail in the explanation below about the operation flow. When the registration/authentication unit 1277 successfully registers and authenticates the electric vehicle 124 and the controlled apparatus 125 or successfully authenticates the non-controlled apparatus 126 on behalf of the power management apparatus 11, the registration/authentication unit 1277 notifies the electric supply control unit 1273 that the registration/authentication or the proxy authentication has been successfully finished. When a success of the registration/authentication or the proxy authentication is notified to the electric supply control unit 1273, the electric supply control unit 1273 starts supplying power to the electric supply terminal 1271. On the other hand, when a failure of the registration/authentication or the proxy authentication is notified to the electric supply control unit 1273, the electric supply control unit 1273 stops supplying power to the electric supply terminal 1271.

As described above, the electric supply control unit 1273 limits the maximum electric current value determined by the power management apparatus 11 and controls electric supply according to whether the registration/authentication is successful or not. Particularly, even if there are a plurality of electric supply terminals 1271, the electric supply control unit 1273 controls electric supply in units of individual electric supply terminals 1271. Therefore, the number of electric supply terminals 1271 can be set to any number. Further, with the function of the registration/authentication unit 1277, the non-controlled apparatus 126 can be joined to power management of the power management apparatus 11. Still further, since the registration/authentication unit 1277 is configured to perform registration/authentication in units of individual electric supply terminals 1271, it is possible to connect the electric vehicle 124, the controlled apparatus 125, and the non-controlled apparatus 126 at a time.

The terminal expansion device 127 further includes the mode management unit 1278 and the environment sensor 1279. The mode management unit 1278 is means for managing operation mode of the terminal expansion device 127. The environment sensor 1279 is means for obtaining environmental information (instrument temperature, ambient temperature, humidity, atmospheric pressure, and the like) at a location where the terminal expansion device 127 is installed. The environmental information is used for detecting abnormality and the like of the terminal expansion device 127.

Examples of type of operation modes include standby mode, normal mode, deenergized mode, and abnormality mode. The standby mode is an operation mode for waiting connection of an instrument and the like to the electric supply terminal 1271. The normal mode is an operation mode in which an instrument or the like is connected to the electric supply terminal 1271. The deenergized mode is an operation mode for defining operation where an instrument or the like is detached from the electric supply terminal 1271. The abnormality mode is an operation mode for defining operation where an abnormality occurs. The mode management unit 1278 sets operation mode as necessary, and notifies the operation mode having been set to the electric supply control unit 1273.

The functional configuration of the terminal expansion device 127 has been hereinabove explained.

(5-2: Operation)

Subsequently, an operation flow of the terminal expansion device 127 will be explained with reference to FIG. 24 to FIG. 38. In this explanation, the registration/authentication of an instrument and the like performed by the terminal expansion device 127 and operation of the terminal expansion device 127 in each operation mode will be explained in detail.

(5-2-1: Operation of Standby Mode)

Figure 24:
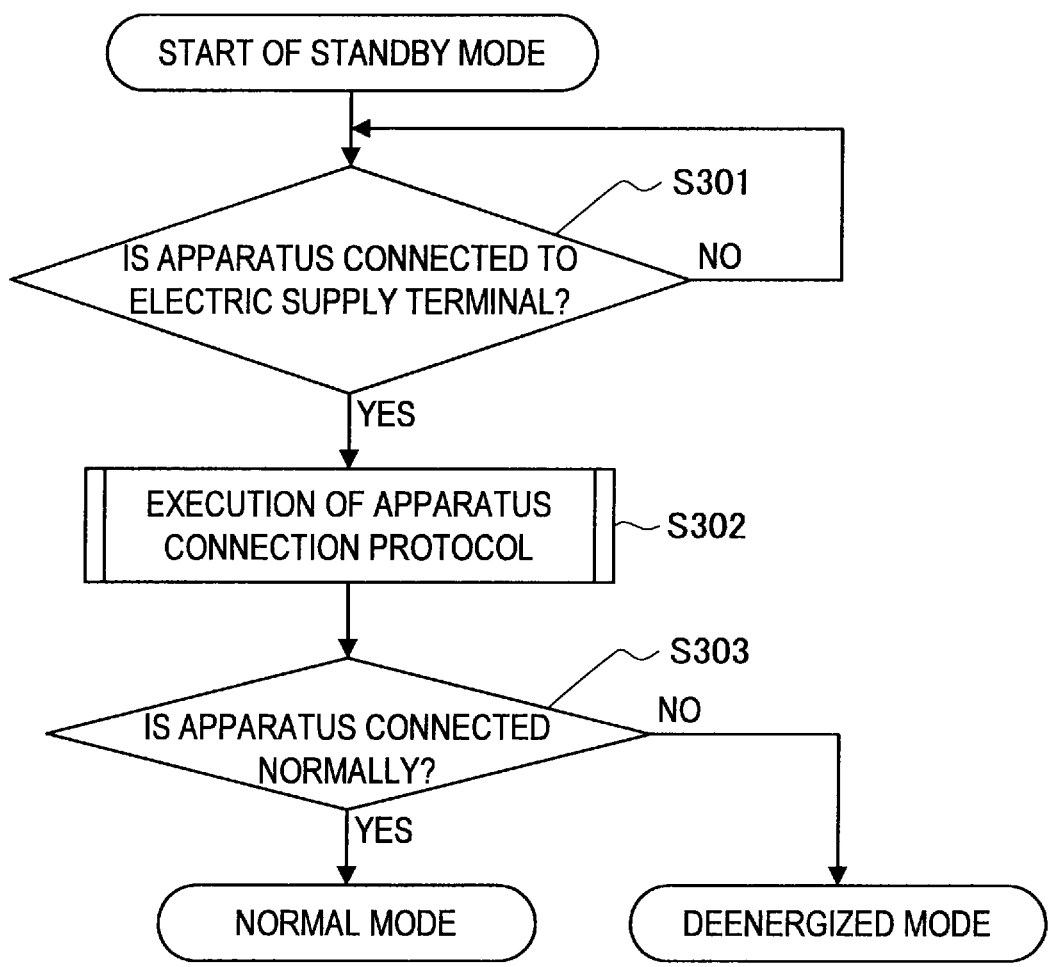
FIG. 24 is an explanatory diagram illustrating an operation flow in a standby mode.

First, an operation flow of the terminal expansion device 127 in the standby mode will be explained with reference to FIG. 24. FIG. 24 illustrates the operation flow of the terminal expansion device 127 in the standby mode.

As shown in FIG. 24, when the operation of the standby mode starts, the terminal expansion device 127 uses the functions of the insertion/removal sensor 1272, the electric supply control unit 1273, and the connection detection unit 1274, and determines whether the electric vehicle 124, the controlled apparatus 125, and the non-controlled apparatus 126 (hereinafter referred to as an instrument and the like) have been connected to the electric supply terminal 1271 or not (S301). When the instrument or the like is connected to the electric supply terminal 1271, the terminal expansion device 127 proceeds to step S302. On the other hand, when the instrument or the like is not connected to the electric supply terminal 1271, the terminal expansion device 127 returns back to step S301.

When the terminal expansion device 127 proceeds to step 302, the terminal expansion device 127 uses the functions of the registration/authentication unit 1277 and the mode management unit 1278 to execute an instrument connection protocol shown in FIG. 30 to FIG. 38 (S302). This instrument connection protocol will be explained later. Subsequently, the terminal expansion device 127 determines whether an instrument or the like is normally connected to the electric supply terminal 1271 (S303). When the instrument or the like is normally connected, the terminal expansion device 127 uses the functions of the mode management unit 1278 to set the operation mode to the normal mode. On the other hand, when the instrument or the like is not normally connected, the terminal expansion device 127 uses the functions of the mode management unit 1278 to set the operation mode to the deenergized mode. It should be noted that "normal" referred to herein means a success of registration/authentication.

(5-2-2: Operation of Normal Mode)

Figure 25:
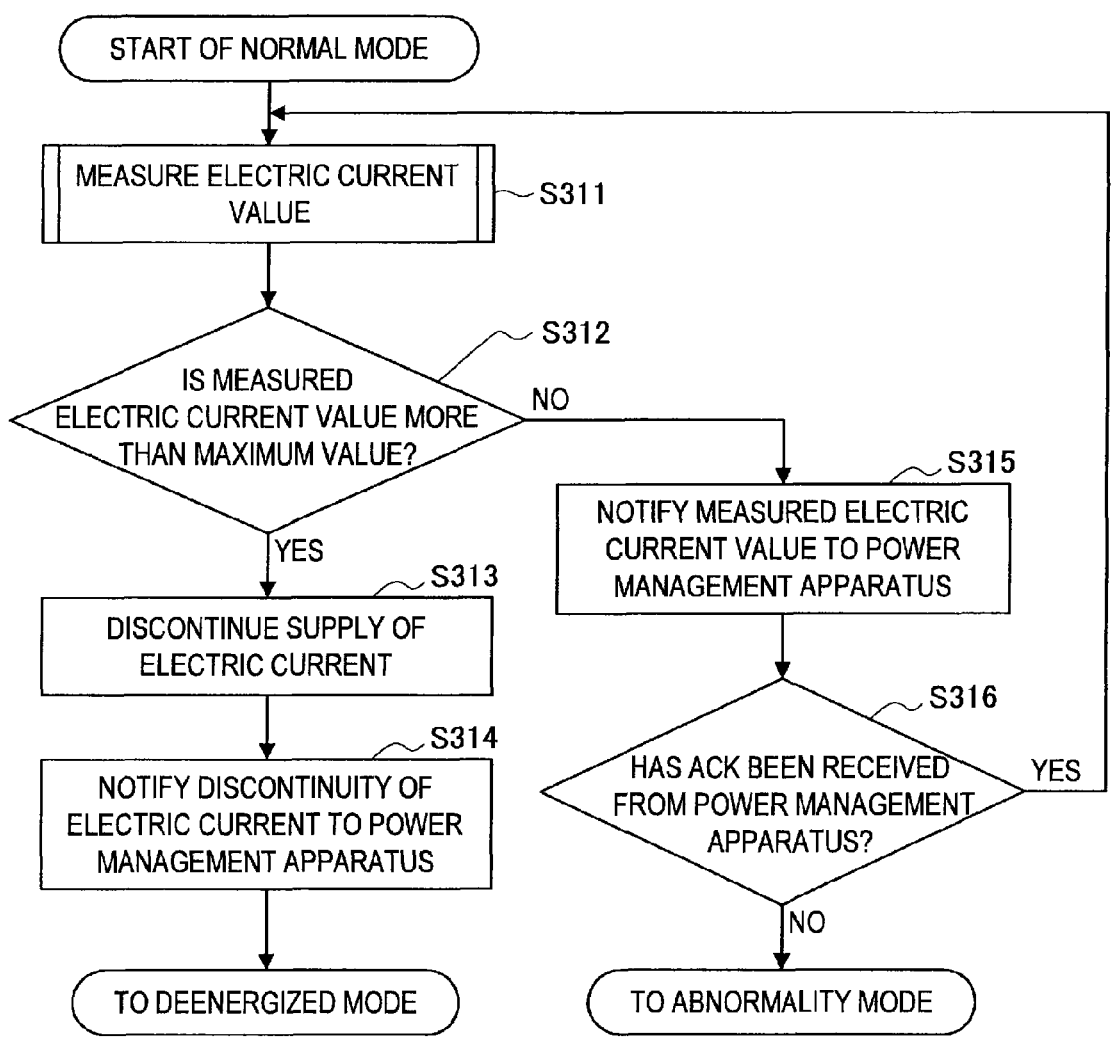
FIG. 25 is an explanatory diagram illustrating an operation flow in a normal mode.

Subsequently, an operation flow of the terminal expansion device 127 in the normal mode will be explained with reference to FIG. 25. FIG. 25 illustrates the operation flow of the terminal expansion device 127 in the normal mode.

As shown in FIG. 25, when the operation in the normal mode starts, the terminal expansion device 127 uses the functions of the electric supply control unit 1273 to supply power to the electric supply terminal 1271 and measure the electric current value thereof (S311). Subsequently, the terminal expansion device 127 uses the functions of the electric supply control unit 1273 to determine whether the measured electric current value is more than the maximum electric current value set by the maximum electric current value setting unit 1276 (S312). When the measured electric current value is determined to be more than the maximum electric current value, the terminal expansion device 127 proceeds to step S313. On the other hand, when the measured electric current value is determined not to be more than the maximum electric current value, the terminal expansion device 127 proceeds to step S315.

When the terminal expansion device 127 determines in step S312 to proceed to step S313, the terminal expansion device 127 stops the supply of power to the electric supply terminal 1271 (S313). Subsequently, the terminal expansion device 127 uses the functions of the electric supply control unit 1273 and the local communication unit 1275 to notify the power management apparatus 11 of the stop of electric supply (S314). Subsequently, the terminal expansion device 127 uses the functions of the mode management unit 1278 to set the operation mode to the deenergized mode.

On the other hand, when the terminal expansion device 127 determines in step S312 to proceed to step S315, the terminal expansion device 127 uses the functions of the electric supply control unit 1273 and the local communication unit 1275 to notify the measured electric current value to the power management apparatus 11 (S315). Subsequently, the terminal expansion device 127 uses the functions of the local communication unit 1275 to determine whether ACK (confirmation information indicating normal reception of the measured electric current value) has been received from the power management apparatus 11 (S316). When the ACK has been received from the power management apparatus 11, the terminal expansion device 127 returns back to step S311. On the other hand, when no ACK has been received from the power management apparatus 11, the terminal expansion device 127 uses the functions of the mode management unit 1278 to set the operation mode to the abnormality mode.

(Modification)

Figure 26:
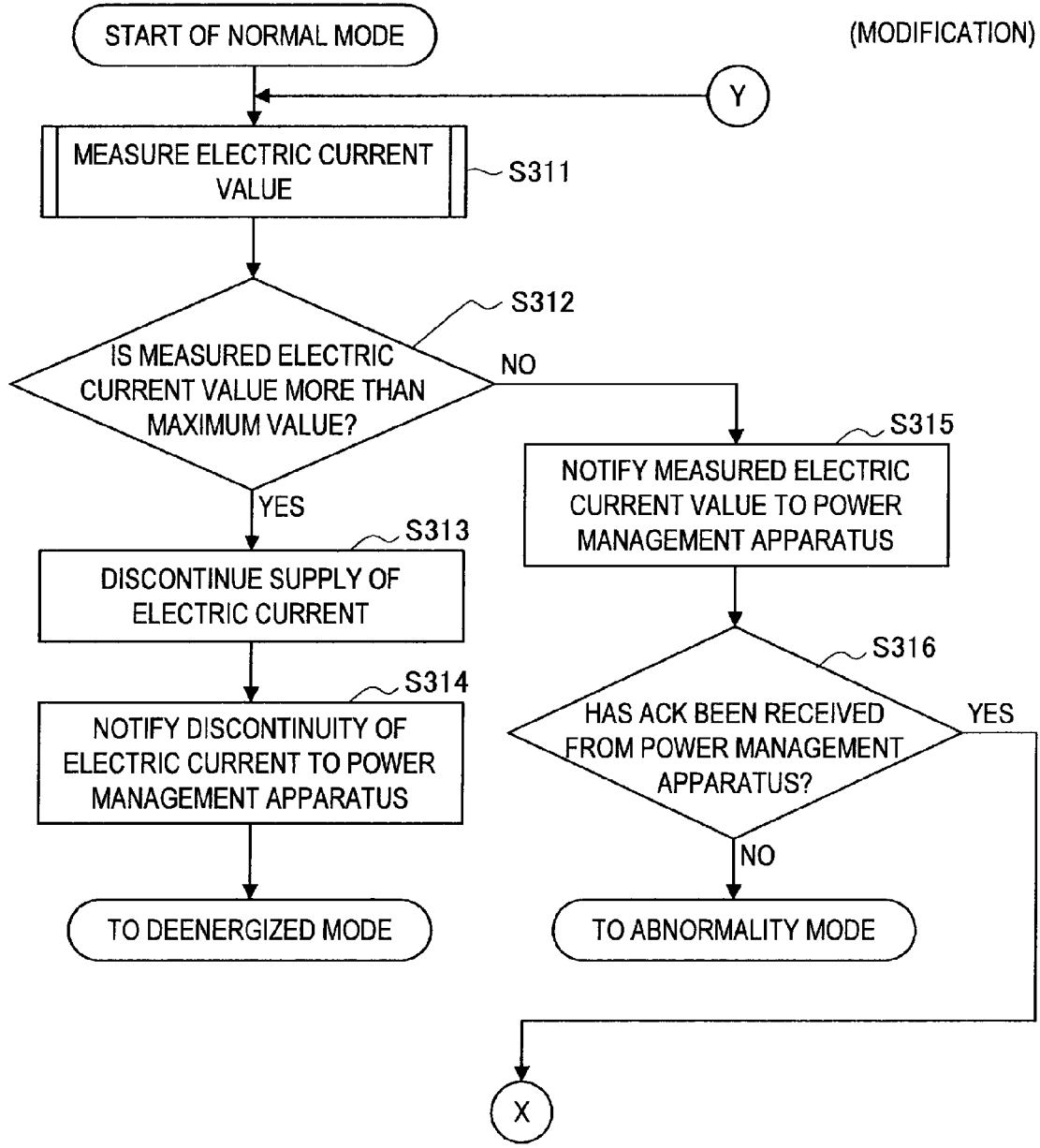
FIG. 26 is an explanatory diagram illustrating an operation flow in a normal mode.
Figure 27:
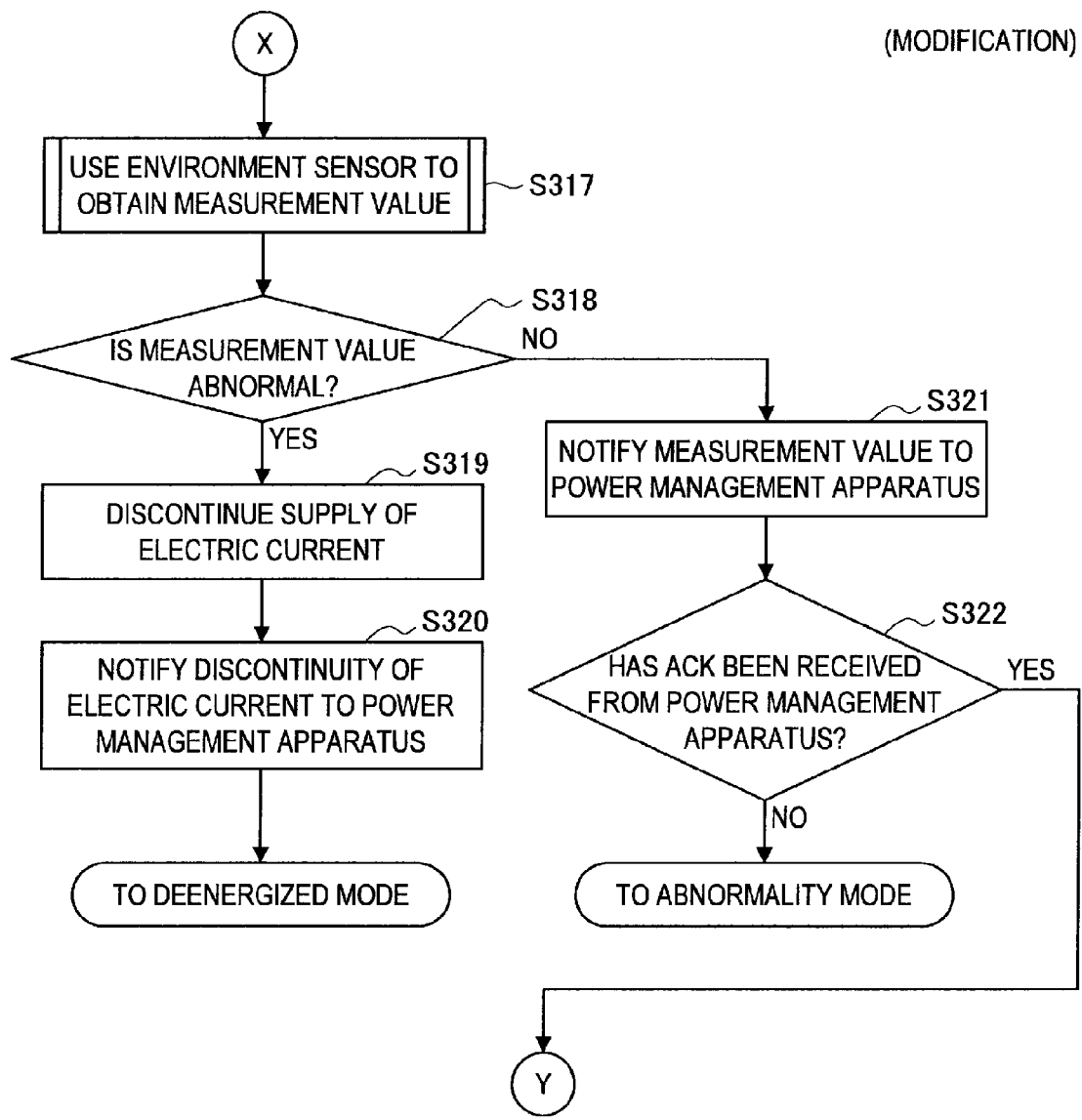
FIG. 27 is an explanatory diagram illustrating an operation flow in a normal mode.

The operation flow of the normal mode can be changed to the operation flow as shown in FIG. 26 and FIG. 27. This modification will be hereinafter explained.

As shown in FIG. 26, when the operation of the normal mode starts, the terminal expansion device 127 uses the functions of the electric supply control unit 1273 to supply power to the electric supply terminal 1271, and measures the electric current value (S311). Subsequently, the terminal expansion device 127 uses the functions of the electric supply control unit 1273 to determine whether the measured electric current value is more than the maximum electric current value set by the maximum electric current value setting unit 1276 (S312). When the measured electric current value is determined to be more than the maximum electric current value, the terminal expansion device 127 proceeds to step S313. On the other hand, when the measured electric current value is determined not to be more than the maximum electric current value, the terminal expansion device 127 proceeds to step S315.

When the terminal expansion device 127 determines in step S312 to proceed to step S313, the terminal expansion device 127 stops the supply of power to the electric supply terminal 1271 (S313). Subsequently, the terminal expansion device 127 uses the functions of the electric supply control unit 1273 and the local communication unit 1275 to notify the power management apparatus 11 of the stop of electric supply (S314). Subsequently, the terminal expansion device 127 uses the functions of the mode management unit 1278 to set the operation mode to the deenergized mode.

On the other hand, when the terminal expansion device 127 determines in step S312 to proceed to step S315, the terminal expansion device 127 uses the functions of the electric supply control unit 1273 and the local communication unit 1275 to notify the measured electric current value to the power management apparatus 11 (S315). Subsequently, the terminal expansion device 127 uses the functions of the local communication unit 1275 to determine whether ACK (confirmation information indicating normal reception of the measured electric current value) has been received from the power management apparatus 11 (S316). When the ACK has been received from the power management apparatus 11, the terminal expansion device 127 returns back to step S317 (FIG. 27). On the other hand, when no ACK has been received from the power management apparatus 11, the terminal expansion device 127 uses the functions of the mode management unit 1278 to set the operation mode to the abnormality mode.

When the terminal expansion device 127 determines in step S316 to proceed to step S317 (see FIG. 27), the terminal expansion device 127 uses the environment sensor 1279 to obtain a measured value of environmental information (S317). Subsequently, the terminal expansion device 127 determines whether the measured value obtained by the environment sensor 1279 is abnormal or not (S318). For example, when a temperature (measured value) is determined to be higher than a predetermined value, "abnormality" is detected. When the measured value is abnormal, the terminal expansion device 127 proceeds to S319. On the other hand, when the measured value is not abnormal, the terminal expansion device 127 proceeds to S321.

When the terminal expansion device 127 determines in step S318 to proceed to step S319, the terminal expansion device 127 stops the supply of power to the electric supply terminal 1271 (S319). Subsequently, the terminal expansion device 127 uses the functions of the electric supply control unit 1273 and the local communication unit 1275 to notify the power management apparatus 11 of the stop of electric supply (S320). Subsequently, the terminal expansion device 127 uses the functions of the mode management unit 1278 to set the operation mode to the deenergized mode.

On the other hand, when the terminal expansion device 127 determines in step S318 to proceed to step S321, the terminal expansion device 127 uses the functions of the electric supply control unit 1273 and the local communication unit 1275 to notify the measured value to the power management apparatus 11 (S321). Subsequently, the terminal expansion device 127 uses the functions of the local communication unit 1275 to determine whether ACK (confirmation information indicating normal reception of the measured electric current value) has been received from the power management apparatus 11 (S322). When the ACK has been received from the power management apparatus 11, the terminal expansion device 127 returns back to step S311 (FIG. 26). On the other hand, when no ACK has been received from the power management apparatus 11, the terminal expansion device 127 uses the functions of the mode management unit 1278 to set the operation mode to the abnormality mode.

(5-2-3: Operation of Deenergized Mode)

Figure 28:
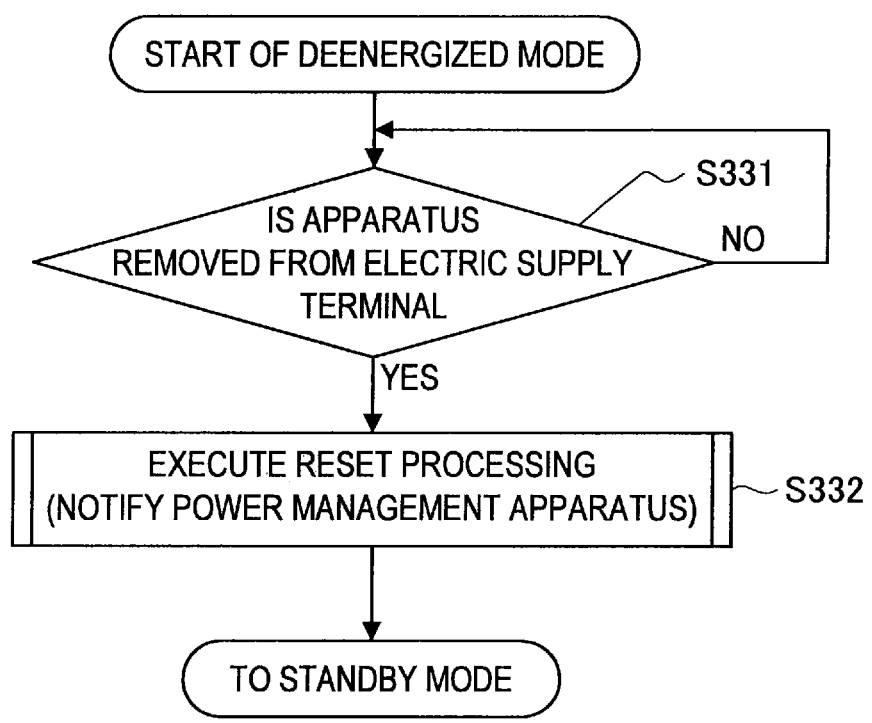
FIG. 28 is an explanatory diagram illustrating an operation flow in a deenergized mode.

Subsequently, an operation flow of the terminal expansion device 127 in the deenergized mode will be explained with reference to FIG. 28. FIG. 28 illustrates the operation flow of the terminal expansion device 127 in the deenergized mode.

As shown in FIG. 28, when the operation in the deenergized mode starts, the terminal expansion device 127 uses the functions of the connection detection unit 1274 to determine whether an instrument or the like is detached from the electric supply terminal 1271 (S331). When the instrument or the like is determined to be detached from the electric supply terminal 1271, the terminal expansion device 127 proceeds to step S332. On the other hand, when the instrument or the like is determined not to be detached from the electric supply terminal 1271, the terminal expansion device 127 returns back to step S331. When the terminal expansion device 127 proceeds to step S332, the terminal expansion device 127 resets the connection state of the instrument and information about the connection state, and notifies, by way of the local communication unit 1275, the power management apparatus 11 that the connection state has been reset (S332). Subsequently, the terminal expansion device 127 uses the functions of the mode management unit 1278 to set the operation mode to the standby mode.

(5-2-4: Operation During Abnormality Mode)

Figure 29:
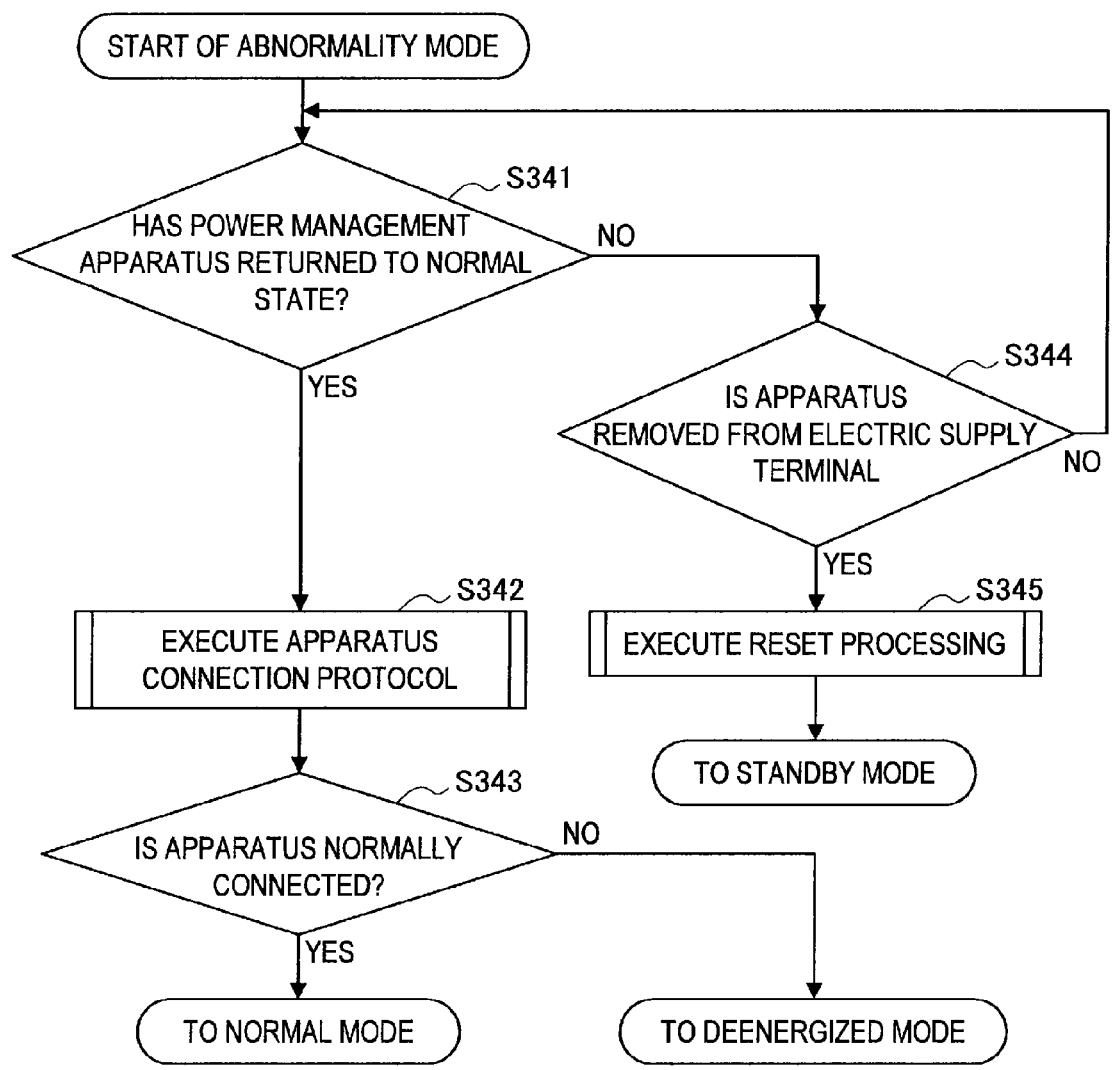
FIG. 29 is an explanatory diagram illustrating an operation flow in an abnormality mode.

Subsequently, an operation flow of the terminal expansion device 127 in the abnormality mode will be explained with reference to FIG. 29. FIG. 29 illustrates the operation flow of the terminal expansion device 127 in the abnormality mode.

As shown in FIG. 29, when the operation in the abnormality mode starts, the terminal expansion device 127 determines whether the power management apparatus 11 (and constituent elements used for communication thereof) has returned back to a normal state (S341). For example, this determination is made by causing the registration/authentication unit 1277 to retry authentication and making a determination based on the result thereof. When the power management apparatus 11 or the like returns back to the normal state, the terminal expansion device 127 proceeds to step S342. On the other hand, when the power management apparatus 11 or the like has not yet returned back to the normal state, the terminal expansion device 127 proceeds to step S344.

When the terminal expansion device 127 determines in step S341 to proceed to step S342, the terminal expansion device 127 uses the functions of the registration/authentication unit 1277 and the mode management unit 1278 to execute an instrument connection protocol as shown in FIG. 30 to FIG. 38 (S342). Subsequently, the terminal expansion device 127 determines whether the instrument or the like is normally connected to the electric supply terminal 1271 (S343). When the instrument or the like is determined to be normally connected, the terminal expansion device 127 uses the functions of the mode management unit 1278 to set the operation mode to the normal mode. On the other hand, when the instrument or the like is determined not to be normally connected, the terminal expansion device 127 uses the functions of the mode management unit 1278 to set the operation mode to the deenergized mode.

When the terminal expansion device 127 determines in step S341 to proceed to step S344, the terminal expansion device 127 uses the functions of the connection detection unit 1274 to determine whether an instrument or the like is detached from the electric supply terminal 1271 (S344). When the instrument or the like is determined to be detached from the electric supply terminal 1271, the terminal expansion device 127 proceeds to step S345. On the other hand, when the instrument or the like is determined not to be detached from the electric supply terminal 1271, the terminal expansion device 127 returns back to step S341. When the terminal expansion device 127 proceeds to step S345, the terminal expansion device 127 resets the connection state of the instrument and information about the connection state, and notifies, by way of the local communication unit 1275, the power management apparatus 11 that the connection state has been reset (S345). Subsequently, the terminal expansion device 127 uses the functions of the mode management unit 1278 to set the operation mode to the standby mode.

(5-2-5: Operation During Authentication)

Subsequently, an instrument connection protocol in registration/authentication for the following three cases will be explained with reference to FIG. 30 to FIG. 38.

Figure 30:
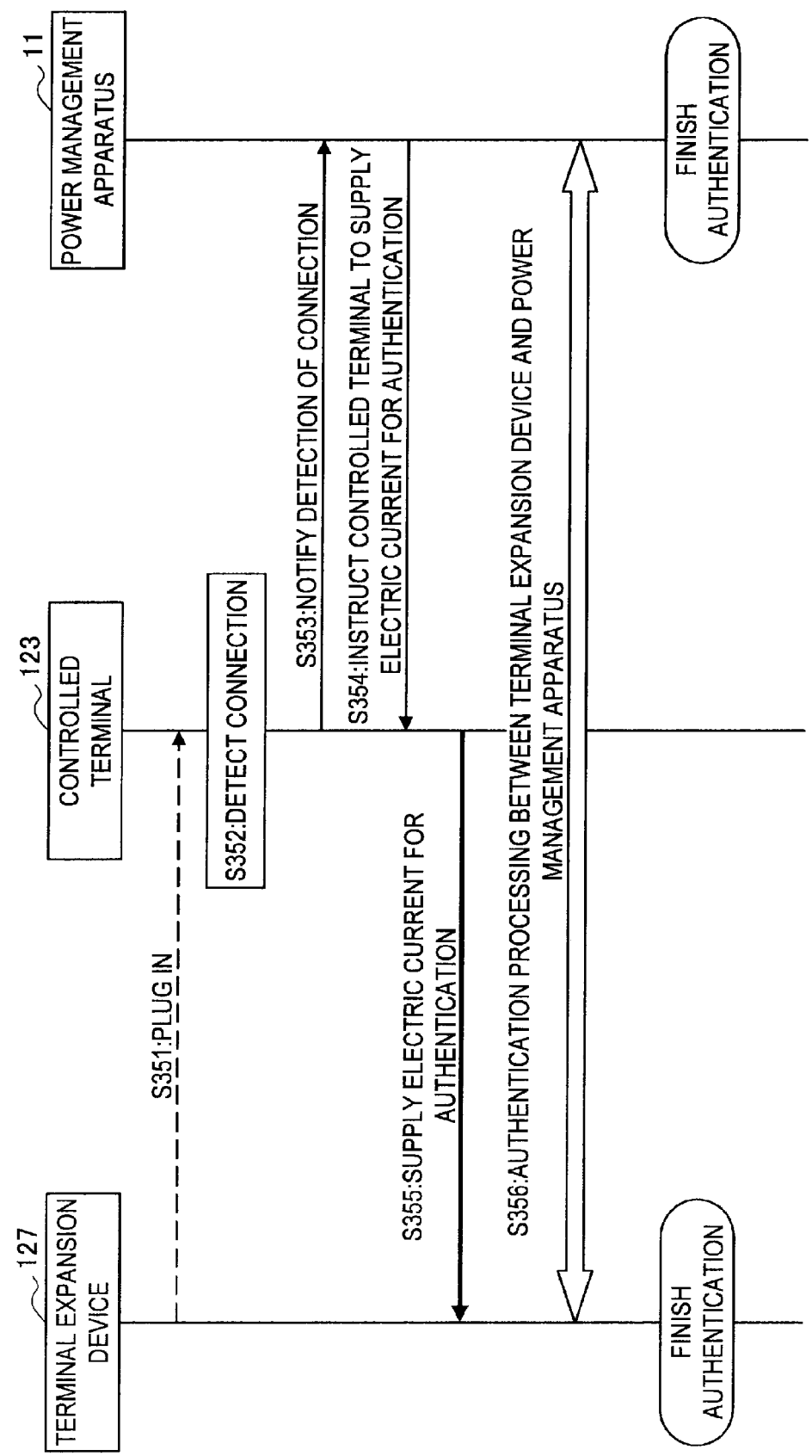
FIG. 30 is an explanatory diagram illustrating an operation flow of authentication of the terminal expansion device.
Figure 31:
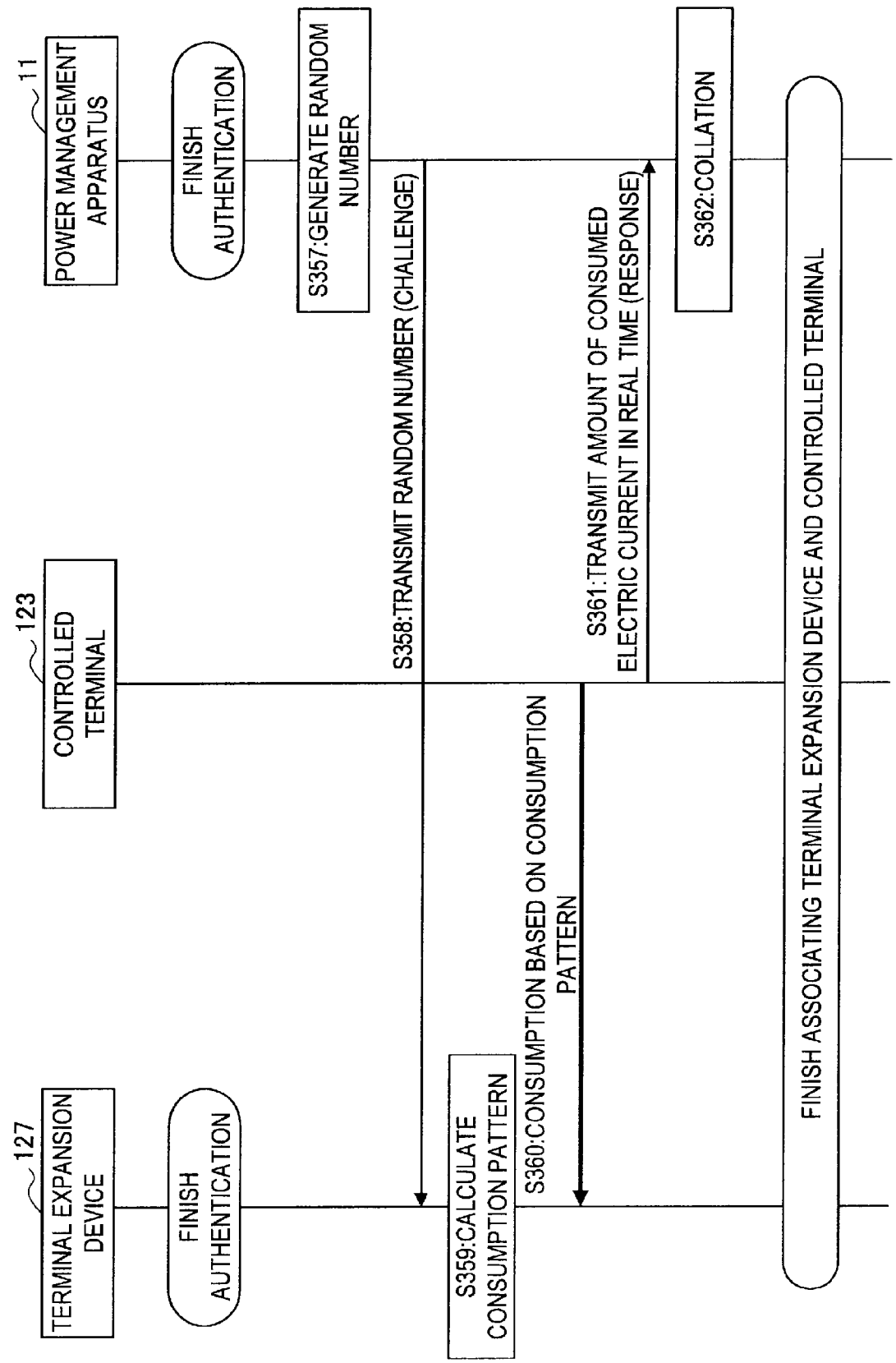
FIG. 31 is an explanatory diagram illustrating an operation flow of authentication of the terminal expansion device.
Figure 32:
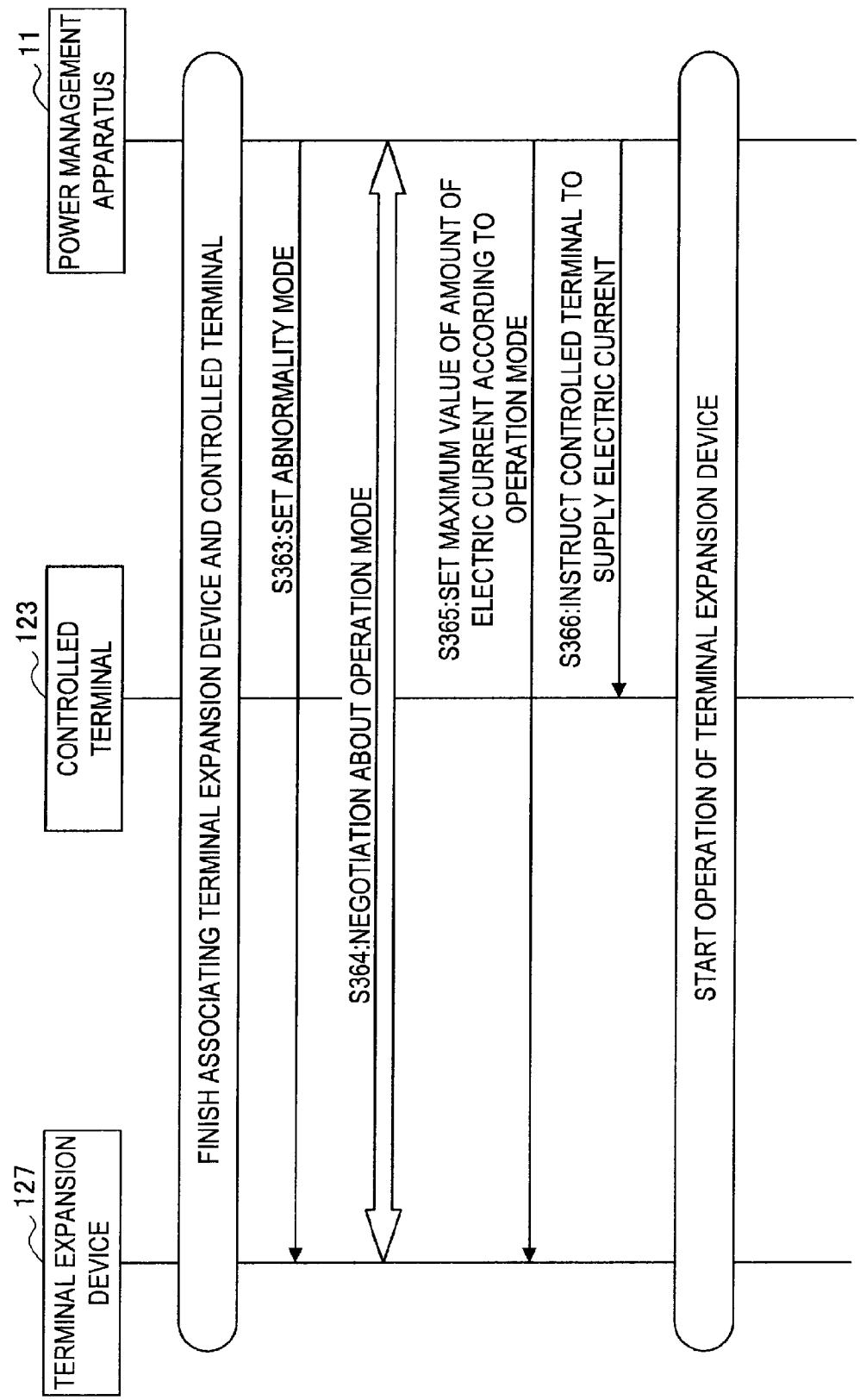
FIG. 32 is an explanatory diagram illustrating an operation flow of authentication of the terminal expansion device.
Figure 33:
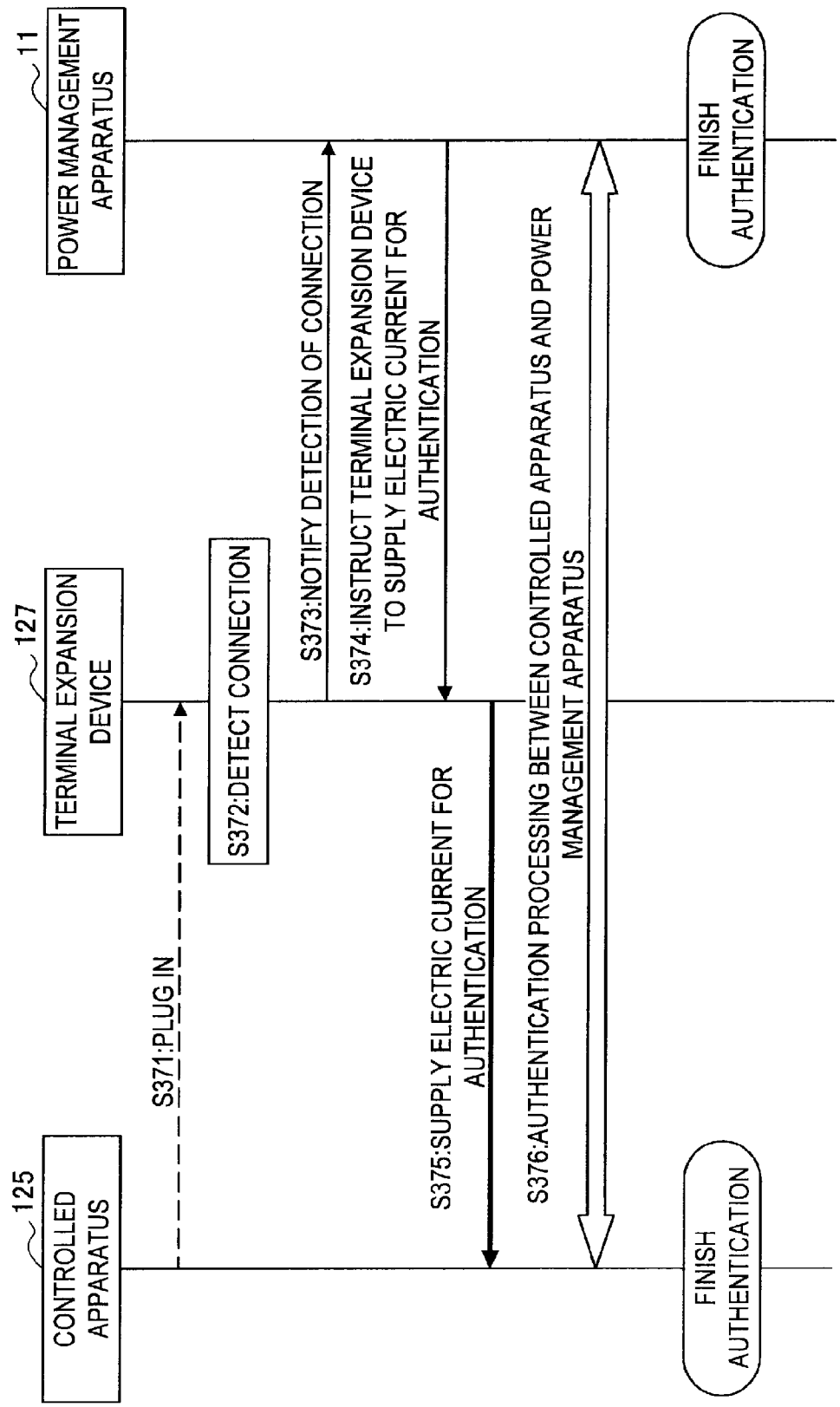
FIG. 33 is an explanatory diagram illustrating an operation flow of authentication of a controlled apparatus.
Figure 34:
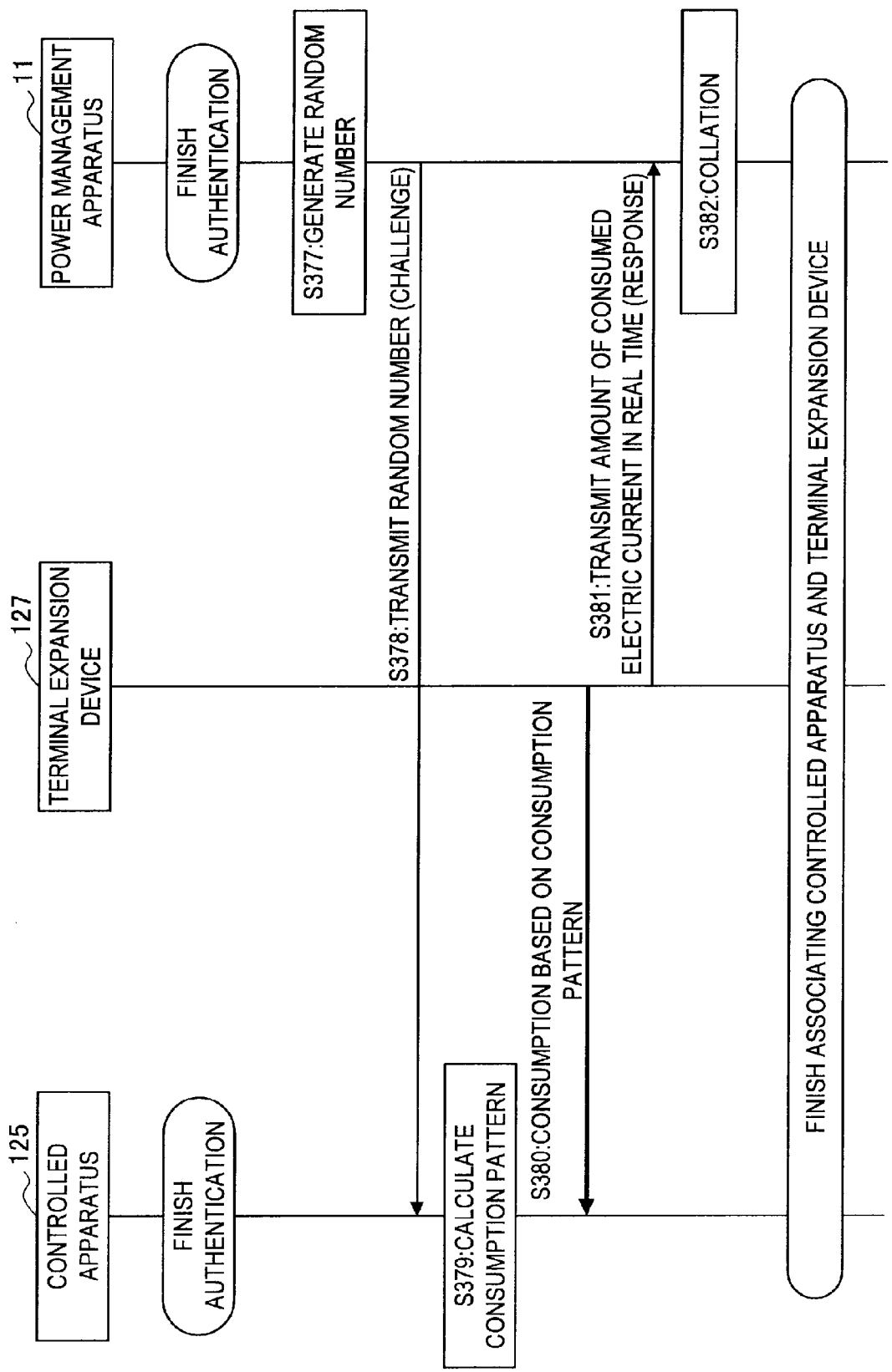
FIG. 34 is an explanatory diagram illustrating an operation flow of authentication of a controlled apparatus.
Figure 35:
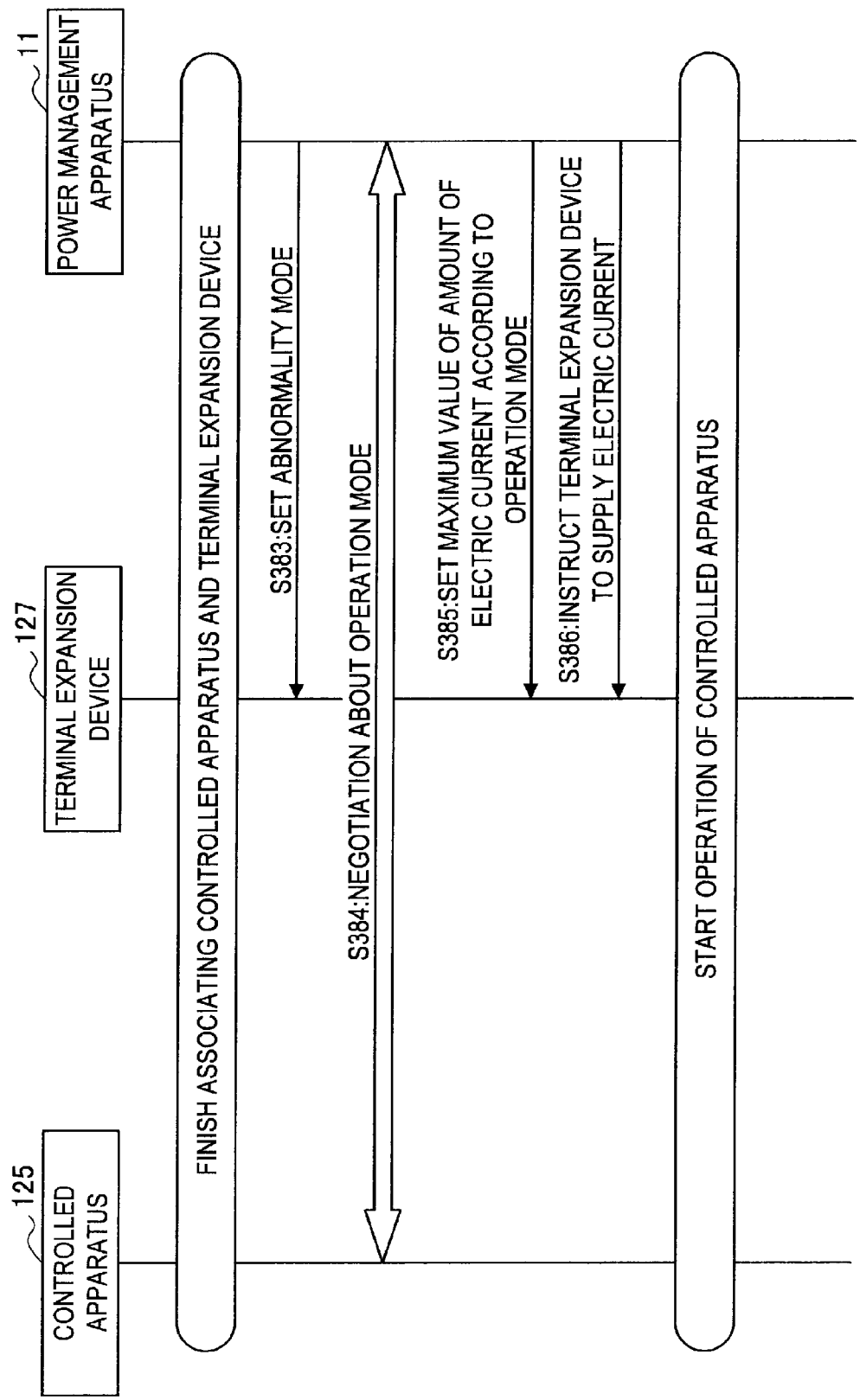
FIG. 35 is an explanatory diagram illustrating an operation flow of authentication of a controlled apparatus.
Figure 36:
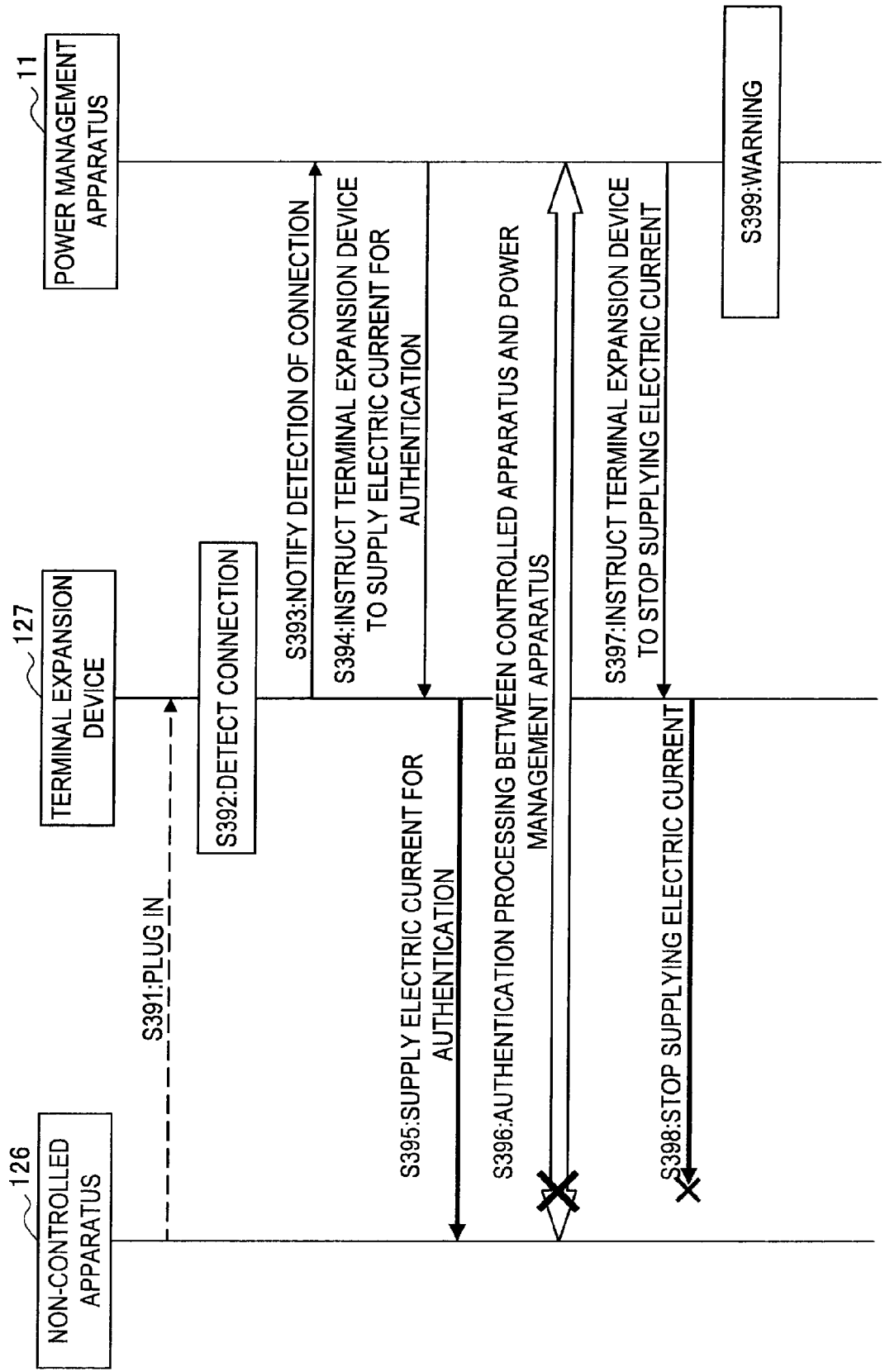
FIG. 36 is an explanatory diagram illustrating an operation flow of proxy authentication of a non-controlled apparatus.
Figure 37:
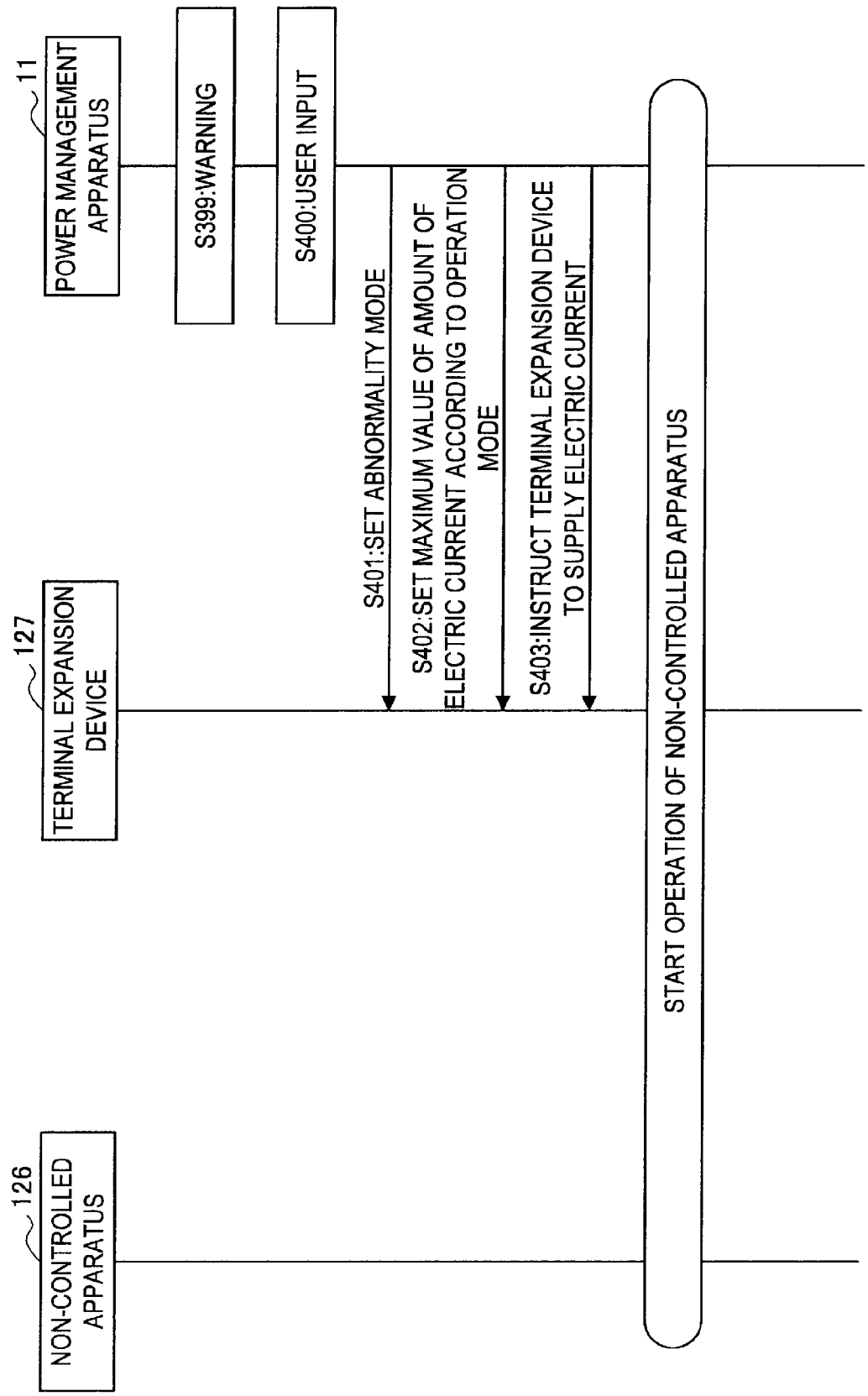
FIG. 37 is an explanatory diagram illustrating an operation flow of proxy authentication of a non-controlled apparatus.
Figure 38:
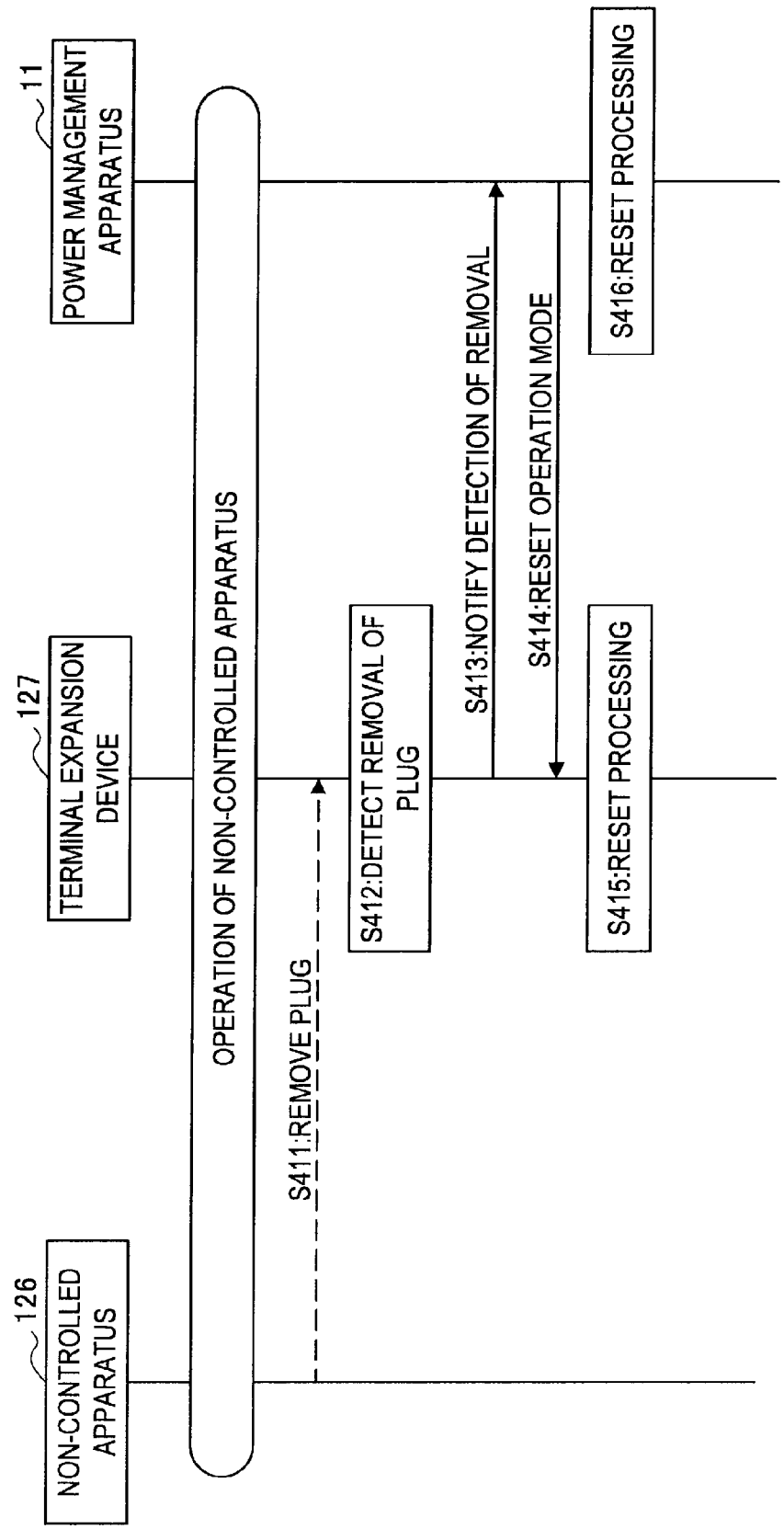
FIG. 38 is an explanatory diagram illustrating an operation flow of a proxy authentication of a non-controlled apparatus.

(Case 1) FIG. 30 to FIG. 32 illustrate an instrument connection protocol in a case where the terminal expansion device 127 is connected to the controlled terminal 123 and registration/authentication is performed between the terminal expansion device 127 and the power management apparatus 11. (Case 2) FIG. 33 to FIG. 35 illustrate an instrument connection protocol in a case where the controlled apparatus 125 is connected to the terminal expansion device 127 and registration/authentication is performed between the controlled apparatus 125 and the power management apparatus 11. (Case 3) FIG. 36 to FIG. 38 illustrate an instrument connection protocol in a case where the non-controlled apparatus 126 is connected to the terminal expansion device 127 and registration/authentication is performed between the terminal expansion device 127 and the power management apparatus 11.

(Case 1)

First, an instrument connection protocol in the above case 1 will be explained with reference to FIG. 30 to FIG. 32.

As shown in FIG. 30, when the terminal expansion device 127 is connected to the controlled terminal 123 (S351), the controlled terminal 123 detects connection of the terminal expansion device 127 (S352). When the connection is detected, the controlled terminal 123 notifies the power management apparatus 11 that the terminal expansion device 127 has been connected (S353). The power management apparatus 11 having received this notification instructs the controlled terminal 123 to provide electric current used for registration/authentication to the terminal expansion device 127 (S354). The controlled terminal 123 having received the instruction for providing electric current provides power for authentication to the terminal expansion device 127 (S355). When the electric current for authentication is provided to the terminal expansion device 127, authentication processing is performed between the terminal expansion device 127 and the power management apparatus 11 (S356).

When the authentication processing is completed in step S356, step of FIG. 31 (associating processing) is subsequently performed. First, as shown in FIG. 31, the power management apparatus 11 uses the functions of the apparatus management unit 1121 to generate a random number (S357). Subsequently, the power management apparatus 11 transmits the random number generated in step S357 to the terminal expansion device 127 (S358). The terminal expansion device 127 having received the random number transmitted from the power management apparatus 11 calculates a power consumption pattern based on the received random number (S359). Subsequently, the terminal expansion device 127 executes power consumption operation based on the calculated consumption pattern (S360).

When the terminal expansion device 127 consumes power, the controlled terminal 123 detects a time-series pattern of the amount of consumed power corresponding to the consumption pattern, and the detection result is transmitted from the controlled terminal 123 to the power management apparatus 11 (S361). The power management apparatus 11 having received the detection result uses the functions of the information analysis unit 1123 to determine whether the received detection result matches the random number generated in step S357 (S362). When the received detection result matches the random number, the power management apparatus 11 uses the functions of the apparatus management unit 1121 to associate the terminal expansion device 127 and the controlled terminal 123. For example, the apparatus management unit 1121 associates an instrument ID of the terminal expansion device 127 and an instrument ID of the controlled terminal 123, and stores them in the storage unit 113.

When the terminal expansion device 127 and the controlled terminal 123 have been associated as described above, step of FIG. 32 (settings of the operation mode and the maximum electric current value) will be subsequently performed. First, as shown in FIG. 32, the power management apparatus 11 uses the functions of the apparatus management unit 1121 to instruct the terminal expansion device 127 to set the abnormality mode (S363). The terminal expansion device 127 starts operation in the abnormality mode shown in FIG. 29. Subsequently, the terminal expansion device 127 and the power management apparatus 11 exchange information about operation modes of an instrument and the like (for example, full power mode, power-saving mode, and the like) (S364). Then, the terminal expansion device 127 and the power management apparatus 11 determine the operation mode of the instrument and the like.

When the operation mode of the instrument and the like is determined, the power management apparatus 11 uses the functions of the apparatus management unit 1121 to set the maximum electric current value in the terminal expansion device 127 according to the operation mode of the instrument and the like (S365). At this occasion, the terminal expansion device 127 uses the functions of the maximum electric current value setting unit 1276 to set, in the electric supply control unit 1273, the maximum power value determined with the power management apparatus 11. When the maximum electric current value has been set, the power management apparatus 11 uses the functions of the control unit 115 to instruct the controlled terminal 123 to supply power to the terminal expansion device 127 (S366). Thereafter, power is supplied from the controlled terminal 123 to the terminal expansion device 127, and the terminal expansion device 127 starts power control on the instrument and the like.

(Case 2)

Subsequently, an instrument connection protocol in the above case 2 will be explained with reference to FIG. 33 to FIG. 35.

As shown in FIG. 33, when the controlled apparatus 125 is connected to the terminal expansion device 127 (S371), the terminal expansion device 127 detects connection of the controlled apparatus 125 (S372). When the connection is detected, the terminal expansion device 127 notifies the power management apparatus 11 that the controlled apparatus 125 has been connected (S373). The power management apparatus 11 having received this notification instructs the terminal expansion device 127 to provide electric current used for registration/authentication to the controlled apparatus 125 (S374). The terminal expansion device 127 having received the instruction for providing electric current provides power for authentication to the controlled apparatus 125 (S375). When the electric current for authentication is provided to the controlled apparatus 125, authentication processing is performed between the controlled apparatus 125 and the power management apparatus 11 (S376).

When the authentication processing is completed in step S376, step of FIG. 34 (associating processing) is subsequently performed. First, as shown in FIG. 34, the power management apparatus 11 uses the functions of the apparatus management unit 1121 to generate a random number (S377). Subsequently, the power management apparatus 11 transmits the random number generated in step S377 to the controlled apparatus 125 (S378). The controlled apparatus 125 having received the random number transmitted from the power management apparatus 11 calculates a power consumption pattern based on the received random number (S379). Subsequently, the controlled apparatus 125 executes power consumption operation based on the calculated consumption pattern (S380).

When the controlled apparatus 125 consumes power, the terminal expansion device 127 detects a time-series pattern of the amount of consumed power corresponding to the consumption pattern, and the detection result is transmitted from the terminal expansion device 127 to the power management apparatus 11 (S381). The power management apparatus 11 having received the detection result uses the functions of the information analysis unit 1123 to determine whether the received detection result matches the random number generated in step S377 (S382). When the received detection result matches the random number, the power management apparatus 11 uses the functions of the apparatus management unit 1121 to associate the controlled apparatus 125 and the terminal expansion device 127. For example, the apparatus management unit 1121 associates an instrument ID of the controlled apparatus 125 and an instrument ID of the terminal expansion device 127, and stores them in the storage unit 113.

When the controlled apparatus 125 and the terminal expansion device 127 have been associated as described above, step of FIG. 35 (settings of the operation mode and the maximum electric current value) will be subsequently performed. First, as shown in FIG. 35, the power management apparatus 11 uses the functions of the apparatus management unit 1121 to instruct the terminal expansion device 127 to set the abnormality mode (S383). The terminal expansion device 127 starts operation in the abnormality mode shown in FIG. 29. Subsequently, the controlled apparatus 125 and the power management apparatus 11 exchange information about operation modes of instruments and the like (for example, full power mode, power-saving mode, and the like) (S384). Then, the controlled apparatus 125 and the power management apparatus 11 determine the operation mode of the instrument and the like.

When the operation mode of the instrument and the like is determined, the power management apparatus 11 uses the functions of the apparatus management unit 1121 to set the maximum electric current value in the terminal expansion device 127 according to the operation mode of the instrument and the like (S385). At this occasion, the terminal expansion device 127 uses the functions of the maximum electric current value setting unit 1276 to set, in the electric supply control unit 1273, the maximum power value determined with the power management apparatus 11. When the maximum electric current value has been set, the power management apparatus 11 uses the functions of the control unit 115 to instruct the terminal expansion device 127 to supply power to the controlled apparatus 125 (S386). Thereafter, power is supplied from the terminal expansion device 127 to the controlled apparatus 125, and the terminal expansion device 127 starts power control on the controlled apparatus 125.

(Case 3)

Subsequently, an instrument connection protocol in the above case 3 will be explained with reference to FIG. 36 to FIG. 38.

As shown in FIG. 36, when the non-controlled apparatus 126 is connected to the terminal expansion device 127 (S391), the terminal expansion device 127 detects connection of the non-controlled apparatus 126 (S392). When the connection is detected, the terminal expansion device 127 notifies the power management apparatus 11 that the non-controlled apparatus 126 has been connected (S393). The power management apparatus 11 having received this notification instructs the terminal expansion device 127 to provide electric current used for registration/authentication to the non-controlled apparatus 126 (S394). The terminal expansion device 127 having received the instruction for providing electric current provides power for authentication to the non-controlled apparatus 126 (S395). When the electric current for authentication is provided to the non-controlled apparatus 126, the power management apparatus 11 tries authentication processing (S396). However, since the non-controlled apparatus 126 does not have any authentication function, authentication of step S396 fails.

When the authentication fails, the power management apparatus 11 instructs the terminal expansion device 127 to stop supplying power to the non-controlled apparatus 126 (S397). The terminal expansion device 127 having receives this instruction stops supplying power to the non-controlled apparatus 126 (S398). Subsequently, the power management apparatus 11 notifies a warning or the like to the user (S399). For example, the warning or the like is displayed on the display unit 116.

After the warning or the like is displayed, step of FIG. 37 (proxy authentication) will be subsequently performed. First, as shown in FIG. 37, after the warning or the like is displayed, the power management apparatus 11 prompts the user to input whether the non-controlled apparatus 126 is used or not and instrument information, the operation mode, the user information, and the like of the non-controlled apparatus 126 (S400). When the user input is completed, the power management apparatus 11 uses the functions of the apparatus management unit 1121 to instruct the terminal expansion device 127 to set the abnormality mode (S401).

Subsequently, the power management apparatus 11 uses the functions of the apparatus management unit 1121 to set the maximum electric current value in the terminal expansion device 127 according to the operation mode of the non-controlled apparatus 126 (S402). At this occasion, the terminal expansion device 127 uses the functions of the maximum electric current value setting unit 1276 to set, in the electric supply control unit 1273, the maximum power value determined by the power management apparatus 11. When the maximum electric current value has been set, the power management apparatus 11 uses the functions of the control unit 115 to instruct the terminal expansion device 127 to supply power to the non-controlled apparatus 126 (S403). Thereafter, power is supplied from the terminal expansion device 127 to the non-controlled apparatus 126, and the non-controlled apparatus 126 starts operation.

When the non-controlled apparatus 126 is detached from the terminal expansion device 127, step of FIG. 38 (reset processing) is subsequently performed. When the non-controlled apparatus 126 is detached from the terminal expansion device 127 as shown in FIG. 38 (S411), the terminal expansion device 127 uses the functions of the connection detection unit 1274 to detect detachment of the non-controlled apparatus 126 (S412). Subsequently, the terminal expansion device 127 notifies the power management apparatus 11 that the non-controlled apparatus 126 has been detached (S413). The power management apparatus 11 having received this notification resets the operation mode of the terminal expansion device 127 (sets a predetermined operation mode) (S414). Subsequently, each of the terminal expansion device 127 and the power management apparatus 11 performs reset processing (S415, S416).

The configuration and operation of the terminal expansion device 127 have been hereinabove explained. Herein, the way for increasing the number of connected instruments and the like by using the terminal expansion device 127 and the registration/authentication processing for enabling the use of the non-controlled apparatus 126 have been explained in detail.

<6: Power Management Apparatuses 11 in Multi-Apparatus Configuration (FIG. 39 to FIG. 41)>

Now, the power management apparatuses 11 in multi-apparatus configuration will be explained with reference to FIG. 39 to FIG. 41. As described above, the power management apparatus 11 centrally controls supply of power to instruments and the like in the local power management system 1. Therefore, when the power management apparatus 11 malfunctions, or stops when software is updated, the instruments and the like in the local power management system 1 become unavailable. To be ready for such situation, it is preferable to prepare multiple power management apparatuses 11. However, the power management apparatuses 11 centrally manage the information about power and control various kinds of instruments and the like in the local power management system 1. Therefore, a contrivance for allowing multiple power management apparatuses 11 to perform complicated management and control in a secure and efficient manner is necessary. Accordingly, a method shown in FIG. 39 to FIG. 41 has been devised.

(6-1: Control Operation)

First, a method for allowing multiple power management apparatuses 11 to control instruments and the like will be explained with reference to FIG. 39. A synchronized operation performed by the multiple power management apparatuses 11 is achieved by the functions of the system management unit 1125 included in the information management unit 112.

Figure 39:
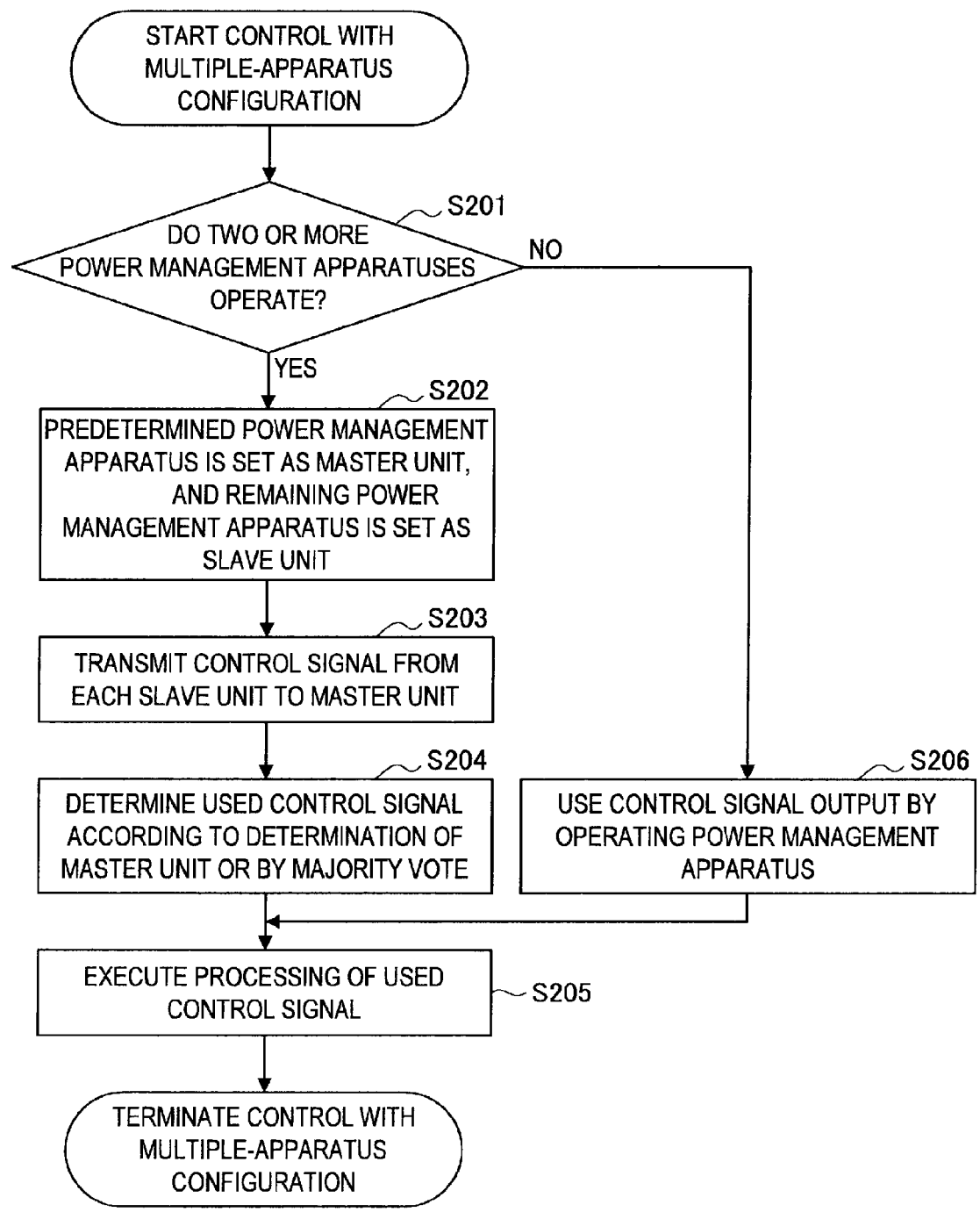
FIG. 39 is an explanatory diagram illustrating an operation flow of power management apparatuses in a multiple-apparatus configuration.

First, as shown in FIG. 39, the system management unit 1125 determines whether more than two power management apparatuses 11 are operating (S201). At this occasion, the system management unit 1125 uses the functions of the local communication unit 111 to request the system management unit 1125 of another power management apparatus 11 to confirm operation. When two or more power management apparatuses 11 are operating, the system management unit 1125 proceeds to step S202. On the other hand, when another power management apparatus 11 is not operating, the system management unit 1125 proceeds to step S206.

When it is determined in step S201 to proceed to step S202, the system management unit 1125 sets a predetermined power management apparatus 11 as a master unit, and sets the remaining power management apparatus 11 as a slave unit (S202). For example, the order of precedence according to which an apparatus is preferentially set as a master unit is previously defined, and a power management apparatus 11 having the highest precedence is set as a master unit. The "master unit" and the "slave unit" referred to herein mean attributes of the power management apparatuses 11. When the attributes are set, a power management apparatus 11 having a slave unit attribute transmits a control signal to a power management apparatus 11 having a master unit attribute to control an instrument and the like (S203).

When a plurality of slave units transmit control signals to the master unit, the system management unit 1125 of the master unit determines a control signal to be transmitted to the instrument and the like according to a determination made by the master unit (a predetermined condition or randomly) or by majority vote (S204). When the control signal is determined, the control unit 115 transmits the control signal determined by the system management unit 1125 to the instrument and the like to cause the instrument and the like to execute the processing of the control signal (S205), and thereafter terminates a series of processings. On the other hand, when it is determined in step S201 to proceed to step S206, the control signal of itself is transmitted to the instrument and the like to cause the instrument and the like to execute the processing of the control signal (S206), and thereafter terminates a series of processings.

As described above, the system management unit 1125 has a function of setting an attribute of each power management apparatus 11 and a function of selecting a control signal. The system management unit 1125 having the above functions can efficiently control the instruments and the like. Further, even when some of the power management apparatuses 11 malfunction or stop due to updating, another power management apparatus 11 continues power management, and the instruments and the like do not become unavailable.

(6-2: Operation During Updating)

Subsequently, an update method of software (firmware) for defining basic operation of the power management apparatus 11 will be explained with reference to FIG. 40 and FIG. 41. It should be noted that the update processing of firmware is achieved by the function of the system management unit

1125. It is assumed that N sets of power management apparatuses 11 are operating in the local power management system 1.

Figure 40:
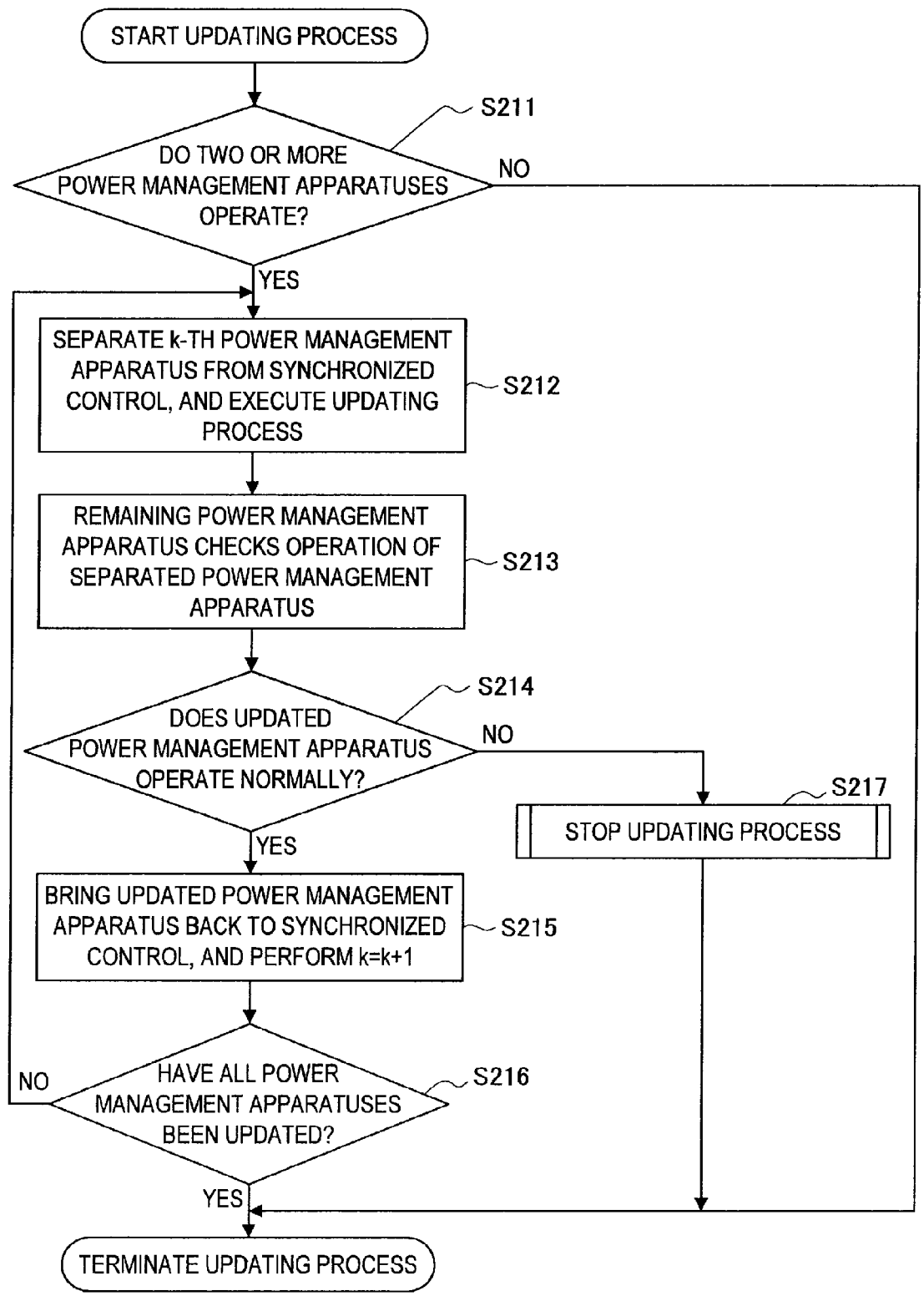
FIG. 40 is an explanatory diagram illustrating an operation flow of power management apparatuses in a multiple-apparatus configuration.

First, as shown in FIG. 40, the system management unit 1125 checks whether two or more power management apparatuses 11 are operating (S211). When two or more power management apparatuses 11 are operating, the system management unit 1125 proceeds to step S212. On the other hand, when another power management apparatus 11 is not operating, the system management unit 1125 terminates a series of processings relating to updating.

When the system management unit 1125 proceeds to step S212, the system management unit 1125 separates a first updated power management apparatus 11 from the synchronized operation, and executes updating (S212). At this occasion, the system management unit 1125 of the power management apparatus 11 separated from the synchronized operation obtains the latest firmware from the system administration server 33, and updates the old firmware to the latest firmware. After the firmware has been updated, the remaining power management apparatus 11 in the synchronized operation checks the operation of the power management apparatus 11 having been updated (S213, S214).

When the updated power management apparatus 11 is normally operating, the system management unit 1125 proceeds to step S215. On the other hand, when the updated power management apparatus 11 is not normally operating, the system management unit 1125 proceeds to step S217. When the system management unit 1125 proceeds to step S215, the system management units 1125 of the plurality of power management apparatuses 11 including the updated power management apparatus 11 return the updated power management apparatus 11 back to the synchronized operation (S215), and change a power management apparatus 11 to be updated. At this occasion, a determination is made as to whether N sets of power management apparatuses 11 have been updated or not (S216), and when N sets of power management apparatuses 11 are determined to have been updated, the updating processing is terminated.

On the other hand, when all of N sets of power management apparatuses 11 are determined not to have been updated, the system management unit 1125 proceeds to step S212, and updating processing is executed on the second updated power management apparatus 11. As described above, processings from steps S212 to S215 are repeatedly executed until all of N sets of power management apparatuses 11 have been updated. However, when it is determined in step S214 to proceed to step S217, termination processing of updating processing is executed (S217), and a series of processings relating to updating is terminated.

Now, the termination processing of updating processing will be explained with reference to FIG. 41.

Figure 41:
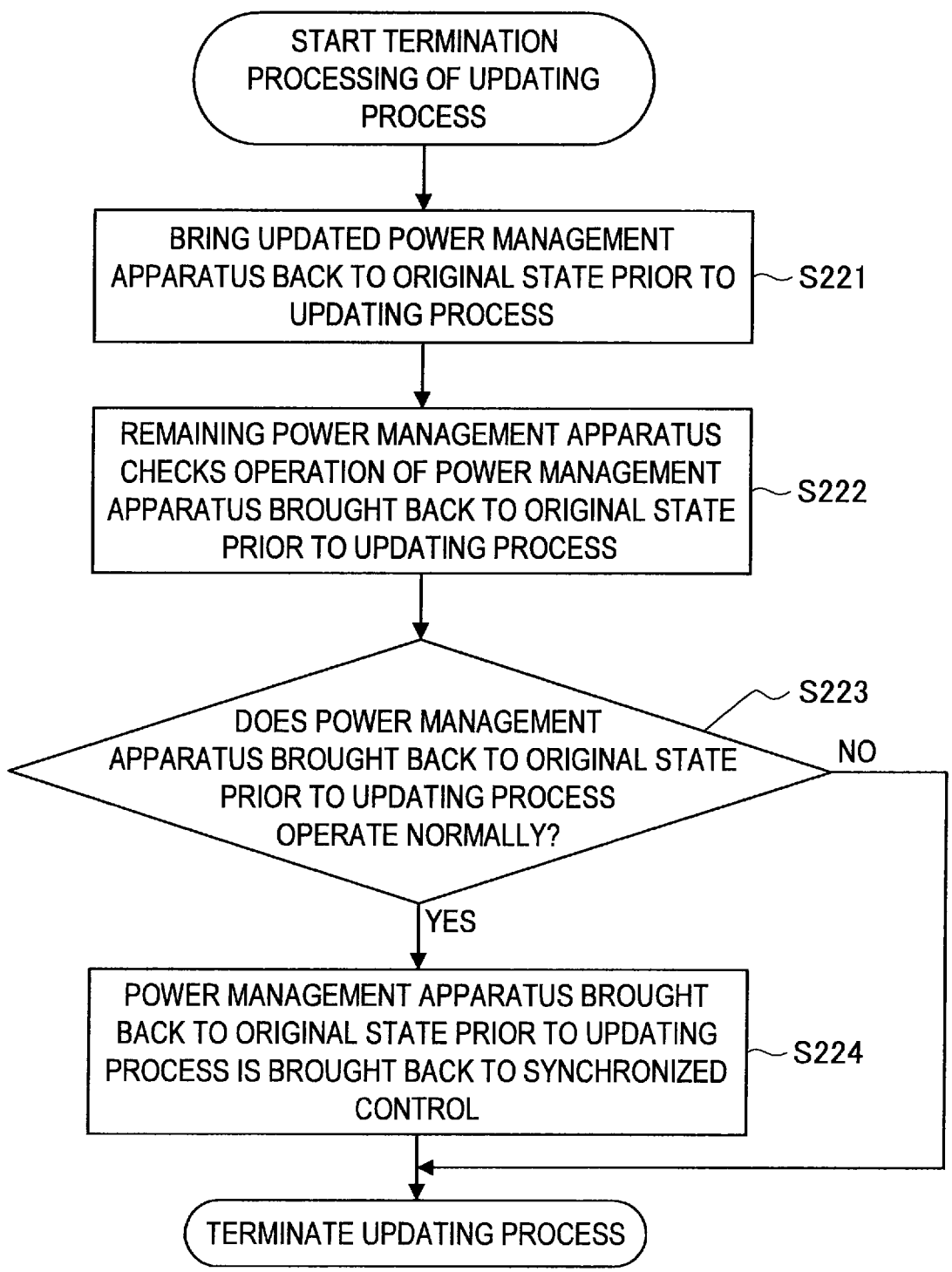
FIG. 41 is an explanatory diagram illustrating an operation flow of power management apparatuses in a multiple-apparatus configuration.

As shown in FIG. 41, when the termination processing of updating processing starts, the system management unit 1125 of the updated power management apparatus 11 returns the firmware of the updated power management apparatus 11 back to an original state prior to the updating (S221). Subsequently, the system management unit 1125 of the remaining power management apparatus 11 in the synchronized operation determines whether the power management apparatus 11 brought back to the original state prior to the updating is operating normally or not (S222, S223).

When the power management apparatus 11 brought back to the original state prior to the updating is determined to be operating normally, the system management unit 1125 proceeds to step S224. On the other hand, when the power management apparatus 11 brought back to the original state prior to the updating is determined not to be operating normally, the system management unit 1125 terminates the termination processing of updating processing. When the system management unit 1125 proceeds to step S224, the system management units 1125 of the plurality of power management apparatuses 11, including the power management apparatus 11 brought back to the original state prior to the updating, return back to the synchronized operation the power management apparatus 11 brought back to the original state prior to the updating (S224), and terminate the termination processing of updating processing.

As described above, during the updating, the power management apparatus 11 to be updated is separated from the synchronized operation, and when it is determined to be normally operating after the updating, the power management apparatus 11 is returned back to the synchronized operation. Even when the updating fails, the power management apparatus 11 is brought back to the original state prior to the updating and is thereafter determined whether it is operating normally, and when it is determined to be normally operating, the power management apparatus 11 is returned back to the synchronized operation. With this configuration, the power management apparatus 11 in the synchronized operation is not affected by the updating processing. Therefore, stable operation of the power management apparatuses 11 can be ensured.

<7: Example of Hardware Configuration of Power Management Apparatus 11 (FIG. 42)>

Figure 42:
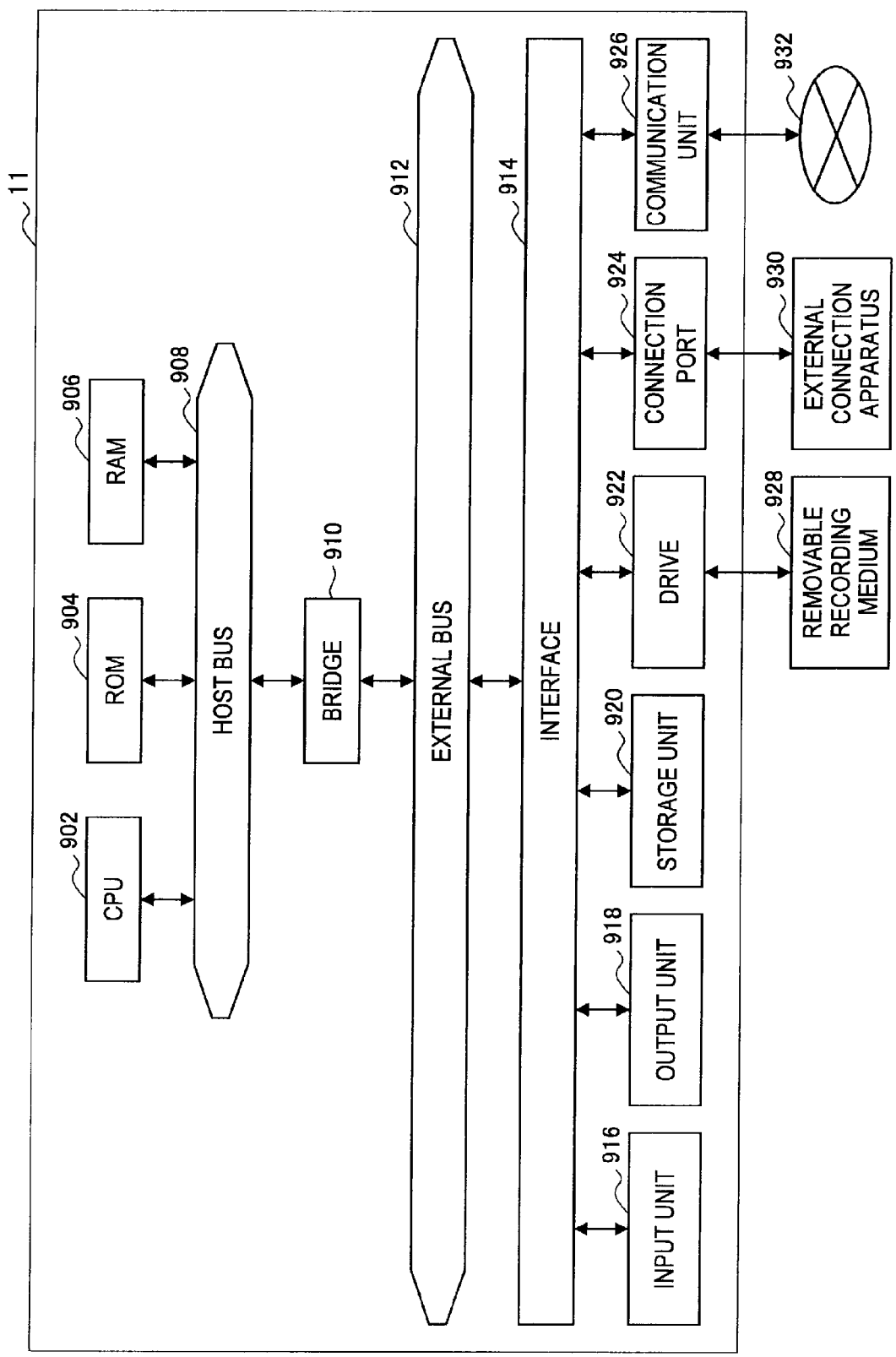
FIG. 42 is an explanatory diagram illustrating an example of hardware configuration of a power management apparatus.

The functions of each constituent element of the above power management apparatus 11 can be realized with, for example, a hardware configuration of an information processing apparatus as shown in FIG. 42. More specifically, the functions of each constituent element can be realized by controlling the hardware as shown in FIG. 42 using a computer program. This hardware may be in any form. For example, this includes a personal computer, a portable telephone, a PHS, a portable information terminal such as a PDA, a game machine, or various home information appliances. It should be noted that the PHS stands for Personal Handyphone System, and the PDA stands for Personal Digital Assistant.

As shown in FIG. 42, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<8: Conclusion>

Lastly, technical contents according to the embodiment of the present invention will be briefly summarized.

The power management system according to the embodiment can be represented as follows. The power management system has a power receiving unit, an electrical storage unit, and a discharge control unit. The power receiving unit receives a supply of power from the outside according to consumption of power. The electrical storage unit stores the power received by the power receiving unit. The discharge control unit controls a second power amount discharged from the electrical storage unit, so that a first power amount provided by the power receiving unit attains a predetermined time-series pattern.

As described above, the power stored in the electrical storage unit can be discharged as necessary. Accordingly, a time-series pattern of the amount of power consumption does not match a time-series pattern of the power amount provided from the outside. Therefore, a life pattern or the like of a user is prevented from leaking from the time-series pattern of the amount of power consumption by way of a power provider and the like, whereby a privacy of the user can be protected. As a result, the life pattern of the user predicted from the time-series pattern of the amount of power consumption is not abused for criminal activities and the like.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Local power management system
11 Power management apparatus
111 Local communication unit
112 Information management unit
1121 Apparatus management unit
1122 Power transaction unit
1123 Information analysis unit
1124 Display information generation unit
1125 System management unit
113 Storage unit
114 Wide area communication unit
115 Control unit
116 Display unit
117 Input unit
12 Management target block
121 Distribution device
122 AC/DC converter
123 Controlled terminal
124 Electric vehicle
125 Controlled apparatus
126 Non-controlled apparatus
127 Terminal expansion device
1271 Electric supply terminal
1272 Insertion/removal sensor
1273 Electric supply control unit
1274 Connection detection unit
175 Local communication unit
1276 Maximum electric current value setting unit
1277 Registration/authentication unit
1278 Mode management unit
1279 Environment sensor
128 Electrical storage device
129 First power generation device
130 Second power generation device
131 Environment sensor
2 Wide area network
3 External server
31 Service providing server
32 Billing server
33 System administration server
34 Analysis server
35 Certificate authority server
36 Manufacturer server
37 Map DB server
4 Power information collection apparatus
5 Power provider system
6 Terminal apparatus
7 Power transaction system

The invention claimed is:

1. A power management system comprising:
   a distribution device for receiving a first power amount from outside according to a consumption of power;
   an electrical storage unit for storing the first power amount received by the distribution device; and
   a processing unit for controlling a second power amount discharged from the electrical storage unit, so that the first power amount attains a predetermined time-series pattern,
   wherein the processing unit controls the second power amount discharged from the electrical storage unit so that the first power amount attains a random time-series pattern.

2. The power management system according to claim 1, further comprising:
   an information management unit for obtaining, from a power management system of another user installed on a building nearby, a time-series pattern of a third power amount for which an electric supply is received from outside of the power management system of the other user,
   wherein the processing unit controls the second power amount discharged from the electrical storage unit so that the first power amount attains the time-series pattern of the third power amount.

3. The power management system according to claim 2, further comprising:
   an information analysis unit for generating an average time-series pattern by averaging a plurality of time-series patterns of third power amounts obtained from power management systems of a plurality of other users by the information management unit,
   wherein the processing unit controls the second power amount discharged from the electrical storage unit so that the first power amount attains the average time-series pattern.

4. The power management system according to claim 3, wherein the electrical storage unit includes:
   a battery having a response time greater than a predetermined time, wherein the response time corresponds to the time period from when a discharge control is performed to when a discharge starts; and
   a capacitor having a response time shorter than the predetermined time, and
   the processing unit discharges power from the capacitor or from the battery based upon the amount of time change utilized for correction of the first power amount to attain the predetermined time-series pattern.

5. The power management system according to claim 2, wherein the
   processing unit controls the second power amount discharged from the electrical storage unit so that a fourth power amount purchased from a power provider attains the predetermined time-series pattern while the power provided by a private power generation is consumed or stored.

6. A power management apparatus comprising:
   one or more processors configured to:
      control a first power amount provided from outside according to a consumption of power by controlling a second power amount discharged from an electrical storage unit storing power, and
      control the second power amount discharged from the electrical storage unit so that the first power amount attains a predetermined time-series pattern,
      wherein the processing unit controls the second power amount discharged from the electrical storage unit so that the first power amount is maintained at a constant value.

7. A power management method comprising the steps of:
   receiving a first power amount from outside according to a consumption of power;
   storing the received first power; and
   discharging the stored power so that the first power amount attains a predetermined time-series pattern,
   wherein the processing unit controls the second power amount discharged from the electrical storage unit so that the first power amount is maintained at a constant value.

* * * * *